(12) United States Patent
Toews et al.

(10) Patent No.: US 12,241,660 B2
(45) Date of Patent: Mar. 4, 2025

(54) OPERATIONAL PROTOCOL FOR HARVESTING A THERMALLY PRODUCTIVE FORMATION

(71) Applicant: EAVOR TECHNOLOGIES, INC., Calgary (CA)

(72) Inventors: Matthew Toews, Calgary (CA); Bailey Schwarz, Calgary (CA); Derek Riddell, Calgary (CA); Paul Cairns, Calgary (CA); John Redfern, Los Angeles, CA (US); Andrew Curtis-Smith, Calgary (CA); Jonathan Hale, Calgary (CA); Peter Andrews, Calgary (CA)

(73) Assignee: Eavor Technologies Inc., Calgary (CA)

( * ) Notice: Subject to any disclaimer, the term of this patent is extended or adjusted under 35 U.S.C. 154(b) by 454 days.

(21) Appl. No.: 16/913,097

(22) Filed: Jun. 26, 2020

(65) Prior Publication Data
US 2021/0003320 A1    Jan. 7, 2021

Related U.S. Application Data

(60) Provisional application No. 63/012,952, filed on Apr. 21, 2020, provisional application No. 62/965,833, (Continued)

(51) Int. Cl.
*F24T 10/20* (2018.01)
*E21B 7/04* (2006.01)
(Continued)

(52) U.S. Cl.
CPC ............ *F24T 10/20* (2018.05); *E21B 7/04* (2013.01); *E21B 33/13* (2013.01); *E21B 43/30* (2013.01);
(Continued)

(58) Field of Classification Search
CPC . F24T 10/20; F24T 50/00; F24T 10/10; E21B 7/04; E21B 33/13; E21B 43/305;
(Continued)

(56) References Cited

U.S. PATENT DOCUMENTS 3,817,038 A    6/1974   Paull et al.
3,996,749 A    12/1976  Denis et al.
(Continued)

FOREIGN PATENT DOCUMENTS

CA    2123075    11/1994
CA    2210866    1/1998
(Continued)

OTHER PUBLICATIONS

WO 2015049125, English language Machine Translation (Year: 2015).*
(Continued)

*Primary Examiner* — Wesley G Harris
(74) *Attorney, Agent, or Firm* — Fish & Richardson P.C.

(57) ABSTRACT

Operational protocol sequences for recovering energy from a thermally productive formation are disclosed. Sealing, drilling, multiranging, power production and distribution techniques in predetermined sequences for well formation are utilized to recover energy regardless of thermal gradient variation, formation depth and permeability and other anomalies or impedances.

28 Claims, 38 Drawing Sheets

Related U.S. Application Data filed on Jan. 25, 2020, provisional application No. 62/867,313, filed on Jun. 27, 2019.

(51) Int. Cl.
| | | |
|---|---|---|
| *E21B 33/13* | (2006.01) | |
| *E21B 43/30* | (2006.01) | |
| *F03G 4/00* | (2006.01) | |
| *F03G 4/02* | (2006.01) | |
| *F24T 50/00* | (2018.01) | |
| E21B 47/0228 | (2012.01) | |

(52) U.S. Cl.
CPC .............. *E21B 43/305* (2013.01); *F03G 4/02* (2021.08); *F03G 4/029* (2021.08); *F24T 50/00* (2018.05); E21B 47/0228 (2020.05); Y02E 10/10 (2013.01)

(58) Field of Classification Search
CPC ..... E21B 47/0228; E21B 43/24; Y02E 10/10; F03G 7/04
See application file for complete search history.

(56) References Cited

U.S. PATENT DOCUMENTS

| | | | |
|---|---|---|---|
| 4,060,988 | A | 12/1977 | Arnold |
| 4,137,720 | A | 2/1979 | Rex |
| 4,538,673 | A | 9/1985 | Partin et al. |
| 4,665,985 | A | 5/1987 | Berrod et al. |
| 4,933,640 | A * | 6/1990 | Kuckes ............... E21B 47/0228 |
| | | | 175/45 |
| 5,515,679 | A | 5/1996 | Shulman |
| 5,685,362 | A | 11/1997 | Brown |
| 5,803,185 | A | 9/1998 | Barr et al. |
| 5,992,507 | A | 11/1999 | Peterson |
| 6,000,471 | A | 12/1999 | Langset |
| 6,028,534 | A | 2/2000 | Ciglenec et al. |
| 6,035,949 | A | 3/2000 | Altschuler et al. |
| 6,059,036 | A | 5/2000 | Chatterji et al. |
| 6,073,448 | A | 6/2000 | Lozada |
| 6,102,120 | A | 8/2000 | Chen et al. |
| 6,247,313 | B1 | 6/2001 | Moe et al. |
| 6,301,894 | B1 | 10/2001 | Halff |
| 6,626,243 | B1 | 9/2003 | Go Boncan |
| 6,668,554 | B1 | 12/2003 | Brown |
| 6,679,326 | B2 | 1/2004 | Zakiewicz |
| 6,708,494 | B1 | 3/2004 | Hamann |
| 7,146,823 | B1 | 12/2006 | Wiggs |
| 7,251,938 | B1 | 8/2007 | Bond |
| 7,740,068 | B2 | 6/2010 | Ballard |
| 8,020,382 | B1 | 9/2011 | Zakiewicz |
| 8,281,591 | B2 | 10/2012 | Lakic |
| 8,307,896 | B2 | 11/2012 | Sarria |
| 8,381,523 | B2 | 2/2013 | Eli |
| 8,616,000 | B2 | 12/2013 | Parella |
| 8,672,058 | B2 | 3/2014 | Tommie et al. |
| 8,708,046 | B2 | 4/2014 | Montgomery |
| 8,768,795 | B2 | 7/2014 | Garrity et al. |
| 8,991,488 | B2 | 3/2015 | Loveday |
| 9,002,761 | B2 | 4/2015 | Montalvo |
| 9,016,374 | B2 | 4/2015 | Quintero et al. |
| 9,027,669 | B2 | 5/2015 | Dirksen |
| 9,121,393 | B2 * | 9/2015 | Schwarck ............... F24T 10/40 |
| 9,243,485 | B2 | 1/2016 | Kosakewich |
| 9,312,698 | B2 | 4/2016 | Subbotin et al. |
| 9,395,707 | B2 | 7/2016 | Anderson et al. |
| 9,458,023 | B2 | 10/2016 | McDonald et al. |
| 9,489,701 | B2 | 11/2016 | Emadi |
| 9,556,856 | B2 | 1/2017 | Stewart et al. |
| 9,559,520 | B2 | 1/2017 | Shelton et al. |
| 9,581,718 | B2 | 2/2017 | Rodney |
| 9,690,275 | B2 | 6/2017 | Gan et al. |
| 9,758,711 | B2 | 9/2017 | Quintero et al. |
| 9,845,423 | B2 | 12/2017 | Franzt et al. |
| 9,870,593 | B2 | 1/2018 | Sedighy et al. |
| 10,260,778 | B2 | 4/2019 | Sonju et al. |
| 10,291,025 | B2 | 5/2019 | Baone et al. |
| 10,435,994 | B2 | 10/2019 | Colvin et al. |
| 10,527,026 | B2 | 1/2020 | Muir et al. |
| 10,774,617 | B2 | 9/2020 | Zhan |
| 11,125,472 | B2 | 9/2021 | Toews et al. |
| 11,156,386 | B2 | 10/2021 | Cairns et al. |
| 11,242,726 | B2 | 2/2022 | Toews et al. |
| 11,460,008 | B2 | 10/2022 | Toews et al. |
| 11,661,821 | B2 | 5/2023 | Toews et al. |
| 11,808,488 | B2 | 11/2023 | Cairns et al. |
| 2003/0127227 | A1 | 7/2003 | Fehr et al. |
| 2004/0123985 | A1 | 7/2004 | Whitfill et al. |
| 2006/0108150 | A1 | 5/2006 | Luke et al. |
| 2006/0250274 | A1 | 11/2006 | Mombourquette et al. |
| 2007/0223999 | A1 | 9/2007 | Curlett |
| 2007/0245729 | A1 | 10/2007 | Mickleson |
| 2007/0284108 | A1 | 12/2007 | Roes et al. |
| 2008/0023205 | A1 | 1/2008 | Craster et al. |
| 2008/0190614 | A1 | 8/2008 | Ballard |
| 2008/0195561 | A1 | 8/2008 | Herzig |
| 2009/0014180 | A1 | 1/2009 | Stegemeier et al. |
| 2009/0039108 | A1 | 2/2009 | Cohen-Zada |
| 2009/0066287 | A1 | 3/2009 | Pollack et al. |
| 2009/0211757 | A1 | 8/2009 | Riley |
| 2009/0255661 | A1 | 10/2009 | Clark et al. |
| 2010/0045042 | A1 * | 2/2010 | Hinders ............... F28D 9/0006 |
| | | | 204/194 |
| 2010/0071366 | A1 | 3/2010 | Klemencic |
| 2010/0276115 | A1 | 11/2010 | Parella |
| 2011/0011557 | A1 | 1/2011 | Shelton, Jr. |
| 2011/0048005 | A1 | 3/2011 | McHargue |
| 2011/0061382 | A1 | 3/2011 | Stern |
| 2011/0067869 | A1 | 3/2011 | Bour et al. |
| 2011/0100002 | A1 | 5/2011 | Muir et al. |
| 2011/0224942 | A1 | 9/2011 | Kidwell |
| 2011/0247816 | A1 | 10/2011 | Carter, Jr. |
| 2011/0306524 | A1 | 12/2011 | Smith |
| 2012/0015852 | A1 | 1/2012 | Quintero et al. |
| 2012/0080163 | A1 | 4/2012 | Hoffman |
| 2012/0174581 | A1 * | 7/2012 | Vaughan ............... F24T 10/10 |
| | | | 290/40 C |
| 2012/0216990 | A1 * | 8/2012 | Quintero ............... C09K 8/82 |
| | | | 507/203 |
| 2012/0245059 | A1 | 9/2012 | McDonald |
| 2013/0255258 | A1 | 10/2013 | Loveday |
| 2013/0299036 | A1 | 11/2013 | Loveday |
| 2013/0338835 | A1 | 12/2013 | Pepe |
| 2014/0102716 | A1 | 4/2014 | Benson et al. |
| 2014/0130498 | A1 | 5/2014 | Randolph |
| 2014/0133519 | A1 | 5/2014 | Freitag et al. |
| 2014/0172182 | A1 | 6/2014 | Subbotin et al. |
| 2014/0262137 | A1 | 9/2014 | McBay |
| 2014/0326668 | A1 | 11/2014 | Loveday |
| 2015/0149249 | A1 | 5/2015 | Mansfield |
| 2015/0153756 | A1 | 6/2015 | Marcus et al. |
| 2015/0198019 | A1 | 7/2015 | Affholter et al. |
| 2015/0275624 | A1 | 10/2015 | Coles et al. |
| 2015/0353841 | A1 | 12/2015 | Rispoli et al. |
| 2016/0040518 | A1 | 2/2016 | Potapenko et al. |
| 2016/0211664 | A1 | 7/2016 | Subbotin et al. |
| 2016/0245550 | A1 * | 8/2016 | Sønju ............... E21B 7/00 |
| 2016/0273345 | A1 | 9/2016 | Donderici et al. |
| 2016/0289533 | A1 | 10/2016 | Agapiou et al. |
| 2017/0058181 | A1 | 3/2017 | Frantz et al. |
| 2017/0122099 | A1 | 5/2017 | Yao et al. |
| 2017/0130116 | A1 | 5/2017 | McDonald et al. |
| 2017/0130703 | A1 | 5/2017 | Muir et al. |
| 2017/0137694 | A1 | 5/2017 | Oort et al. |
| 2017/0211849 | A1 | 7/2017 | Muir et al. |
| 2017/0299226 | A1 | 10/2017 | Buscheck |
| 2018/0274524 | A1 | 9/2018 | Moncarz et al. |
| 2018/0291880 | A1 | 10/2018 | Cairns et al. |
| 2018/0313203 | A1 | 11/2018 | Donderici et al. |
| 2019/0128567 | A1 | 5/2019 | Redfern |
| 2019/0154010 | A1 | 5/2019 | Toews |
| 2019/0280483 | A1 | 9/2019 | Ramamurthy et al. |
| 2020/0011151 | A1 | 1/2020 | Toews et al. |

(56) References Cited

U.S. PATENT DOCUMENTS

| | | |
|---|---|---|
| 2020/0011573 A1 | 1/2020 | Graham et al. |
| 2020/0049380 A1 | 2/2020 | Cairns et al. |
| 2020/0408041 A1 | 12/2020 | Riddell et al. |
| 2021/0231109 A1 | 7/2021 | Toews et al. |
| 2021/0325089 A1 | 10/2021 | Toews et al. |
| 2022/0003459 A1 | 1/2022 | Toews et al. |
| 2022/0026112 A1 | 1/2022 | Cairns et al. |
| 2022/0372838 A1 | 11/2022 | Toews et al. |
| 2023/0018178 A1 | 1/2023 | Toews et al. |
| 2023/0228155 A1 | 7/2023 | Toews et al. |
| 2023/0288099 A1 | 9/2023 | Toews et al. |
| 2024/0035710 A1 | 2/2024 | Toews et al. |

FOREIGN PATENT DOCUMENTS

| | | | |
|---|---|---|---|
| CA | 2790616 | 8/2011 | |
| CA | 2721441 | 8/2016 | |
| CA | 2998782 | 10/2018 | |
| CA | 3013374 | 4/2019 | |
| CA | 3041002 | 5/2019 | |
| CA | 3038294 | 6/2019 | |
| CA | 3044153 | 1/2020 | |
| CN | 101027480 | 8/2007 | |
| CN | 201593889 | 9/2010 | |
| CN | 201650630 | 11/2010 | |
| CN | 102758595 | 10/2012 | |
| CN | 203978273 | 12/2014 | |
| CN | 106246142 | 12/2016 | |
| CN | 106704123 | 5/2017 | |
| CN | 108291437 | 7/2018 | |
| CN | 109652028 | 4/2019 | |
| CN | 110685636 | 1/2020 | |
| EP | 0875657 | 11/1998 | |
| EP | 1435428 | 7/2004 | |
| EP | 3039771 | 5/2018 | |
| EP | 3422282 | 1/2019 | |
| FR | 3056288 | 3/2018 | |
| GB | 2097448 | 11/1982 | |
| GB | 2441033 | 2/2008 | |
| GB | 2441033 A * | 2/2008 | ............ B60T 17/222 |
| GB | 2518442 | 3/2015 | |
| JP | H04-203195 | 7/1992 | |
| JP | H06-37827 | 5/1994 | |
| JP | 3091479 | 9/2000 | |
| JP | 201451856 | 3/2014 | |
| JP | 2016-503477 | 2/2016 | |
| JP | 2016118078 | 6/2016 | |
| JP | 2019-513211 | 5/2019 | |
| JP | 6848006 | 3/2021 | |
| KR | 10-2009-0054856 | 6/2009 | |
| KR | 101403687 | 6/2014 | |
| RU | 2064141 | 7/1996 | |
| RU | 2670292 | 10/2018 | |
| WO | 98/022760 | 5/1998 | |
| WO | WO 2003106585 | 12/2003 | |
| WO | 2010072407 | 7/2010 | |
| WO | 2011053884 | 5/2011 | |
| WO | WO 2011119413 | 9/2011 | |
| WO | WO-2012026874 A1 * | 3/2012 | ............ E21B 21/08 |
| WO | WO-2012037458 A2 * | 3/2012 | ....... E21B 47/02216 |
| WO | 2012068279 | 5/2012 | |
| WO | 2012082962 | 6/2012 | |
| WO | 2013013174 | 1/2013 | |
| WO | 2013109890 | 7/2013 | |
| WO | 2013152138 | 10/2013 | |
| WO | 2014081911 | 5/2014 | |
| WO | WO 2014092823 | 6/2014 | |
| WO | 2014182732 | 11/2014 | |
| WO | 2015030601 | 3/2015 | |
| WO | WO-2015049125 A2 * | 4/2015 | ............ E21B 43/14 |
| WO | WO-2015088536 A1 * | 6/2015 | ........... C04B 28/182 |
| WO | 2015134974 | 9/2015 | |
| WO | 2015192011 | 12/2015 | |
| WO | WO-2016048307 A1 * | 3/2016 | ........... E21B 43/305 |
| WO | 2016091969 | 6/2016 | |
| WO | WO 2017009652 | 1/2017 | |
| WO | 2017053884 | 3/2017 | |
| WO | 2017146712 | 8/2017 | |
| WO | 2018112610 | 6/2018 | |
| WO | 2019157341 | 8/2019 | |
| WO | WO 2019213735 | 11/2019 | |

OTHER PUBLICATIONS

Cui et al., "Geothermal Exploitation from hot dry rocks via recycling heat transmission in a horizontal well" Energy, vol. 128, 366-377, 12 pages.

Noorollahi et al., "Three dimensional modeling of heat extraction from abandoned oil well for application in sugarcane industry in Ahvaz—Souther Iran." Proceedings of the World Geothermal Congress, Apr. 2015, 11 pages.

Templeton et al., "Abandoned Oil/Gas Wells as Sustainable Sources of Renewable Energy." Proc. 23rd World Mining Congress, 2013, 10 pages.

PCT International Preliminary Report on Patentability in International Appln. No. PCT/CA2020/000082, dated Jan. 6, 2022, 8 pages.

PCT International Search Report and Written Opinion in International Appln. No. PCT/CA2020/000082, dated Oct. 1, 2020, 11 pages.

Office Action in Japanese Appln. No. 2021-577078, dated Apr. 10, 2023, 20 pages (with English translation).

Office Action in Australian Appln. No. 2020302974, dated Nov. 26, 2022, 4 pages.

European Search Report in European Appln. No. 20831922.8, mailed on May 31, 2023, 13 pages.

Office Action in Chinese Appln. No. 2020800467934, mailed on Jun. 10, 2023, 25 pages (with English translation).

Extended European Search Report in European Appln. No. 20831922. 8, mailed on Oct. 18, 2023, 16 pages.

Asme.org [online], "Earth Battery" Dec. 2015, retrieved on Dec. 3, 2021, retrieved from URL <https://asmedigitalcollection.asme.org/memagazineselecl/article/137/12/36/380449/Earth-BatteryCarbon-Dioxide-Sequestration-Utility>, 6 pages.

Cetin et al., "Cryogenic energy storage powered by geothermal energy" Geothermics, vol. 77, Jun. 2018, 34-40.

energy.mit.edu [online] "The Future of Geothermal Energy Impact of Enhanced Geothermal Systems (EGS) on the United States in the 21st Century," Nov. 2006, retrieved from URL<https://energy.mit.edu/wp-content/uploads/2006/11/MITEI-The-Future-of-Geothermal-Energy.pdf>, 375 pages.

Esmap.org [online] "Geothermal handbook: Planning and Financing Power Generation," 2012, retrieved from URL<https://www.esmap,org/sites/esmap.orq/files/Documentlibrary/FINAL_Geothermal%20Handbook_TR002-12_Reduced.pdf>, 164 pages.

European Search Report in European Appln. No. 19830007.1, mailed on Dec. 18, 2020, 5 pages.

Examination Report issued in Gulf Cooperation Council Appln. No. GC 2019-37842, dated Jun. 26, 2020, 7 pages.

International Preliminary Report on Patentability in International Appln. No. PCT/CA2019/000111, mailed on Feb. 16, 2021, 5 pages.

International Search Report and Written Opinion in International Appln. No. PCT/CA2019/000076, dated Jul. 25, 2019, 12 pages.

International Search Report and Written Opinion in International Appln. No. PCT/CA2019/000111, dated Oct. 10, 2019, 7 pages.

International Search Report and Written Opinion in International Appln. No. PCT/CA2020/000127, mailed on Feb. 1, 2021, 14 pages.

Lunis et al., "Geothermal Direct Use Engineering and Design Guidebook," United States Department of Energy, 1991, 152.

Nrel.gov [online], "Electricity Generation Baseline Report" Jan. 2017, retrieved on Nov. 26, 2020, retrieved from URL <https:/www.nrel.gov/docs/fy17osti/67645.pdf>, 289 pages.

Office Action in African Regional Appln. No. 2020/012565, dated Sep. 6, 2022, 6 pages.

Office Action in African Regional Appln. No. AP/P/2020/012564, dated Jun. 23, 2022, 6 pages.

(56) References Cited

OTHER PUBLICATIONS

Office Action in Argentina Appln. No. 20190102234, dated Sep. 29, 2022, 4 pages.
Office Action in Australian Application No. 2019208168, dated Mar. 18, 2020, 4 pages.
Office Action in Australian Application No. 2019208168, dated Nov. 2, 2020, 6 pages.
Office Action in Australian Appln. No. 2021203166, dated Sep. 28, 2022, 4 pages.
Office Action in Chinese Appln. No. 201910593698.5, dated Mar. 30, 2021, 19 pages (With English Translation).
Office Action in Chinese Appln. No. 201910593698.5, dated Nov. 17, 2021, 22 pages (With English Translation).
Office Action in Chinese Appln. No. 201910728135.2, dated Jul. 14, 2021, 27 pages (With English Translation).
Office Action in Chinese Appln. No. 201910728135.2, dated Nov. 24, 2021, 17 pages (With English Translation).
Office Action in Chinese Appln. No. 201910728135.2, dated Oct. 16, 2020, 15 pages (With English Translation).
Office Action in Chinese Appln. No. 202210747663.4, mailed on Sep. 28, 2023, 42 pages (with Machine translation).
Office Action in Colombia Appln. No. 20-15501, dated Jan. 31, 2023, 6 pages.
Office Action in Eurasian Appln. No. 202190529, dated Apr. 13, 2021, 5 pages (With English Translation).
Office Action in European Appln. No. 19188962.5, mailed on Jan. 29, 2024, 5 pages.
Office Action in European Appln. No. 19188962.5, mailed on Jun. 27, 2023, 13 pages.
Office Action in European Appln. No. 19830007.1, mailed on Oct. 1, 2021, 8 pages.
Office Action in Gulf Cooperation Council Appln. No. GC 2019-37842, dated Nov. 16, 2021, 5 pages.
Office Action in Gulf Cooperation Council Appln. No. GC 2019-38099, dated Apr. 15, 2021, 5 pages.
Office Action in Gulf Cooperation Council Appln. No. GC 2019-38099, dated Sep. 2, 2020, 4 pages.
Office Action in Indian Appln. No. 201924020812, dated Jan. 3, 2022, 7 pages (With English Translation).
Office Action in Indian Appln. No. 202225043232, Oct. 11, 2022, 6 pages (with English translation).
Office Action in Indian Appln. No. 202227035338, dated Oct. 10, 2022, 6 pages (with English translation).
Office Action in Indonesia Appln. No. P00201904638, dated Nov. 18, 2022, 4 pages (with English translation).
Office Action in Japanese Appln. No. 2019-102547, dated Jun. 29, 2020, 11 pages (With English Translation).
Office Action in Japanese Appln. No. 2019-102547, dated Nov. 2, 2020, 9 pages (With English Translation).
Office Action in Japanese Appln. No. 2022-544163, mailed on Jun. 12, 2023, 17 pages (with English translation).
Office Action in Korean Appln. No. 1020207018946, dated Aug. 12, 2022, 15 pages (With English Translation).
Office Action in Korean Appln. No. 10-2022-7025834, mailed on Jan. 22, 2024, 11 pages (with English translation).
Office Action in Mexico Appln. No. 2019/009389, dated Nov. 11, 2022, 3 pages.
Office Action in Mexico Appln. No. 2019009389, mailed on Mar. 15, 2023, 10 pages (with Machine translation).
Office Action in New Zealand Appln. No. 764529, dated Apr. 8, 2021, 2 pages.
Office Action in New Zealand Appln. No. 764529, dated Sep. 9, 2020, 5 pages.
Office Action in Singapore Appln. No. 11202005041V, dated Nov. 15, 2021, 8 pages.
Office Action in Singapore Appln. No. 11202005041V, dated Oct. 11, 2020, 8 pages.
Office Action in Singapore Appln. No. 11202005044R, dated Jan. 2, 2021, 3 pages.
Office Action in U.S. Appl. No. 17/499,415, dated Oct. 7, 2022, 24 pages.
Sbir.gov [online], "Thermal energy storage for dispatchable geothermal power" Jul. 2018, retrieved on Dec. 3, 2021, retrieved from URL <https://www.sbir.gov/sbirsearch/detail/1523867>, 3 pages.
Search Report issued in Iceland Appln. No. 202000873, dated Aug. 5, 2020, 2 pages.
Wikipedia.org [online], "Duck Curve; California" Dec. 3, 2021, retrieved on Dec. 3, 2021, retrieved from URL <https://en.wikipedia.org/wiki/Duck_curve; California>, 1 page.

* cited by examiner

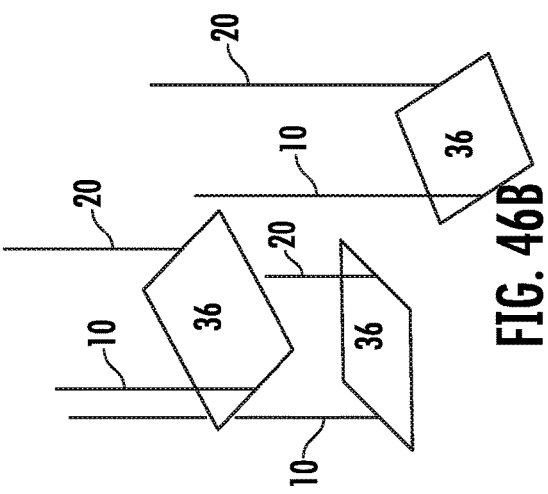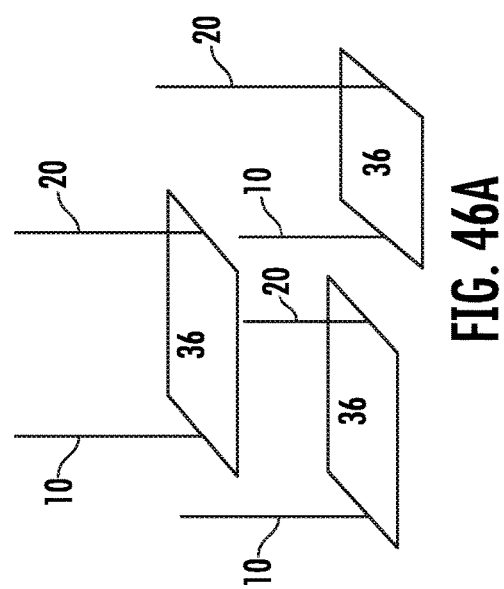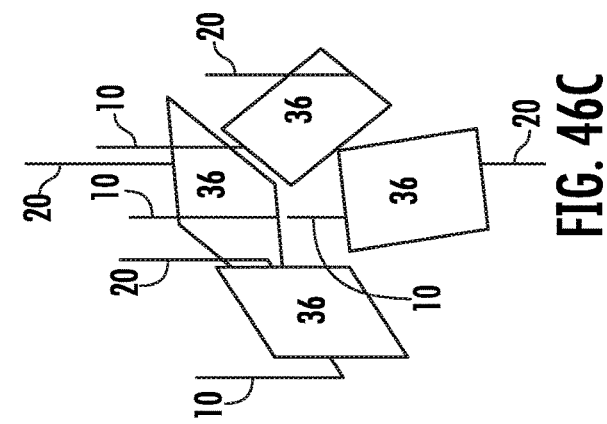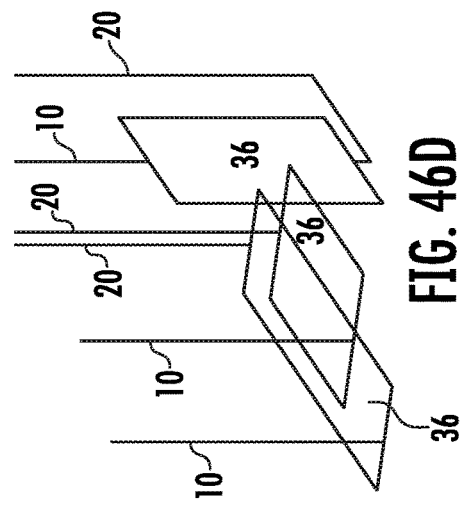

OPERATIONAL PROTOCOL FOR HARVESTING A THERMALLY PRODUCTIVE FORMATION

FIELD OF THE INVENTION

The present invention relates to operational sequences for recovering energy from a thermally productive formation and more particularly, the present invention relates to employing novel techniques in a predetermined sequence to recover energy regardless of thermal gradient variation, formation depth and permeability and other anomalies or impedances.

BACKGROUND OF THE INVENTION

In the area of technology directed to harvesting or recovering thermal energy from a thermally productive formation there are factors which require consideration. In thermally productive areas, the geologic parameters play a significant role in the possibility of recovery. The formation may be a high temperature formation, have an irregular/discontinuous/inconsistent thermal gradient, multiple rock types with variable porosity, unconsolidated sand zones among a host of other geologic anomalies. Each of these factors requires a unit operation or series of unit operations to mitigate recovery complications.

When the recovery is amalgamated with geothermal energy recovery, with subsequent conversion to heat or electricity, further issues arise which require addressing. Wellbore configuration in terms of disposition and mechanical composition as well as multilateral directional drilling become forefront engineering concerns related to efficiency of thermal recovery.

In the prior art, numerous technologies have been promulgated to address some of these factors.

Shulman, in U.S. Pat. No. 5,515,679, issued May 14, 1996, teaches a closed loop thermal energy recovery arrangement in a variety of rock types at higher temperatures, one of which is solid rock which is differentiated in the disclosure of Shulman:

"This invention relates to novel methods and apparatus employing liquid circulation in a closed pipe loop system by which the thermal energy in subterranean hot rock is extracted, i.e. mined, and brought to the surface for utilization. Said hot rock may be solid, fissured or fractured and dry or wet but essentially free of mobile fluid. By this invention, the thermal energy is transferred from the hot rock to relatively cold liquid flowing in one or more of a plurality of distantly separated heat conducting pipe loops that descend from a manifold at the surface into the hot rock and then join together with the bottom of a riser through which the heated fluid returns to the surface."

The wellbore configurations are not discussed in any detail with complex patterns or disposition of the heat recovering conduits. The arrangement relies on piping in the wellbore configuration for fluid transportation through the arrangement for thermal recovery from the formation.

Moe, U.S. Pat. No. 6,247,313, issued Jun. 19, 2001 discloses a wellbore configuration which includes a plurality of heat absorbing holes within a geothermal area. The disclosure is silent regarding casing or liners; however, it is limited to utilization of a fractured zone, angular disposition of the heat absorbing holes being parallel to each other and further limitations. The teachings specifically state:

"The magnitude of the sloping angle will depend on several factors, for instance the temperature gradient in the rock, the length of the heat absorbing hole and the water flow rate. Calculating the angle will be well within the capabilities of the skilled person and will therefore not be detailed here. The angle would normally lie between 20° and 50°, preferably it will be about 40°.

Furthermore, in order to maximize the extraction of heat from a given volume of rock, at least substantial parts of the heat absorbing holes extend parallel to each other. More preferably, the heat absorbing holes are arranged in one layer or, if necessary, in a plurality of vertically spaced layers. Providing an array of vertically spaced layers, each layer having a plurality of heat absorbing holes, allows for increasing the capacity of the plant without spreading the holes over a wide area. This is of considerable importance if the volume of earth available for exploitation is not large. The supply and return holes 3, 4 are interconnected by four heat absorbing holes 5, each having a diameter of 10 cm and being approximately 2000 m long. The spacing between these holes 5 may be 100-150 m. They have been drilled starting out from the supply hole 3 and terminate at or near the return hole 4. A fracture zone 6 has been established in this area to provide flow communication between the holes 4 and 5 since it would be difficult to hit the return hole 4 directly when drilling the heat absorbing holes 5."

The teachings also teach a difficulty regarding the connection of the inlet and outlet as emphasized.

As a disadvantage, the Moe arrangement would not provide sufficient teaching regarding unrestricted access to a gradient regardless of its anomalies and thus the disclosure is limited to specific scenarios.

Brown, in U.S. Pat. No. 6,668,554, issued Dec. 30, 2003, teaches a fracturing process for forming a fractured zone in hot dry rock. Super critical CO2 is used as a working fluid to convey the absorbed energy from the geothermal formation. The fluid communication is not in a closed loop where there is an interconnecting segment in fluid communication between an inlet well and an outlet well where the working fluid is isolated from the formation. In the Brown arrangement, the formation itself indiscriminately communicates with the inlet and outlet wells. This is further evinced by the fact that Brown teaches:

"Finally, the hot dry rock circulating system is completed by drilling the two or more production wells to intersect the reservoir near each end of the elongated reservoir region as defined by the "cloud" of microseismic event locations defining the shape of the fractured hot dry rock reservoir. All the wells would be appropriately completed with casing to the surface and then purged of drilling fluids and other water-based materials, again using gaseous carbon dioxide."

From this passage the use of casing is identified as is an intersection of wells, but not with each other as in a closed loop, but rather with a man-made reservoir within the formation.

Turning to the geologic heat/power production art, this area has been well documented. One of the early examples is found in United States Patent Publication 20120174581, Vaughan et al, published Jul. 12, 2012.

Other examples include United States Patent Publication 2007024572, Mickelson, published Apr. 21, 2004, McHargue, in United States Patent Publication 201100480, published Aug. 26, 2009 and Lakic in U.S. Pat. No. 8,281,591, issued Oct. 9, 2012.

U.S. Pat. No. 10,260,778, Sonju, issued Apr. 16, 2019 discloses a geothermal plant. There are teachings in the patent regarding specific requirements for the production sections of the configuration being in a specific disposition relative to a concentric inlet/outlet well arrangement. The disclosure does not provide instruction regarding conditioning of the wellbores during or after drilling or possible directions for interconnecting segments to exploit the thermally productive zone without restriction.

Muir et al, in U.S. Pat. No. 10,527,026, issued Jan. 7, 2020, teach a closed loop heat recovery arrangement for transferring heat from a well casing into the fluid.

The text indicates:

"Embodiments disclosed herein are directed towards methods and apparatus for the production of power from a non-permeable geological resource, through the use of a closed loop design, where the fluid is fully isolated from the formation in a closed loop well and heat is transferred through the well casing into the fluid."

"As described in the background section above, typical hydrothermal systems, as well as closed loop systems, have been focused on extracting heat from permeable geological resources where fractures or porosity occur either naturally or through stimulation. In contrast, embodiments disclosed herein may efficiently and effectively extract heat from low-permeability rock, such as rock in the plastic zone. Geologic formations including higher temperature low-permeable rock are advantageously used by passing a fluid through the resource without direct contact between the fluid and the rock, whereby heat is transferred directly from the rock through the well casing into the fluid."

"A closed loop geothermal heat exchange system may then be disposed within the subterranean formation based on the determined temperature profile and the determined heat replenishment profile of the subterranean formation. Emplacement of the closed loop geothermal heat exchange system may include drilling, casing, perforating, cementing, expanding uncased well walls with fractures, sealing uncased well walls and other steps associated with a drilling process and emplacement of a well loop therein as known to one skilled in the art. The emplacing may include, in some embodiments, disposing a heat exchange zone of the closed loop well system within a plastic zone or a brittle-ductile transition zone of the formation. In some embodiments, the emplacing may include or additionally include disposing a heat exchange zone of the closed loop well system within a brittle zone of the formation, as well as stimulating the brittle zone proximate the heat exchange zone."

The text provides a general teaching regarding sealing, but includes casing in the heat recovering sections of the wellbore configuration. The text indicates:

"According to some embodiments, methods for producing geothermal energy described herein may include portions of wells that are not cased with metal pipe but, instead, the walls of such portions may be formation rock that has been sealed with hardened sealant and the well wall in such portions being defined by the boundary of such hardened sealant which, in some embodiments, will cause the diameter of the well in such portions to be larger, and in some cases much larger, than in the metal cased portion of such wells."

The reference mirrors the teachings of Shulman, supra, and does not provide instruction regarding intersection of wells, the absence of casing and/or liners or geometric variation in the disposition of the heat recovering segments of the wellbore arrangement to accommodate any thermal gradient pattern.

In respect of the wellbore configuration and drilling, numerous references have been presented which are directed to multilateral drilling and trajectory issues associated with multilateral formation. As a first example, Clark et al., in United States Patent Publication No. US2009/0255661, published Oct. 15, 2009, teach a method for drilling a multilateral well by drilling and casing a mother wellbore into which is installed a multilateral junction. A first lateral well from the multilateral junction is drilled and cased. Subsequently, a second lateral well is drilled from the multilateral junction using magnetic ranging while drilling such that the second lateral well has a controlled relationship relative to the first. The methodology is focused on the oil industry and thus does not delineate any further details in respect of a multitude of lateral wells. Trajectory deviation is not specifically addressed.

In United States Patent Publication US2018/0313203, published Nov. 1, 2018, Donderici et al., teach an effective system utilizing electromagnetic and survey measurements from a first well in order to calibrate a formation model. This is then used to improve the interpretation of measurements from a second well. The methods are indicated to use a relative approach. Accordingly, even though the exact position of each wellbore may not be accurately identified, their relative positions can be accurately identified. This results in better positioning of the well pairs.

In United States Patent Publication No. 2016/0273345, published Sep. 22, 2016, Donderici et al., disclose a method and system for magnetic ranging and geosteering. In the disclosure, it is indicated in paragraph [0019]:

"As described herein, the present disclosure describes illustrative ranging methods and systems that utilize a magnetic dipole beacon to guide one wellbore towards another wellbore. In a generalized embodiment, the beacon induces low frequency magnetic fields into the formation from a first wellbore, which are then sensed by one or more dipoles (acting as receiver(s)) in a second wellbore. The beacon and/or receiving dipoles are magnetic dipoles, and in certain embodiments one or both may be a triaxial magnetic dipole. Nevertheless, in either embodiment, the magnetic fields that are emitted from the beacon form a natural path of approach to the first wellbore. As a result, the second wellbore can be steered to align with the magnetic field direction, which will automatically establish the ideal approach towards the first wellbore."

The system is clearly useful for dual well systems to maintain consistency during drilling.

In further developments, Yao et al., in United States Publication No. US 2017/0122099, published May 4, 2017, provide systems and methods for multiple downhole sensor digital alignment using spatial transforms. The arrangement incorporates numerous sensor nodes which convey data eventually used in a mathematical transform to ensure accuracy in downhole drilling.

In PCT/US2012/036538, published Nov. 7, 2013, systems and methods for optimal spacing of horizontal wells is disclosed. The methods and systems employ a magnetic dipole beacon to guide one wellbore towards another wellbore. One embodiment includes a beacon for inducing low frequency magnetic fields into the formation from a first wellbore. These are then sensed by one or more dipoles in a second wellbore. The beacon and/or receiving dipoles are magnetic dipoles and the disclosure states that in some embodiments one or both may be a triaxial magnetic dipole. The magnetic fields emitted from the beacon form a natural path of approach to the first wellbore. Consequently, the second wellbore can be steered to align with the magnetic field direction, which establishes the preferred approach towards the first wellbore.

Rodney, in U.S. Pat. No. 9,581,718, issued Feb. 28, 2017, teaches a ranging while drilling system having a drill string with a magnetic source that induces a magnetic moment in a casing string. The magnetic source includes at least one dipole with a non-orthogonal tilt relative to a longitudinal axis of the drill string. A three-axis magnetometer that detects a field from the induced magnetic moment is provided and has a sensor that provides a signal indicative of a rotational orientation of the magnetic source. A processor determines a relative distance and direction of the casing string from measurements by the sensor and the three-axis magnetometer.

Cumulatively, the prior art has presented individualized proposals to specific issues encountered when recovering thermal energy from a productive formation. There is still a need for an operating protocol which cohesively addresses all of the issues associated with harvesting thermal recovery with dynamic adaptability. The most desirable solution is one that allows for adaptive thermal recovery in complex formations with inconsistent rock type, permeability, varying thermal gradient with discontinuity within the gradient and/or multiple geographically spread gradients, high temperature, significant depth, inter alia.

The present inventive protocols are enveloped with novel operations to adaptively control and exploit variable formation conditions to efficiently harvest thermal energy from a productive formation together with electrical distribution aspects.

SUMMARY OF THE INVENTION

One object of one embodiment of the present invention is to provide adaptive protocol to harvest recoverable energy from a thermally productive formation without being limited by challenging formation properties.

Another object of one embodiment of the present invention is to provide a method for energy recovery from a geologic formation having predetermined available potential thermal capacity, comprising:

drilling into said formation using a destructive mechanism in a predetermined sequence of drilling and sealing to form a primary wellbore therein having a substantially impermeable interface between the wellbore and the formation;

drilling subsequent wellbores by electromagnetic guidance at least from said primary wellbore;

selectively utilizing at least one of cumulative signals and individual signals from drilled subsequent wellbores to guide drilling in forming a predetermined pattern of wellbores within the formation;

linking the predetermined pattern of the wellbores in a closed loop arrangement within thermal areas of the formation through an inlet well and outlet well to an energy recovery device to recover energy from the loop arrangement in a closed loop between the wells and the device, said closed loop arrangement having a predetermined energy output within the available potential thermal capacity of the formation;

circulating a fluid composition having a predetermined composition with a predetermined residency time within the closed loop arrangement to form an energy charged fluid, and generating on demand energy to an end user through interaction between the charged working fluid and the energy recovery device.

Conveniently, the sequenced drilling operation seals any, if present, pre-existing fissures, fractures, cracks or other geologic anomalies and any fissures, fractures, cracks or other geologic anomalies formed as a result of drilling, to form the interface.

The method has effectiveness in formations at formation temperatures of at least 50° C. to over 400° C.

Consistent with the adaptive nature of the protocol, specific unit operations may be selectively modified during a drilling operation. These include i) drilling rate of penetration; ii) drilling face preconditioning with active coolant; iii) drilling destructive mechanism selection; iv) electromagnetic communication between selected wellbores; v) drilling direction of said wellbores; vi) networking of closed loop arrangements; vii) proximity of closed loop arrangements; viii) circulation fluid composition, flow direction, residency time, flow rate; viv) flow cycling of compositionally different circulation fluids; x) residency time for cycled compositionally different circulation fluids; and xi) combinations of i) through x) in any number and sequence.

In light of the fact that certain areas within a given formation can present any number of irregularities, the method allows for selecting modifications based on formation rock porosity, formation rock type, formation temperature, drilling depth, tectonics, faults in said formation, geologic anomalies and variations in each or as at least some in a group encountered during practice of the method.

For efficiency in certain scenarios, a plurality of closed loop arrangements for recovering available potential thermal capacity may be incorporated.

The loops may be linked in a predetermined pattern with discrete predetermined patterns of closed loop arrangements. As examples, the linking of the discrete predetermined patterns of closed loop arrangements may be in at least one of a localized network, a dispersed network, in a nested grouping in thermal contact with proximate closed loop arrangements and combinations thereof.

For further adaptability, the closed loop arrangements may be by an inlet well of one closed loop arrangement with an outlet well of a proximate closed loop arrangement.

In electrical production aspects of the technology, working fluid may be circulated in closed loop arrangements loop with a predetermined residency time to thermally load the circulating fluid through conduction from said formation. As a particular advantage, the flow rate of the thermally loaded fluid within said loop may be varied based on user energy demand.

Commensurate with user demand, the circulating fluid may be supplemented with energy charged fluid from adjacent closed loop arrangements in positioned in the formation.

The method allows for delivery on demand through thermal discharge of the fluid in a power production apparatus to an end user which temporarily exceeds said predetermined energy output, while maintaining a delivered energy output average equal to the available potential thermal capacity over a predetermined timeframe.

Where required, the closed loop arrangements having an inlet well, an outlet well and an interconnecting section there between for fluid communication, may have the interconnecting section cased, uncased, lined, chemically treated, chemically sealed, thermally sealed, include single pipe, coaxial pipe and combinations thereof in a continuous or discontinuous configuration. Such flexibility mitigates formation challenges as noted above.

A further object of one embodiment of the present invention is to provide a method for optimizing power distribution on a pre-existing grid, comprising:

providing an intermittent power production arrangement having a designed maximum power production quantity and a second effective power production quantity on the pre-existing grid;

positioning an energy recovering and producing closed loop within a thermal bearing geologic formation adjacent said intermittent power production arrangement, the loop including an inlet well, outlet well, interconnecting section between the inlet well and the outlet well, the interconnecting section positioned in the formation to facilitate thermal recovery in the formation, the formation having an available potential thermal capacity, said closed loop being formed in accordance with the method of claim 1;

positioning the closed loop in a configuration within the formation to produce a predetermined energy output from the available potential thermal capacity;

circulating a working fluid within the loop with a predetermined residency time to thermally charge circulating working fluid through conduction from the formation; and selectively thermally discharging the working fluid through the intermittent power production arrangement to increase power production to a quantity above the second effective power production quantity and below the designed maximum power production quantity, whereby overall power production is optimized using the pre-existing grid.

Another object of one embodiment of the present invention is to provide an energy harvesting farm, comprising:

an energy recovering and producing closed loop system within a thermally productive geologic formation utilizing a working fluid for recovering thermal energy;

an intermittent power production arrangement having a designed maximum power production quantity and a second effective power production quantity on a pre-existing grid;

an energy processing device for processing recovered thermal energy operatively connected to the closed loop system; and a distribution control system for selectively thermally discharging said working fluid through the intermittent power production arrangement to increase power production to a quantity above said second effective power production quantity and below the designed maximum power production quantity, whereby overall power production is optimized using the pre-existing grid.

As a design convenience, the closed loop system may include a plurality of closed loops having at least one of co-located inlet wells, co-located outlet wells, a common inlet well, a common outlet well, multiple lateral interconnecting wells commonly connected to an outlet well and an inlet well of a respective closed loop, vertically stacked closed loops, closed loops with an outlet well of a first closed loop connected to an inlet well of a second closed loop, interdigitated multiple lateral interconnecting wells of adjacent closed loop systems and combinations thereof.

Intermittent power production arrangements may include a solar energy recovery arrangement, a wind energy recovery arrangement, a battery energy arrangement and combinations thereof.

A still further object of one embodiment of the present invention is to provide an energy harvesting farm, comprising:

an energy recovering and producing closed loop system within a thermally productive geologic formation utilizing a working fluid for recovering thermal energy, the formation having an available potential thermal capacity;

a pre-existing electrical grid;

an energy processing device for processing recovered thermal energy operatively connected to said closed loop system;

a distribution control system for selectively thermally discharging the working fluid through the energy processing device;

a delivery system for facilitating energy delivery on demand through thermal discharge of the fluid in said energy processing device to an end user which temporarily exceeds a predetermined energy output of the formation, while maintaining a delivered energy output average equal to the available potential thermal capacity over a predetermined timeframe.

At least one of the distribution control system and the delivery system can be operatively connected to a plurality of energy recovering and producing closed loop systems.

Finally, for farm networks, a central transmission hub may be operatively connected to a plurality of discrete energy harvesting farms for redirecting deliverable energy between farms.

When the operating protocol for harvesting the thermal energy is integrated with the electrical farm aspects, the result is an efficient thermal recovery technology package fully scalable to accommodate electrical user demand using the existing grid without additional footprint and infrastructure requirements saddling conventional electrical distribution.

BRIEF DESCRIPTION OF THE DRAWINGS

FIG. 25A is an enlarged view of the interconnecting well formation of FIG. 25.

FIGS. 46A through 46D are schematic illustrations of alternative interconnecting sections or multilateral sections for use in the recovery arrangement;

DETAILED DESCRIPTION OF THE PREFERRED EMBODIMENTS

Figure 1:
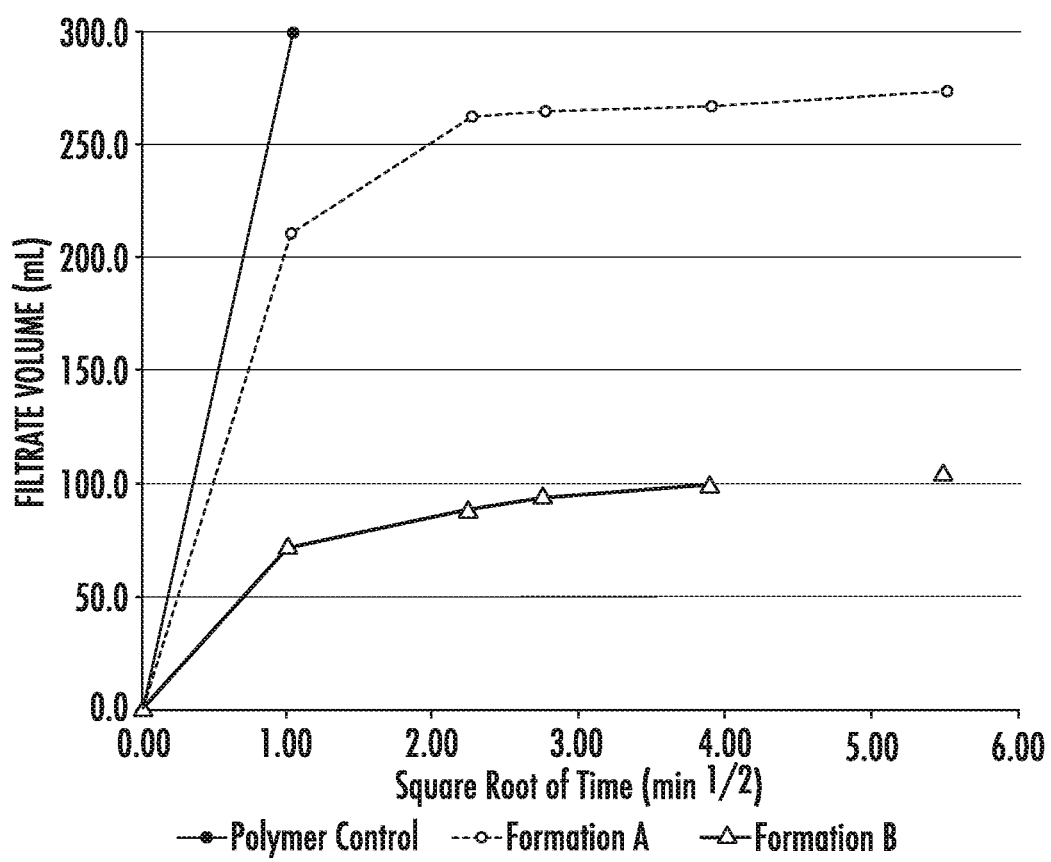
FIG. 1 is a graphical representation filtrate volume as a function of the square root of time for various fluid formulations.

As a preliminary overview, the technology herein relates to operational protocols for wellbore formation and design for recovery of thermal energy from a thermally productive formation. Examples are delineated for closed-loop geothermal wellbores. Drilling protocols with multiranging guidance techniques are integrated into the protocols as well as amalgamation with electrical power delivery protocols and systems. Initial discussion will be directed to the drilling/sealing protocols for forming an efficient wellbore arrangement.

The overall steps include:
i). sealing the wellbore while drilling, drilling with a phase change material with subsequent sealing in a sequence;
ii). augmenting the seal with a chemical treatment subsequent to drilling; and
iii). displacing the drilling fluid, post drilling with a circulating working fluid which augments and maintains the seal with self-healing any remaining or generated permeability and maintains wellbore integrity.

The flexibility of the approach allows each of these aspects to be used separately, depending upon the specific geology of the formation, however, they are most effective when integrated and working in concert to create and maintain a closed-loop geothermal system.

The wellbores can be any number of configurations, such as a single U-tube with an inlet/outlet, a U-tube wherein the inlet and outlet well are located on the same surface lease, a "tube-in-tube" configuration which could be vertical, deviated, or horizontal, and include "daisy-chaining" several of these wellbores together, L shaped, etc. These are examples and are not intended to be limiting. Other suitable arrangements will be appreciated by those skilled in the art.

The aspects noted above are particularly effective when used to form multilateral wellbores wherein a plurality of laterals are connected to a vertical well, typically in a U-tube configuration with multiple horizontal laterals connecting a vertical cased inlet well and a vertical cased outlet well. When used in a multilateral configuration several advantages are realized not recognized in the art. These include:
  i) The laterals can be initiated, drilled, and completed open hole avoiding the expense and time associated with installing casing:
  ii) The "open hole" junctions can be created and sealed while drilling in a single step. This avoids complicated mechanical junctions, cement placement, drilling out plugs or metal sections, multiple trips to surface, and in general the complications and expense associated with intricate downhole processes and resulting delay in forward drilling;
  iii) There is no material reduction in inner diameter which enables unlimited number of laterals to be drilled;
  iv) There is no reduction in thermal conductivity created by an insulating cement layer or stagnant annulus between steel liner and rock; and
  v) Enablement to re-enter multilaterals with magnetic ranging equipment to intersect other lateral wellbores and create a closed U-tube wellbore configuration. This will be discussed in greater detail herein after.

In respect of the sealing while drilling aspect, this may be accomplished by including additives within the drilling fluid itself that cause irreversible formation damage and reduce the permeability to zero or negligible levels.

The additives may be biological growth accelerants such as the techniques used in Microbial Enhanced Oil Recovery, physical particulates that create an impermeable filter cake, or chemical sealants that react upon contacting and penetrating into the geological formation such as time-set or thermally-set resins and epoxies, gels, and polymers.

Another method for sealing wellbores while drilling is to thermally seal the face of the rock with extremely high temperatures that melt the wellbore wall, for example by using a high temperature plasma or laser-based drilling bit.

The preferred method is to use a chemical sealant, for example an alkali-silicate based drilling fluid with a pH greater than 10.5, that remains liquid within the wellbore, but precipitates into a solid upon contacting and penetrating into the rock. The technical function of the drilling fluid is different in permeable rocks (for example sandstone or fractured basement) relative to impermeable rocks such as hard shales or siltstones. In permeable formations the liquid alkali-silicate drilling fluid penetrates any available flow paths prior to reacting and setting into a solid. The resulting solid precipitate is impregnated and fused into the pore space and natural fractures within the rock itself and creates a fluid impervious barrier between the wellbore and the geological formation.

In contrast, in rocks with near zero permeability such as shale, the function of the drilling fluid is not to seal off permeability—the rock already has none. Instead, the function of the drilling fluid is to provide a mechanical and chemical barrier between the rock and wellbore and to fill in any natural fractures, fissures, or cleave planes. The end result is the same, to create a fluid impervious barrier between the wellbore and the geological formation.

The sealant may also be used to consolidate unconsolidated sands, increase the compressive strength of the rock, and prevent sand production and sloughing.

As is known, soluble silicates contain three components, namely silica, alkali, and water. Silica (silicon dioxide, $SiO_2$), is the principal constituent of soluble silicates and is stabilized by an alkali. The alkali may be selected from sodium, potassium, or lithium oxide ($Na_2O$, $K_2O$, or $Li_2O$) and is responsible for maintaining the solubility of the silica.

Suitable silicates include potassium, sodium and sodium aluminosilicate. These products are available in both liquid and powdered forms. Silicates are desirable for use in this technology since they can undergo distinct types of chemical reactions, namely gelation (drop in pH), which is the self-polymerization or condensation of soluble silicate structures to form a hydrous, amorphous gel structure of silicate. Gelation is brought on by a drop in pH with polymerization beginning to rapidly occur at pH below 10.5.

Another type of reaction the silicates can undergo is precipitation with cations such as calcium. Precipitation of silicate is the cross-linking of silicate molecules by multivalent cations (i.e. $Ca^{+2}$, $Mg^{+2}$, $Al^{+3}$, $Fe^{+3}$, etc). These cations are present in the formation water—a drilling fluid to formation fluid interaction therefore results in solid precipitation within the pore space.

A further type of reaction the silicates undergo is dehydration. As water is removed from liquid silicate, the silicate progressively becomes tackier and more viscous and eventually becomes a glassy film. These are the reactions that occur in the near wellbore as filtrate from the drilling fluid mixes with fluids within the rock matrix.

Silicates are especially attractive to this geothermal application since they are a stable sealant at ambient conditions and at extremely high temperatures. For example, alkali-silicate and sand is used at temperatures of 650° C. and above in the foundry and liquid metal casting industry, and this basic chemical reaction is also employed to seal concrete structures at ambient temperature.

The alkali-silicate drilling fluid is formulated to be solids free and low viscosity to maximize wellbore fluid invasion and spurt loss to chemically seal the wellbore. For multilateral horizontal well segments friction is a significant challenge, so a lubricant is added that is compatible with silicate brine and does not materially interfere with the sealant properties.

The concentration of active alkali-silicate can be from 0.3%-10% but more likely from 3%-6% by mass in water. The optimum concentration depends somewhat on the geological properties such as in-situ brine composition and temperature. Higher rock temperatures can cause a delay in the precipitation reaction. Likewise, formations where the in-situ brine has a low concentration of multivalent cations, for example, below 1000 mg/L, cause a slower reaction. Therefore, as rock temperature increases and multivalent cation concentration decreases, the concentration of alkali-silicate should be increased.

Ancillary benefits of a silicate brine include an enhanced rate of penetration, (ROP), and increased bit life.

The physical properties of the combined rock/sealant material are largely derived from the rock but can be modified by carefully selecting the properties of the sealant. A thermally conductive additive may be included with the drilling fluid, such as graphene nano particles, so that the resulting sealant has a high thermal conductivity.

The energy output of a closed-loop geothermal system can be determined using a thermodynamic wellbore model consisting of a discretized wellbore with multiple thermal resistances between the fluid temperature and the far-field rock temperature. Each discretized segment has an energy and mass balance performed, where fluid properties and calculations are handled with an equation of state thermodynamics package. The heat transfer resistances include the rock, cement, steel casing, and convective heat transfer resistance within the wellbore itself.

As a quantitative example, using a 7" cased and cemented well in contact with a geological formation with a thermal conductivity of 3 W/m K, the thermal resistances after 5 years of operation for the rock, cement, casing, and pipe flow convection are, respectively, 2.2E-02, 2.1E-03, 2.9E-05, and 5.0E-5. The heat transfer is dominated by radial conduction through the rock, and all other thermal resistances are negligible in comparison. Using the chemical sealant described herein, there are no resistances to heat transfer from casing or cement, so the thermal efficiency is approximately 9% higher than prior art methodology. By enhancing the thermal conductivity of the bulk rock/sealant material, heat transfer can be increased further.

The alkali-silicate sealant can be further enhanced by incorporating a solid particulate that is formulated to become chemically embedded/bonded within the alkali-silicate precipitate, to improve seal performance and mechanical integrity. Reinforcing materials such as exfoliated fly ash, surface-activated graphene and graphene oxide, carbon fibres, and others may be incorporated into the drilling fluid. These may be in a nano-dispersed or micro-dispersed state and chemically bond with the precipitated silica.

After the initial seal is made while drilling, the integrity of the seal is tested. Typically, this is done by pressurizing the wellbore system and monitoring the rate of depressurization, if any, as is common in the industry. Another method is through long-term measurement of the leak-off rate during circulating operations. In this case, the drilling fluid is removed and replaced with the working fluid whose primary purpose is to transfer energy to surface, and the leak-off rate is measured during regular operations.

While the seal will be substantially complete after drilling, there may be some small areas with minor permeability remaining, such as fractured zones or highly permeable channels that were not sufficiently sealed while drilling. Therefore, the seal can be augmented using a chemical flush or treatment prior to commencing or returning to normal operations.

When employing alkali-silicate drilling fluid as described previously, the drilling fluid reacts with the in-situ formation fluid to gel and eventually solidify into a hard, high strength solid. These reactions happen at the mixing interface between the silicate drilling fluid and the formation fluid. In a high permeability channel or fracture, the drilling fluid may be migrating through the formation so quickly that the formation fluid is displaced away from the wellbore and the mixing interface is pushed substantially into the rock or the formation brine may be extremely fresh causing the silicate to gel but not completely precipitate.

In these scenarios, a partial or substantial seal is achieved deep within the rock, but the near-wellbore region contains "unspent" or unreacted liquid alkali-silicate drilling fluid and no further formation brine with which to react. Therefore, the purpose of the chemical flush is to pump a chemical treatment through the wellbore system with sufficient pressure to cause leak-off from the wellbore into the near-wellbore formation, contact the unspent liquid alkali-silicate remaining from the drilling process, and initiate the precipitation reaction. Suitable chemicals are calcium chloride brine, acids, $CO_2$, surfactants, esters, among others known in the industry.

In another embodiment to augmenting the seal, a chemical treatment may be pumped through the wellbore system with sufficient pressure to cause leak-off from the wellbore into the near-wellbore formation, where the chemical treatment consists of "plugs" or volumes of alkali-silicate followed by a reacting chemical consisting of calcium chloride brine, acids, $CO_2$, surfactants, esters, or others known in the industry. The two chemicals can be alternatively pumped several times resulting in substantial mixing in the near-wellbore region. The volumes of alkali-silicate and reactant may be separated with a spacer to prevent mixing within the wellbore or be in direct contact.

Turning to maintaining the seal and wellbore integrity during operation, the drilling process, as is commonly employed in the oil, gas, and geothermal industry, requires maintenance of wellbore integrity and a partial wellbore seal (i.e. a filter cake), for a temporary duration until casing is cemented in the hole or a liner is installed. The open hole (prior to installing casing or liner) wellbore integrity and partial seal is created by proper engineering and application of the drilling fluid.

In contrast, the invention disclosed herein requires maintaining an open hole seal and wellbore integrity for the operational life of the geothermal asset which is typically 50 years or more.

In addition to creating the seal while drilling and optionally augmenting the seal with a separate chemical treatment, the operational working fluid itself has a key role in maintaining the seal and maintaining wellbore integrity. The primary function of the working fluid is to transport energy from the subsurface rock to surface where it is directly used or converted into electricity or cooling. Therefore, the working fluid must have key physical properties for energy transfer and to maximize thermodynamic efficiency of the system. For example, the fluid may have at least one property selected from the group comprising:

a) a substantially nonlinear temperature enthalpy relationship within the lateral interconnection section between the inlet well and the outlet well at pressures greater than 10 MPa and temperatures less than 180° C. to maximize the temperature differential and heat transfer between the fluid and the surrounding downhole heat source;

b) capable of undergoing a pressure-sensitive reversible reaction which is endothermic at elevated pressure and exothermic at pressure lower than the elevated pressure;

c) a fluid mixture containing a chemical absorption reaction which is endothermic within the lateral interconnection;

d) an aqueous electrolyte solution with temperature and pressure dependent solubility, resulting in an endothermic effect within the lateral interconnection;

e) water-based fluid containing a turbulent drag reducing composition;

f) supercritical fluid such as $CO_2$;

g) ammonia-ethane mixture; and h) functional combinations of a) through g).

In addition to maximizing thermodynamic efficiency, the working fluid also has many properties of a drilling fluid, namely to:

i) transport solid particulates that may collect in the wellbore to surface where they are removed, typically with a settling tank, filter, or hydrocyclone;

ii) maintain a seal of the wellbore so that it is substantially impermeable to fluids; and iii) maintain wellbore stability and integrity.

In one embodiment, the seal may be maintained by providing solid particulates within the working fluid that form a filter cake along the borehole wall or bridge and plug natural fractures. These particulates may be carbon fibres, mineral fibres, cellulose fibres, silica, fly ash, graphite, graphene, graphene oxide, calcium carbonate, bentonite, or other particulates known in the industry. These solids are typically added at between 0.5 and 2.0 weight % of the working fluid if its water based, and equivalent volume concentration for other working fluids.

When employing alkali-silicate drilling fluid as described previously, the drilling fluid reacts with the in-situ formation fluid to gel and eventually solidify into a hard, high strength solid. These reactions happen at the mixing interface between the silicate drilling fluid and the formation fluid. In a high permeability channel or fracture, the drilling fluid may be migrating through the formation so quickly that the formation fluid is displaced away from the wellbore and the mixing interface is pushed substantially into the rock or the formation brine may be extremely fresh causing the silicate to gel but not completely precipitate. In these scenarios, a partial or substantial seal is achieved deep within the rock, but the near-wellbore region contains "unspent" or unreacted liquid alkali-silicate drilling fluid and no further formation brine with which to react. Therefore, another method to maintain a seal is to include a reactant additive that upon leaking-off from the wellbore into the near-wellbore formation, contacts the unspent liquid alkali-silicate remaining from the drilling process and initiates the precipitation reaction.

By definition, any areas of the wellbore where permeability remains after drilling will have had considerable influx of alkali-silicate and contain unspent liquid alkali-silicate in the near-wellbore formation. Therefore, including a reactant within the working fluid will naturally seal off the remaining permeable sections. Suitable chemicals are calcium chloride brine, acids, $CO_2$, surfactants, esters, and others known in the industry.

To maintain wellbore stability and integrity, in addition to sealing the rock, the working fluid must exert enough pressure on the formation to provide sufficient compressive strength to prevent breakouts, sloughing, and partial collapse of rock into the wellbore. The pressure that an operational working fluid provides can be calculated using an integrated thermodynamic wellbore model that includes an equation of state to account for phase changes, fluid property changes with pressure and temperature, and hydraulic frictional losses. When designed appropriately, the working fluid must supply the minimum compressive strength across the entire wellbore, either by applying a sufficiently high pressure at the top of the inlet well (pressurized fluid), or by modifying the density of the working fluid. Fluid density can be increased through addition of weighting agents such as barite or through soluble salts, among other techniques known in the industry.

Another method to maintain wellbore stability is to include a shale inhibitor chemical within the working fluid. This chemical has the function of arresting the hydration, swelling and disintegration of clays and shales, and is a common additive in drilling fluids. Suitable additives are amine-based chemicals, latexes, or an aqueous solution of potassium salts, among others known in the industry.

The combination of the above additives and functions results in a working fluid that not only transports energy to surface efficiently, but also reinforces and maintains the wellbore seal, "self-heals" any generated permeability, and maintains wellbore stability and integrity, to preserve a closed-loop geothermal wellbore system that is substantially impermeable to fluids.

Of critical importance is the requirement that the sealant additives do not interfere with the thermodynamic properties of the working fluid. In one embodiment, the working fluid consists of water, a commercially available corrosion inhibitor at between 1 and 10 L/m3, potassium bromide at between 0.05 and 0.3 mol/L, cetyltrimethylammonium surfactant at between 3 and 7 mM, sodium salicylate at between 8 and 16 mM, and calcium carbonate solid particulates at 0.5 weight %.

The solution described above maintains greater than 60% turbulent drag reduction over a temperature range suitable for direct-use geothermal heat supply, which is critical for thermodynamically efficient operation. It also has over 40% recovery when tested according to API RP 13i Procedures for Shale Dispersion by Hot Rolling, reacts with unspent alkali-silicate to form a strong solid material, and the calcium carbonate particles bridge and plug natural fractures and matrix permeability.

In another embodiment, the working fluid itself is simply a modified alkali-silicate brine.

In another embodiment, the working fluid is supercritical $CO_2$ which is of particular value since in many geothermal scenarios supercritical $CO_2$ has thermodynamic efficiency superior to water, and it is also an excellent reactant to cause alkali-silicate liquid to solidify into a strong solid material.

The various sealing mechanisms will now be delineated in the following examples.

Example 1

Chemical Sealing

Initial testing of the sealing capabilities of the silicate system was performed in a permeability plugging apparatus. Permeability Plugging Apparatus Tests:

20 μm, 3000 mD discs (provided by OFITE) were soaked in a 30% calcium chloride solution overnight (approximately 16 hours) in order to fully saturate the pores with the brine and create a 'severe case' in situ fluid for the silicate drilling fluid with which to react.

Permeability plugging tests (PPT) were run in accordance with OFITE Instruction manual and API RP 13i— Recommended Practice for Laboratory Testing of Drilling Fluids—

Figure 2:
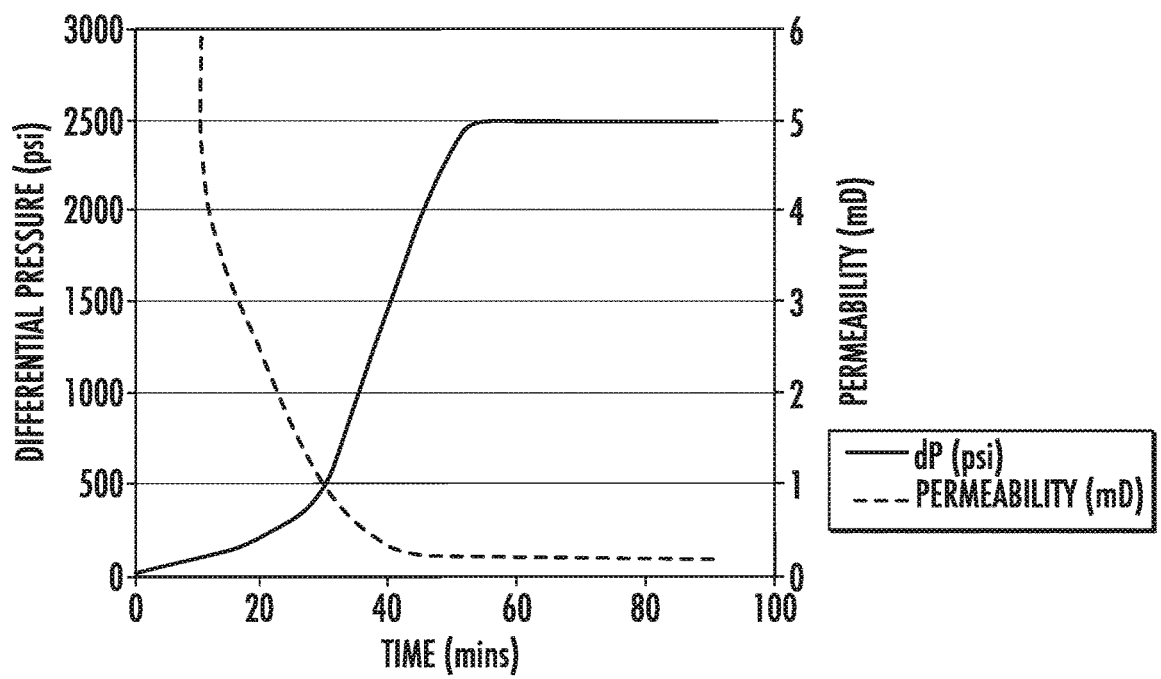
FIG. 2 is graphical representation of differential pressure and permeability data as a function of time for the chemical sealing core flood test delineated in Example 1.

250 mL of the test fluids described below was transferred to the PPT cell and a pre-soaked disc was placed in the apparatus. The drilling fluid was allowed to contact the disc for 45 minutes prior to pressurizing the apparatus and beginning the test The tests were performed for 30 minutes at room temperature and 500 psi Filtrate volume was recorded after 1, 5, 7.5, 15, and 30 minutes FIG. 2 is a plot of some data that is typical of the test on a ¼" thick filtration disc. A polymer control fluid was flowed through and there is no material reduction of the filtrate volume. When different types of silicates were added, the filtration rates were slowed drastically as precipitation occurred. Note that the permeability has been nearly eliminated even in a ¼" thick disk with 3000 mD of permeability.

Fluid Preparation:

1000 mL of 5 kg/m3 polymer fluid was prepared by mixing xanthan gum (Kelzan XCD™) into fresh water for approximately 30 minutes using a Silverson Mixer at moderate shear rate.

The control fluid was the polymer fluid above.

Formulation A, 30 mL of Ecodrill™ 317, a commercially available product from PQ Corporation, was combined with 270 mL of the polymer fluid above to produce a 300 mL portion of 3% active soluble potassium silicate.

Formulation B, 30 mL of Ecodrill™ K45, a commercially available product from PQ Corporation, was combined with 270 mL of the polymer fluid above to produce 300 mL portion of 3% (V/V) active soluble silicate.

The total PPT Volume was 273.8 mL for the Formulation A, a spurt loss of 257 mL was calculated, and a Static Filtration Rate of 3.1 mL/min was calculated. The total PPT Volume was 103.8 mL for the Formulation B, a spurt loss of 103.8 mL was calculated, and a Static Filtration Rate of 3.7 mL/min was calculated. Values calculated using formulas expressed in API 13i.

Core flood/regain permeability/core damage studies were also conducted. These types of tests are often used to study the effects of a drilling fluid or drilling fluid additive on the permeability of a core obtained from a target production zone of interest. Usually the object of the study is to minimize the damage or maximize the regain permeability. An initial permeability is established and measured by saturating the core with native brine, oil, or some brine/oil mixture, and flowing the formation fluid(s) through the core at pressure at reservoir pressure and temperature conditions. A test fluid is then injected across the face of the core for a certain period of time the volume of filtrate, invasion of fluid, and thickness of filter cake may be measured. Formation fluids are then injected in the reverse direction of flow to determine the extent to which the permeability may have decreased or even increased after exposure to the test fluid. In this study, the aim was to damage the cores by means of gelation and precipitation reactions of the silicate test fluids with the synthetic brine-saturated cores.

Core flood/regain permeability/core damage studies were carried out as follows:

Berea Sandstone cores with permeability approximately 30 mD were saturated with synthetic brine under vacuum and tested with a 3% solution of potassium silicate and containing 2% of a specialty lubricant.

Test procedures, parameters and results are set forth below.
Procedure:
1) Plugs were weighed and pre-saturated with brine for 1 week under 15 inHg vacuum.
2) Placed in core flow and permeability to brine was measured.
3) Potassium silicate mud was mixed and heated to 95° C.
4) Mud is injected into core at continuous rate of 3 mL/min.
5) Pressure is monitored over time.
6) Differential pressure builds exponentially over time until ~2500 psi. Breakthrough of fluid is observed.
7) The core does not completely plug off, however ~99% of permeability is lost.
8) Effluent is collected to determine fluid displacement (depth of invasion).

Parameters:
Instrument: Chandler Formation Response Tester
Core Plug: 1.5"×3.0" Sandstone
Temperature: 95° C.
Test Fluid: Potassium silicate at 3% with 2% lubricant
Pore Volume: 16.78
Initial Permeability: 28.32 mD to brine
Permeability after mud treatment: 0.197 mD
Permeability Reduction: >99%
Flow rate: 3 mL/min
Brine composition:
NaCl—230.303 g
$CaCl_2$—79.054 g
KCl—8.346 g
$MgCl_2$—13.79 g Shale dispersion testing was then executed to determine the ability of alkali-silicate solutions with lubricant to seal and provide mechanical integrity to shale samples. The methodology is according to API RP 13i Procedures for Shale Dispersion by Hot Rolling as follows:

an approximately 2 kg piece of Pierre Shale was crushed to yield approximately 900 g of −5/+10 Mesh (2-4 mm) pieces. Pierre Shale is much more reactive and susceptible to water than the mature, hard shale formations typically present at the depths suitable for geothermal. It was chosen as a conservative baseline, actual performance with mature shales will be better.

The −5/+10 mesh pieces were sieved using ASTM sieves and a Ro-Tap sieve shaker for 2 minutes Approximately 10 g of shale was placed in 250 mL of test fluid The samples were rolled for 24 hours at 120° C.

The samples were then poured into a 20 mesh screen after rolling

Aging cells were rinsed with inhibited fluid (7% KCl) to dislodge any material adhering to the inside walls The total amount of material recovered on a 20 mesh was dried to a constant mass at 100 C in an oven Each sample was then re-sieved and the mass of the −5/+10 fraction was recorded Results for several different fluid formulations are presented below.

| No | Sample | Initial Mass (g, −5/+10 mesh) | Total Recovered Mass (g) | Recovered Mass (g, −5/+10 mesh) | % Recovery |
|---|---|---|---|---|---|
| 1 | Water | 10.025 | 2.027 | 0.113 | 1.1 |
| 2 | 3% (v/v) Potassium Silicate | 10.041 | 9.895 | 9.799 | 97.6 |
| 3 | 3% (v/v) Potassium Silicate + 2% Lubricant | 10.007 | 10.164 | 9.657 | 96.5 |
| 4 | Mineral Oil | 10.011 | 9.251 | 8.501 | 84.9 |
| 5 | 7% KCl | 10.054 | 9.015 | 7.307 | 72.7 |
| 6 | 10 L/m³ Amine | 10.002 | 6.961 | 5.759 | 57.6 |
| 7 | Working Fluid Composition | 10.175 | 7.102 | 4.514 | 44.4 |

Recovery of over 97% is achieved, indicating excellent sealing and strengthening of the shale. Mineral oil has no reactivity with shale, yet only recovered ~85% of the mass. The loss of mass is due to mechanical degradation during rolling. Therefore, the high 97% recovery indicates that not only is a chemical seal form, but a mechanical hardness improvement is also realized. The working fluid with shale inhibitor added also has a 44% recovery which is substantially improved from fresh water which has only a 1% recovery.

Example 2

A working fluid was tested consisting of water, a commercially available corrosion inhibitor, potassium bromide, cetyltrimethylammonium surfactant, sodium salicylate, and calcium carbonate solid particulates at 0.5 weight %.

Measurement of pressure drop (i.e., drag) and characterization of the turbulent flow was tested using a 2" 200 L capacity heated flow. The loop is equipped with a centrifugal (GIW, LCC-M 50-230) and a progressive cavity (Moyno™, 2F090) pump with high and low shear, respectively. The maximum Re number reaches 500,000 and the loop can operate with 15% volumetric concentration of solid. Pressure drop was calibrated with fresh water and compared to frictional pressure drop at the same flow rate using the working fluid. A turbulent drag reduction of 63% was achieved over a temperature range suitable for direct use heat applications.

To test reactivity with unspent alkali-silicate in the near-wellbore, Ecodrill™ 317, a 29.1% active solution of 2.5 ratio $SiO_2$:$K_2O$ was mixed into samples of the working fluid. NaOH was used to adjust to a pH of 11-12, and the alkali-silicate solution was injected into samples of the working fluid under gentle agitation to produce a 3% (v/v) and 1 (v/v) solution. These low concentrations were chosen to conservatively represent the near-wellbore unspent alkali-silicate drilling fluid. In each case the addition of the silicate solution into the working fluid caused precipitation, and after 24 hours the silicate was solidified. The results demonstrate the working fluid will reinforce and augment the wellbore seal so that it is substantially impermeable to fluids.

To assess the ability of the working fluid to maintain wellbore integrity and stability, a modified shale dispersion test was performed. The test methodology involves 2 shale dispersion runs back-to-back with the same sample. First, the sample is hot rolled in the sealant, as described above, then re-soaked in the working fluid to determine shale mechanical strength and chemical isolation after sealing. After the initial shale dispersion run with the drilling fluid sealant, the samples are dried, weighed, and immersed in the working fluid chemistry and rolled for 24 hours.

The samples were then poured into a 20 mesh screen after rolling, and the total amount of material recovered on a 20 mesh was dried to a constant mass at 100 C in an oven. Each sample was then re-sieved and the mass of the −5/+10 fraction was recorded and compared to the mass of the sample after sealed and dried. Interestingly, the results from multiple runs showed over 96% recovery of mass, indicating excellent ability of the working fluid to maintain wellbore integrity.

Example 3

Mechanical Method

In one embodiment, the mechanism may be effected by adding solid particles to the drilling fluid which migrate naturally into the pore space/fractures to reduce permeability. This is generally known as loss circulation material (LCM).

The solid particles may be granular materials, fibrous materials and flaked materials and combinations of these and be present (dispersed through drilling fluid) in sizes necessary to reduce permeability. Suitable sizes may be nanometer to millimeter in size.

Abrams' rule and/or Ideal Packing Theory concepts are useful to establish the most suitable materials. Abrams' rule proposes particle size of the bridging agent should be equal to or slightly greater than ⅓ the medium pore throat size of the targeted formation.

The ideal packing theory proposes a full range of particle size distribution to effectively seal all voids, including those created by bridging agents.

Particles may also be sized to penetrate into the pore space before bridging.

Additionally, drill cuttings can augment the LCM and serve as plugging material.

Any of these LCM products could be utilized for remediating wellbore leaks after the drilling process is completed. Further viscous sweeps with LCM may be pumped at a reduced rate through the open hole section to allow invasion of the LCM and seal any leaks.

Finally, solid silicates (possibly encapsulated) may also provide an effective chemical/mechanical combination mechanism for sealing the reservoir.

Example 4

Biological Method

Microbial Enhanced Oil Recovery (MEOR) is an engineering field which manages the design, growth, and stimulation of microorganisms to increase oil recovery. Most deep geological formations contain anaerobic bacteria within the pore space. These bacteria have a very low supply of energy and nutrients compared to near-surface microbes, and thus have low population densities.

One MEOR technique is to treat the indigenous microbes with nutrients to spur their growth and eventual plugging of the rock porosity with biological material. The nutrients may be any chemistry but typically include potassium nitrate and monosodium phosphate. As bacteria growth is exponential, if supplied with sufficient raw materials and suitable conditions, bacteria can be induced to grow and completely plug off the pore space in which they reside, causing the rock to be substantially impermeable to fluids.

Another technique is to introduce new microbes to the rock formation and simultaneously supplying them with nutrients. These microbes may be engineered to grow only at a certain temperature and so can be activated by injecting into a hot formation.

Either technique can be applied to a conventional drilling fluid, causing the rock to be substantially impermeable to fluids, and form a closed-loop geothermal system.

Example 5

Thermal Method

Geological formations have varying chemistry and thus, varying melting points, although most sedimentary formations melt at 1200° C. or below. Several technologies are in the research, development, and testing phase which can penetrate through rock using thermal disintegration rather than mechanical contact.

One method is to create a plasma either through electric current or nuclear power. The plasma melts the rock and enable continuous drilling.

Another method is to fire lasers onto the surface of the rock, increasing the temperature until the rock begins to spall, disintegrate, and eventually melt.

Another method is to fire high velocity projectiles which release enough energy on impact to increase temperature by hundreds of degrees.

Each of these techniques have the ability to melt porous and permeable rock while drilling, which can then be cooled and annealed to form a hard, durable barrier substantially impermeable to fluids.

Having discussed the method details of the technology, reference will now be made to specific implementations with reference to the figures.

Referring now to FIG. 1, shown is a graphical representation of filtrate volume as a function of the square root of time for different formulations.

FIG. 2 is a graphical representation of differential pressure and permeability data as a function of time for the chemical sealing core flood test delineated in Example 1.

Figure 3:
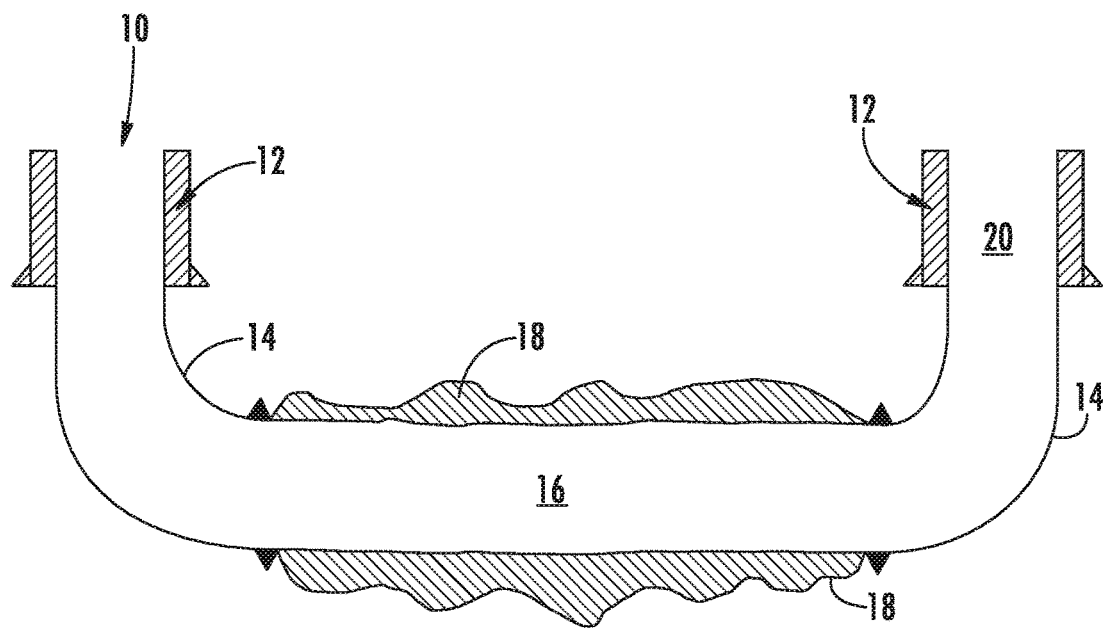
FIG. 3 is a schematic cross section illustration of a well sealed without casing in the lateral section between the inlet well and outlet well.

FIG. 3 is cross section of a well having an inlet well 10 having surface casing 12 for groundwater protection. Intermediate casing 14 is cemented into position as illustrated. All of these components are known in the art. Extending from intermediate casing 14 is the lateral section 16 which does not include casing in this example, but rather is the open sealed wellbore. Pore space surrounding the lateral section 16 is sealed with sealant as described herein previously. The sealed pore space is referenced by numeral 18. the sealed lateral section is continuous to intermediate casing 14. The latter casing then continuously connects with outlet well 20. The outlet well is completed with casing 12.

Figure 4:
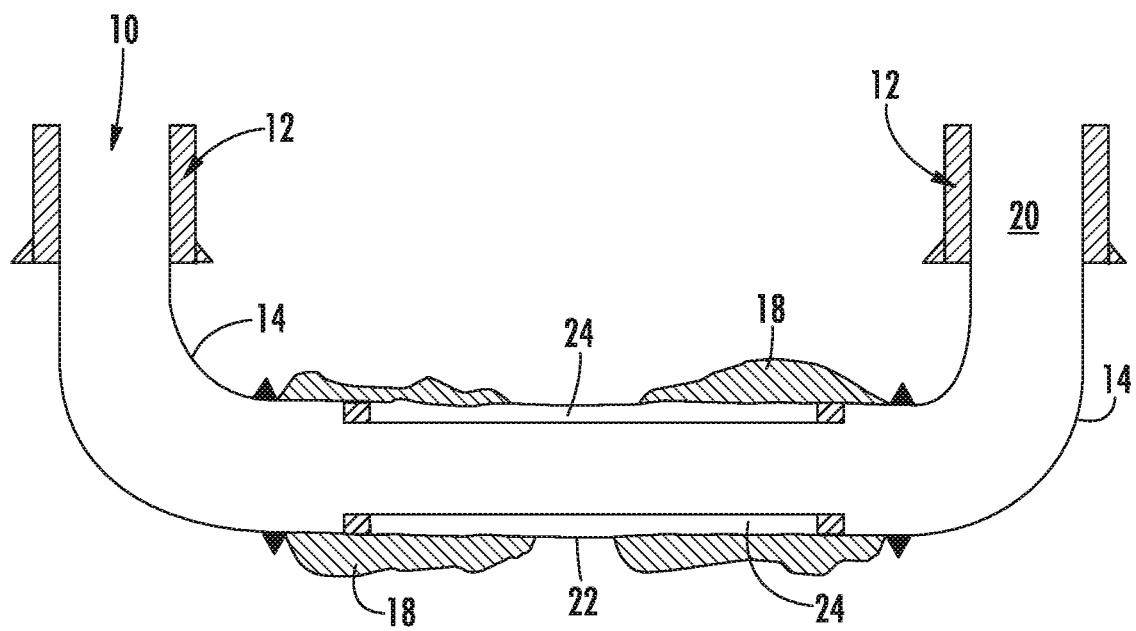
FIG. 4 is a similar view to that of FIG. 3 illustrating a casing string segment in the lateral section and the relationship with the sealant therewith.

FIG. 4 illustrates an alternate scenario. In this example, the lateral section 16 may be intermittently sealed resulting in unsealed rock face 22. In this situation, a casing 24 is shown as a liner, meaning lacking cementing. The liner 22 thus ameliorates the unsealed rock face and maintains a continuous circuit from the inlet 10 to the outlet 20. This may be used in conjunction with continuously sealed sections. This will depend upon the specific geology of the formation.

In respect of the sealed areas in porous or fractured rock, the sealant is not fused with the rock face, but rather is embedded within the rock in the chemical example discussed supra. Generally, FIGS. 2 and 3 depict hard rock.

Figure 5:
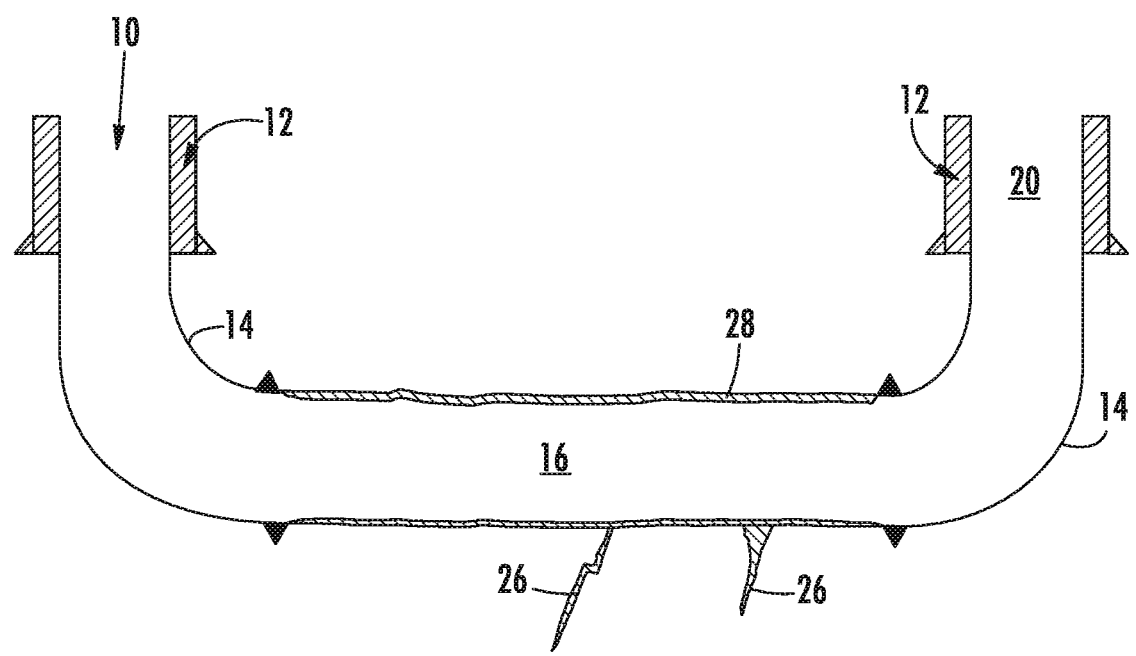
FIG. 5 is a similar view to that of FIG. 4 illustrating a sealed wellbore arrangement in a negligible permeability formation with fissures.

Referring now to FIG. 5, shown is an example where the well is disposed within a less permeable section within a formation, an example of which is a sedimentary shale or mudstone section. In this scenario, the formation may have infrequent fissures, fractures, cleave planes etc. generally denoted by numeral 26. A chemical liner 28 may be employed to complete the continuity between the inlet 10 and the outlet 20 with the chemical liner composition 28 filling the fissures, fractures and cleave planes as shown.

Figure 6:
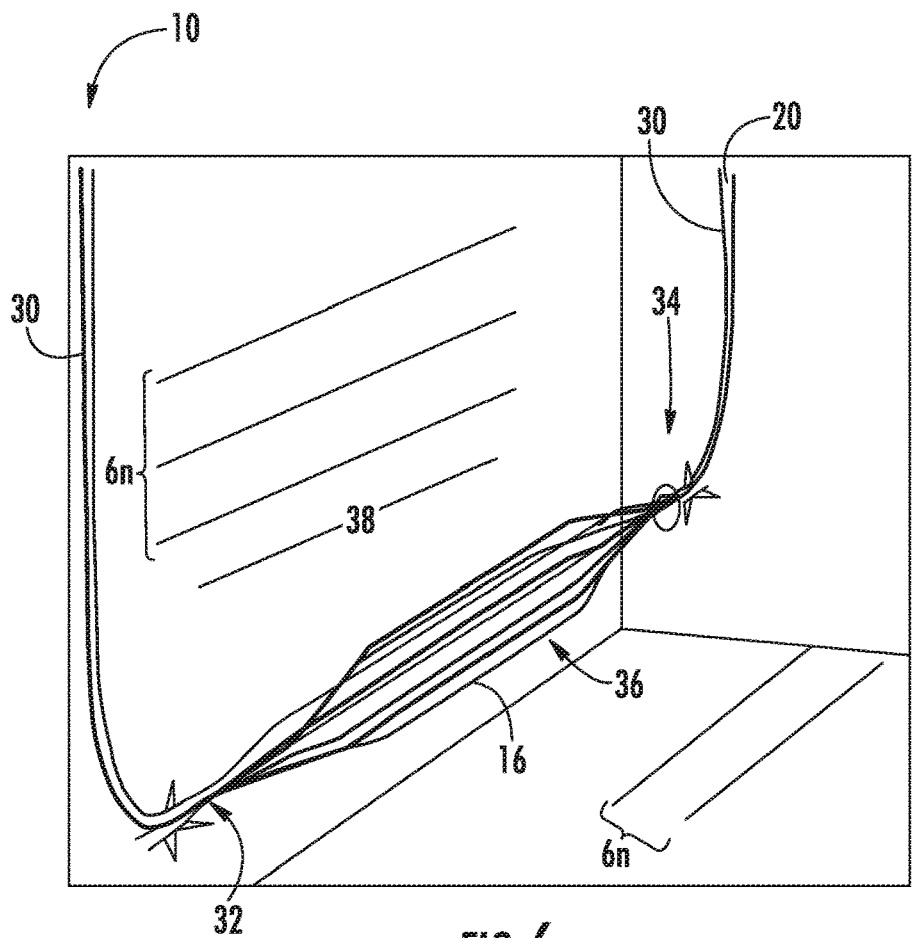
FIG. 6 is a schematic illustration of a multilateral arrangement of lateral interconnecting well segments.

Turning to FIG. 6, a first example of a well configuration is shown. In the example, each of the inlet 10 and outlet 20 include conventional cased sections 30 which communicate with the inlet 32 and outlet 34 of a multiple lateral well system 36. The system is disposed within a geothermal formation 38. The system 36 includes a plurality of lateral wells 16, which may be partially cased depending upon the situation as outlined with respect to FIGS. 3 and 4. Any number of well systems 36 may be employed in the formation 38. This is represented by numeral 6*n* vertically and horizontally, with the "n" being indicative of any number of further wells in the shape of the system 36 or any other suitable configuration.

The inlet 32 and outlet 34 are integrated with the cased sections 30 in a multilateral junction which will now be referenced in the advancing Figures.

Figure 7:
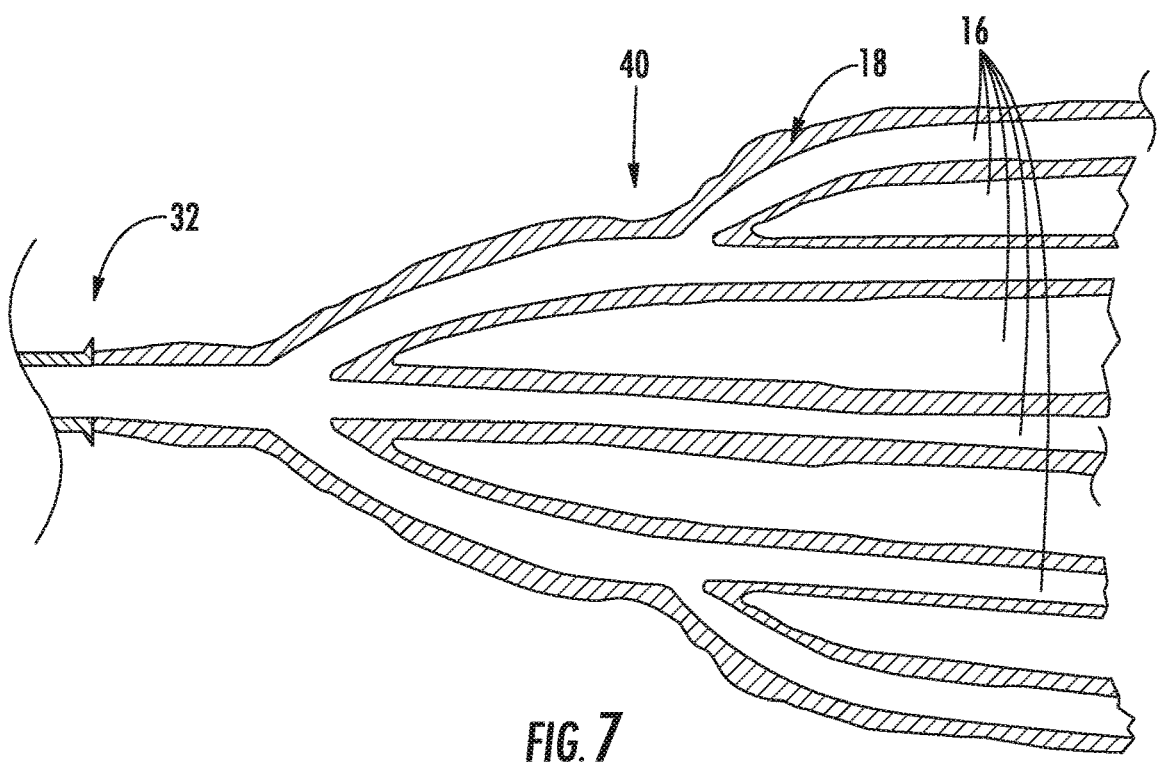
FIG. 7 is an enlarged schematic illustration of a sealed multilateral wellbore section referenced in FIG. 6.

FIG. 7 illustrates one possible multilateral arrangement. Inlet 32 connects with a sealed multilateral wellbore junction 40 from which the lateral sections 16 continuously extend. The lateral sections 16 are spaced apart from one another to maximize thermal recovery from within the formation 38 (FIG. 6). The lateral sections 16 may include casing as discussed with respect to FIGS. 3 through 5. The outlet 34 of the system 36 will include a similar junction 40 (not shown).

Figure 8:
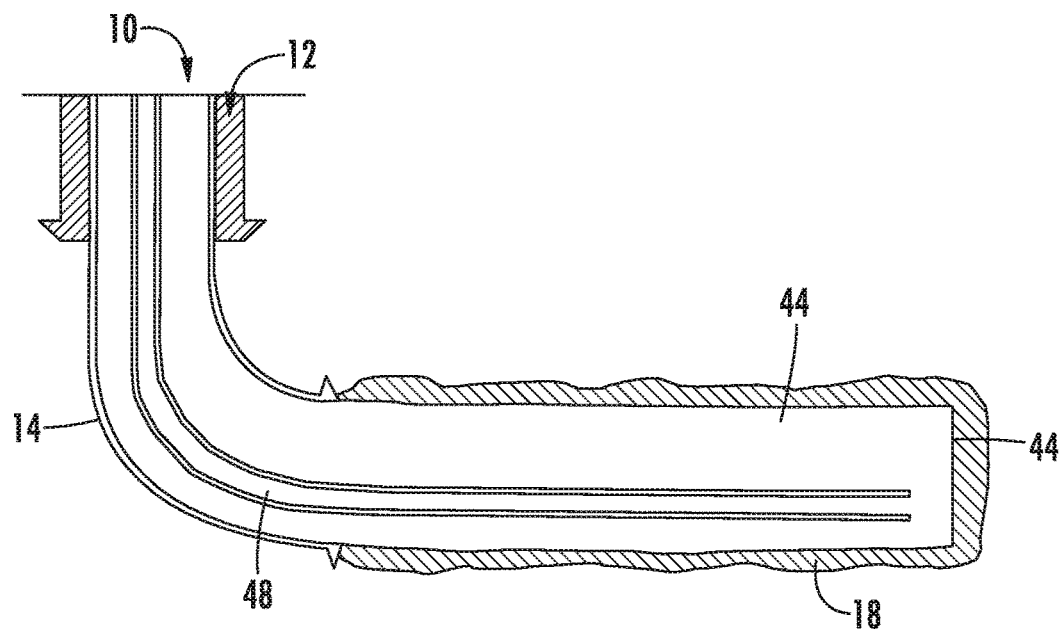
FIG. 8 is a schematic illustration of an alternate geothermal well configuration.

Turning to FIG. 8, an L-shaped well configuration is shown, generally denoted by numeral 42. In this example, the well has an extending section 44 having a terminal end 46 open hole wellbore sealed as with previous examples. An insulated tube 48, extends within the well for fluid delivery. The extending section 44 may be at any selected angle.

Figure 9:
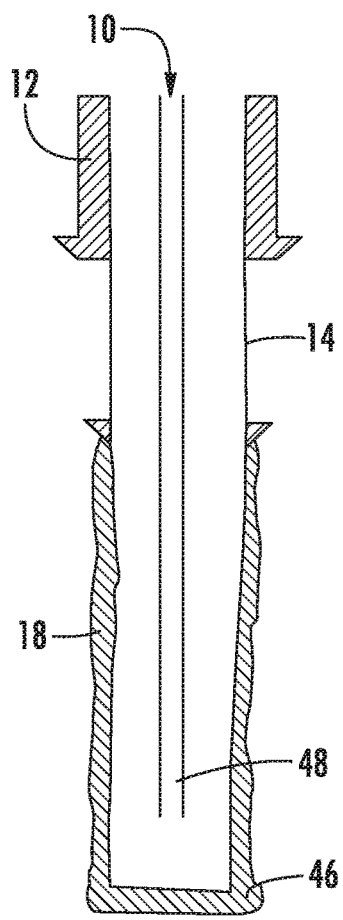
FIG. 9 is a schematic illustration another alternate embodiment of a geothermal well configuration.

FIG. 9 illustrates a vertical orientation example.

Figure 10:
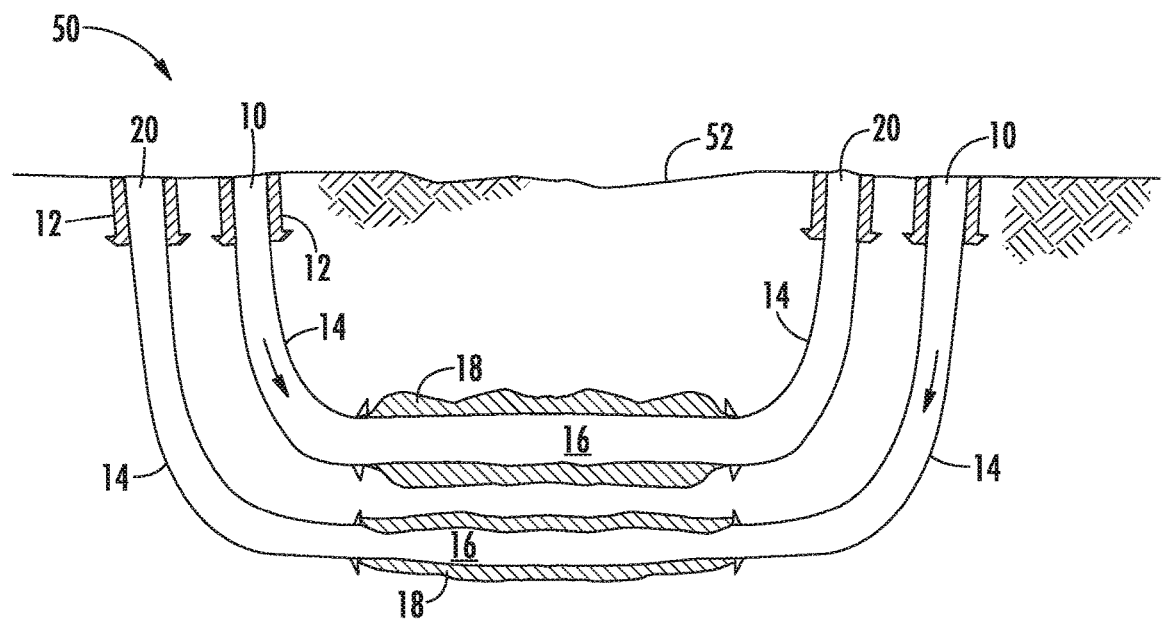
FIG. 10 is a schematic illustration another alternate embodiment of a geothermal well configuration.

In FIG. 10, a W-shaped well is provided represented by numeral 50. The surface is denoted by numeral 52. In this example, output from one well becomes the input of the other well. Flow direction is shown with the arrows. The pattern can be repeated for additional cycles. In this example, the open hole wellbores 16 are sealed as discussed with the previous figures and may incorporate alternating patterns of cased sections with simply sealed wellbore sections. This will depend on the formation geology.

Figure 11:
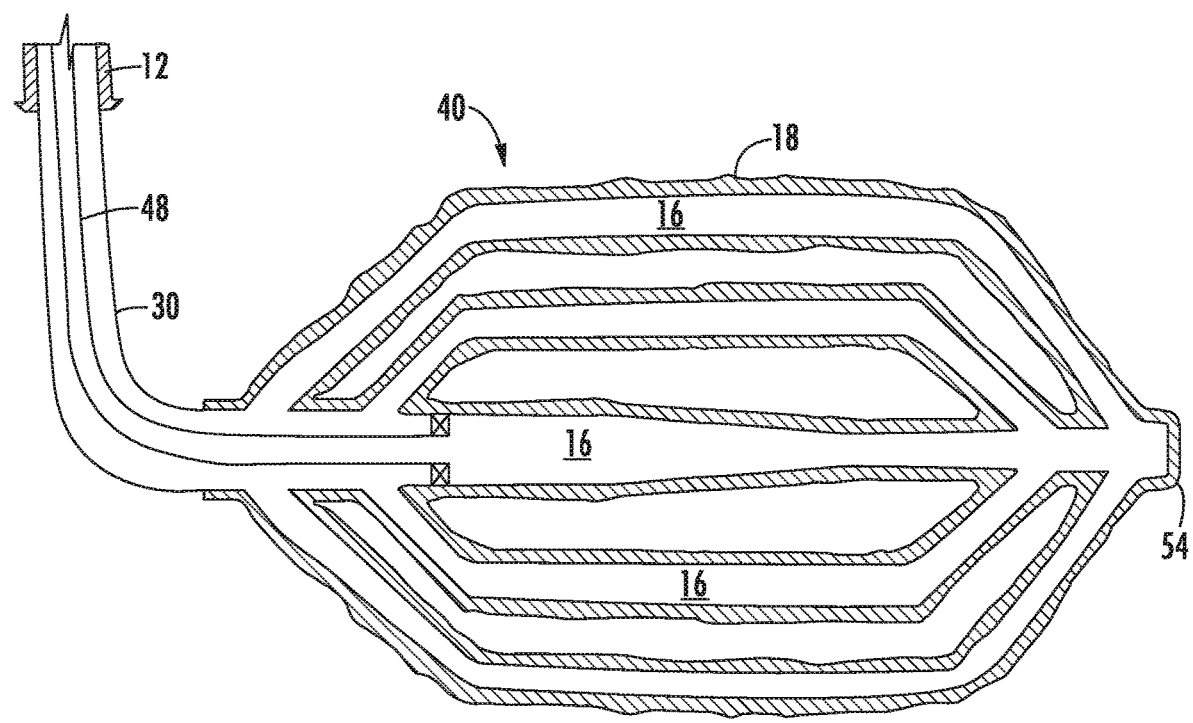
FIG. 11 is a schematic illustration another alternate embodiment of a geothermal well configuration.

FIG. 11 illustrates a further variation of a multilateral system similar to that initially referenced in FIG. 3, which combines the inlet and outlet conduits into a single wellbore, the disposition of the multilateral section may be at any angle within a formation. In this example, the lateral sections 16 converge at terminal end 54.

Figure 12:
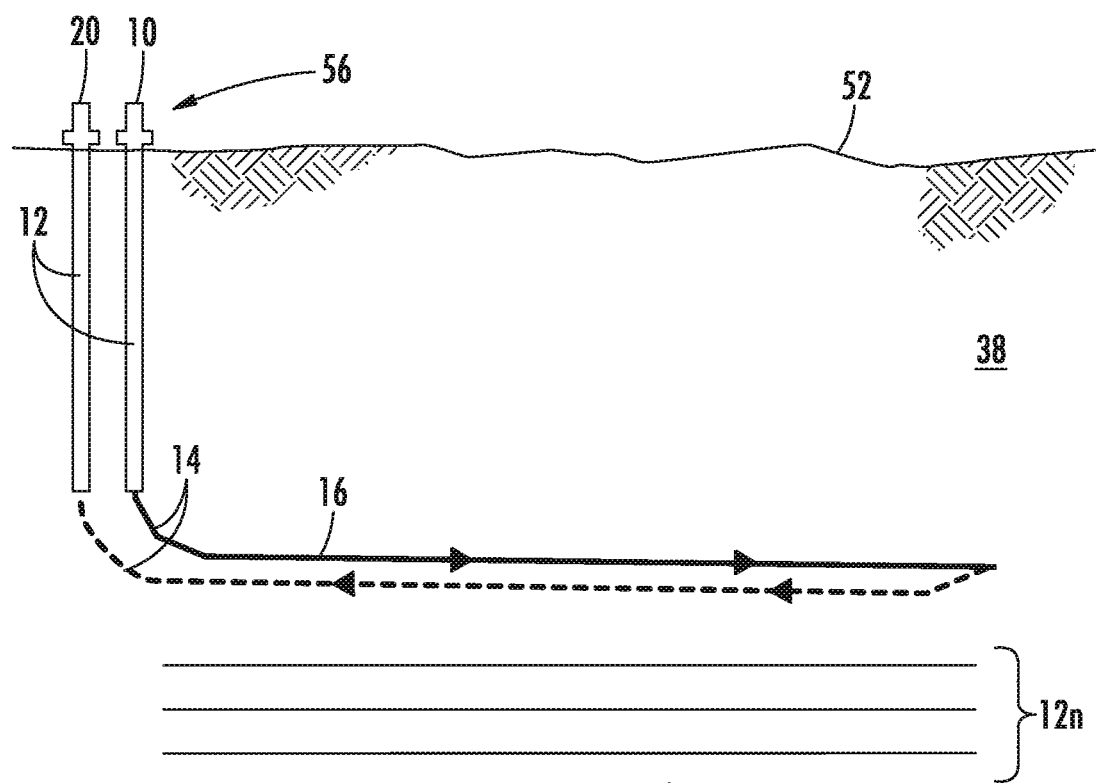
FIG. 12 is a schematic illustration another alternate embodiment of a geothermal well configuration.

FIG. 12 is a side view of a single site arrangement 56 where the inlet well 10 and outlet well 20 are generally proximate. The fluid circuit is shown for the lateral sections 16. As with the previous examples, the open hole well bores are sealed while drilling is conducted with the surrounding pore space sealed during the procedure. The numeral 12*n* carries the same meaning as that ascribed to 6*n* referenced in FIG. 6.

Figure 13:
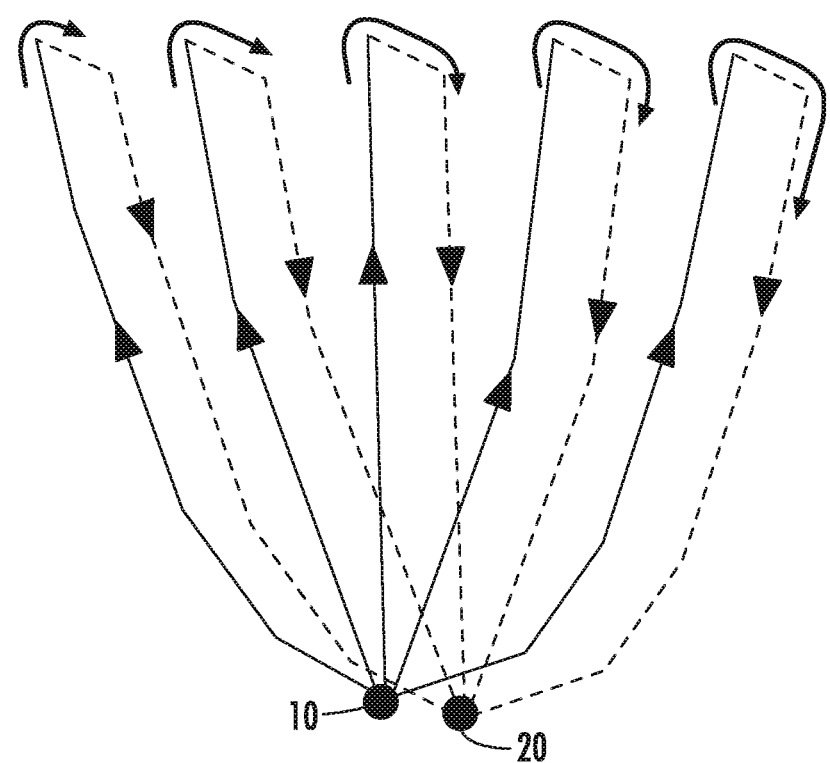
FIG. 13 is a top view of FIG. 12.

A further variation is illustrated in FIG. 13. A top view is shown of a multiple lateral well arrangement. The individual wells 16 of the plurality shown, share a common inlet well 10, extend out within the geothermal zone of the formation (not shown in this Figure) and return in a closed circuit to a common outlet well 20. Flow direction is shown with arrows, and flow can be isolated to each individual loop or daisy chain among the separate loops. This is advantageous for a small footprint while allowing for maximum thermal mining within a geothermal zone.

Figure 14:
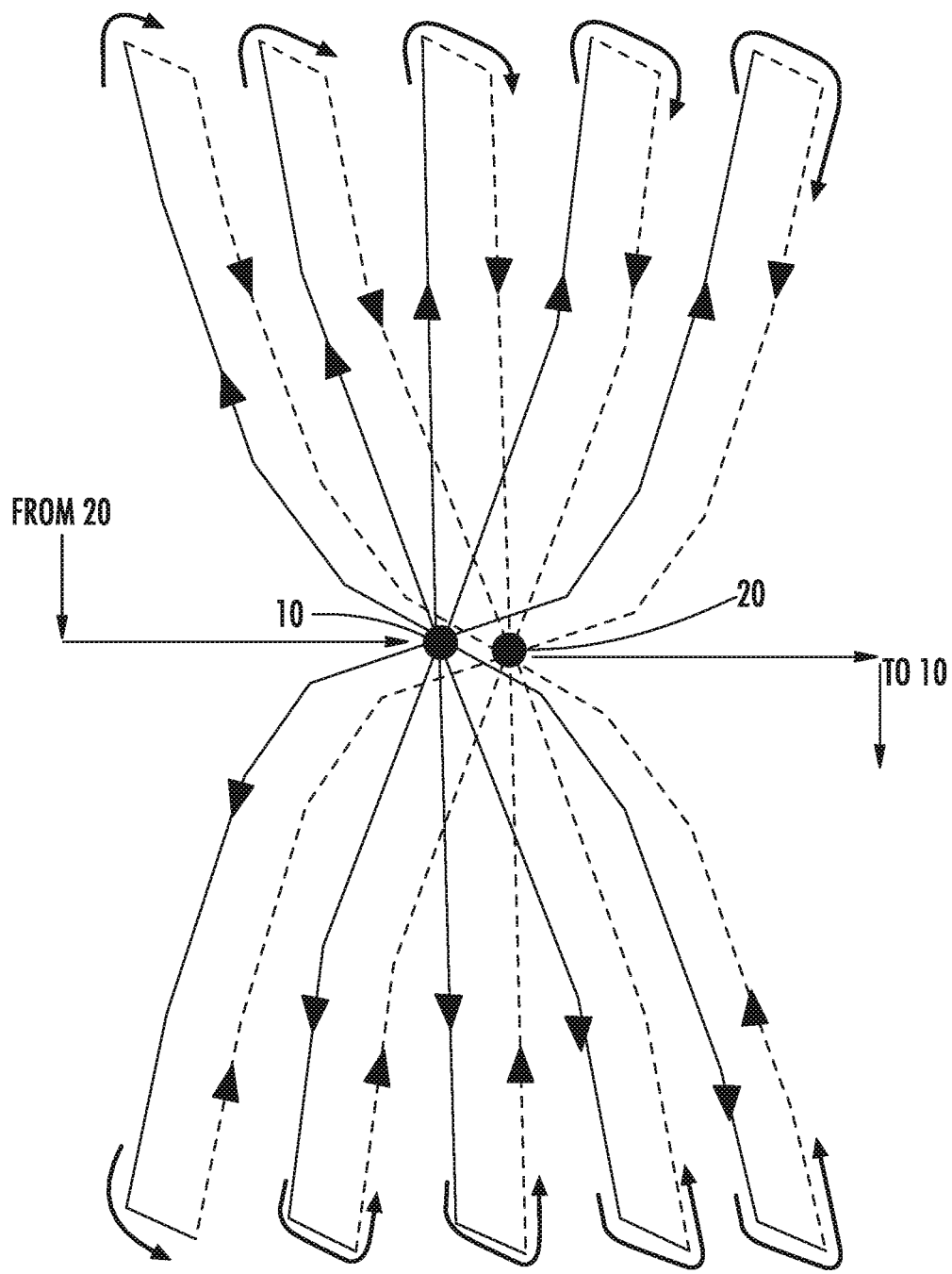
FIG. 14 is a schematic illustration another alternate embodiment of a geothermal well configuration.

FIG. 14 depicts a further variation where there are plural well arrangements provided while maintaining the small footprint attributed to the embodiment of FIG. 13.

Figure 15:
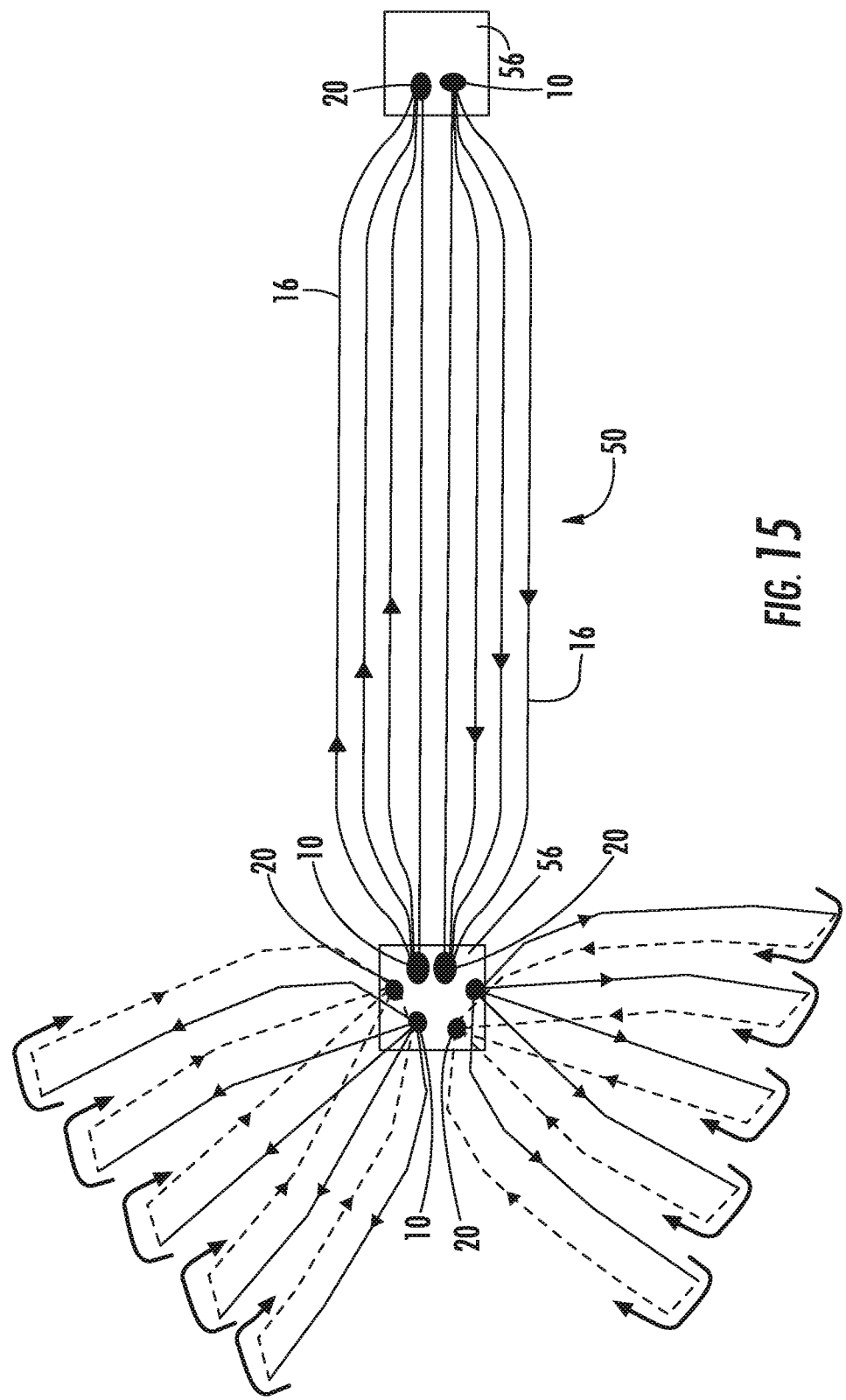
FIG. 15 is a schematic illustration another alternate embodiment of a geothermal well configuration.

FIG. 15 incorporates the multilateral well system 50 in combination with the well configuration initially presented in FIG. 13. In this configuration, two discrete single sites 56 can span a large area with minimal surface invasiveness to mine a large underground geothermal area. Flow direction is shown with arrows, and flow can be isolated to each individual loop or daisy chain among the separate loops. The effectiveness of the sealing technology discussed herein permits the flexibility to provide for such hybrid configurations. This, in turn, allows for thermal mining in a wide variety of geologic situations allowing for yet another degree of freedom in practicing the methods herein.

Figure 16:
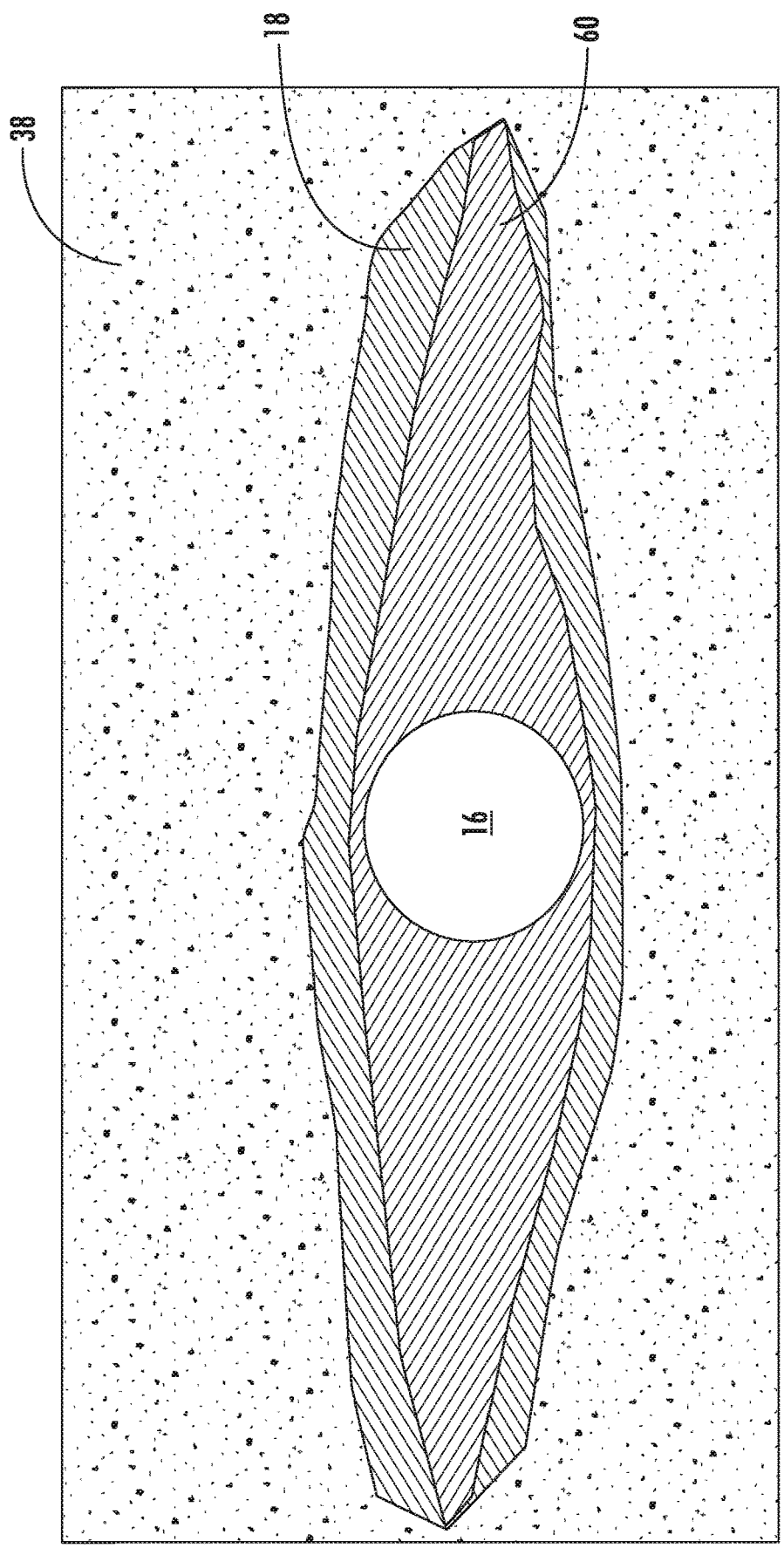
FIG. 16 is a cross section of a drilled wellbore within a high permeability formation illustrating the reserve of unreacted sealant.

In more focused detail, FIG. 16 illustrates a cross section of a drilled wellbore, also referenced herein as a lateral section 16. The geothermal formation 38 in this example is a high permeability formation. Due to the permeability, the sealant spreads out within the pore space in the formation and immediately proximate the wellbore 16 remains unreacted, referenced by numeral 60. Outwardly from the unreacted sealant area is pore space sealed with sealant which, as in the previous examples, is denoted by numeral 18.

Figure 17:
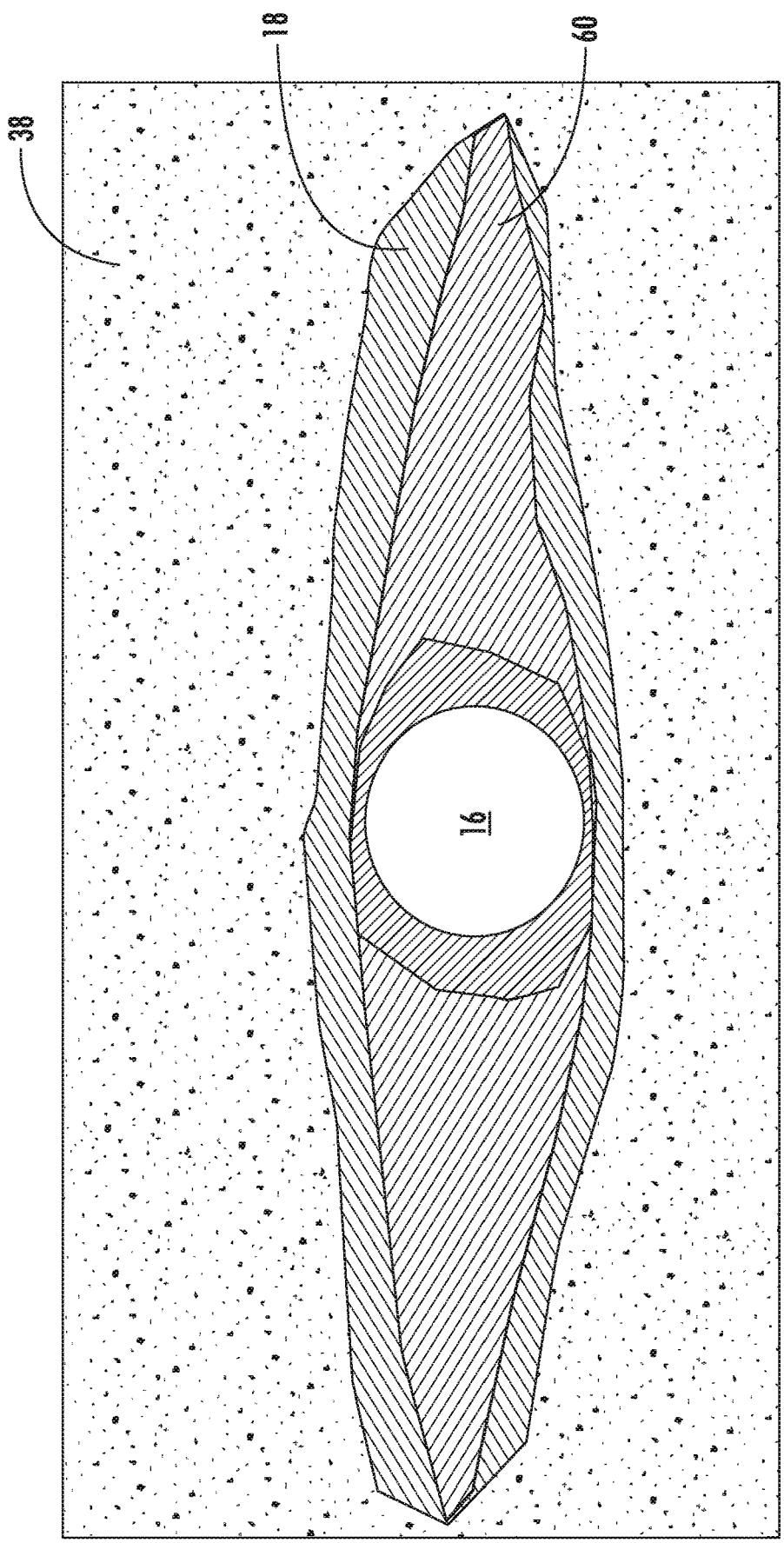
FIG. 17 is a view similar to FIG. 16 illustrating the transformation of the wellbore interface subsequent to circulatory contact with the working fluid.
Figure 18:
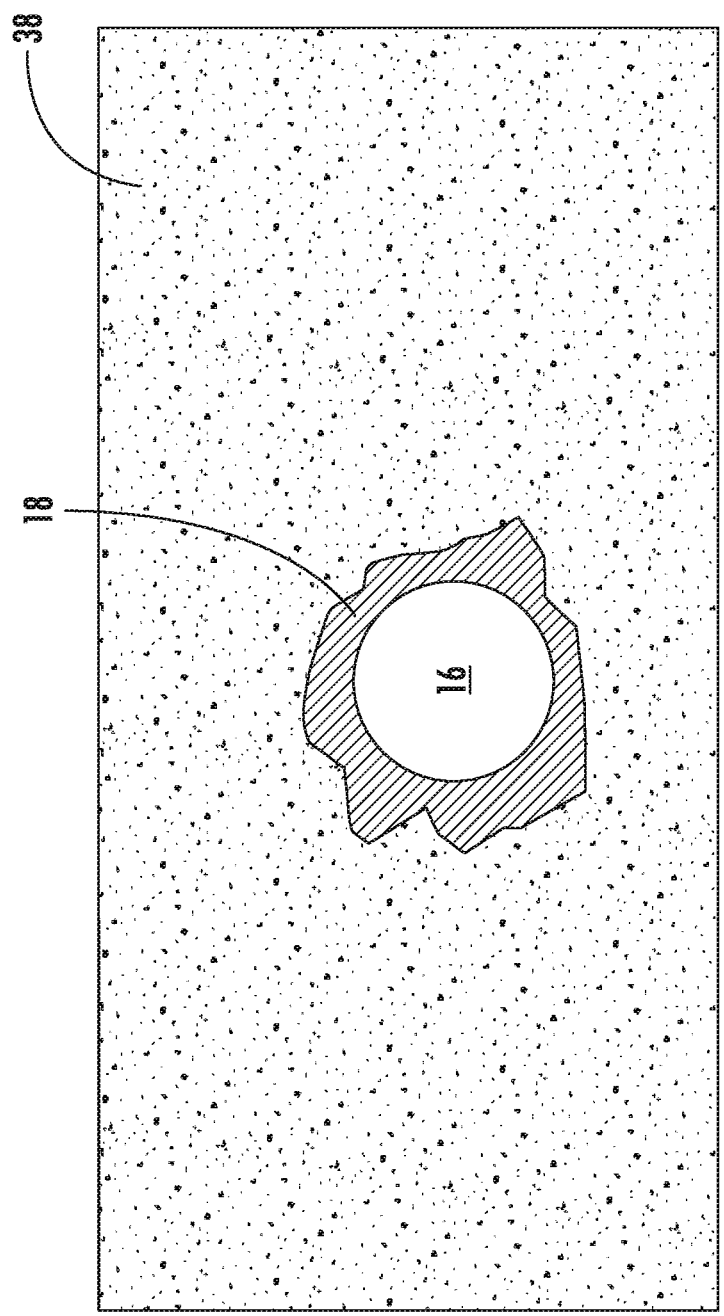
FIG. 18 is a schematic cross section illustration of a drilled wellbore in a low permeability formation and the interface with the surrounding formation.

FIG. 17 illustrates the result of exposing the wellbore from FIG. 16 to working fluid. Subsequent to this treatment, the formation area surrounding the wellbore becomes sealed forming an impervious interface between the interior volume of the wellbore itself and the formation surrounding it. This is particularly advantageous since the sealed wellbore 16 is surrounded by a reserve of unreacted sealant 60. In the event of wellbore seal compromise from seismic activity or other deleterious activity, the wellbore can sustain its integrity and sealing capacity by self-healing with the reaction between the reserve of available reactant and the working fluid. This clearly has very significant advantages in terms of reducing operating and maintenance costs over time which, of course, greatly mitigates the initial capital expenditure associated with initially synthesizing the well system.

In respect of rock with low or average permeability, an example of which is granite, mudstone, or shale, the pore space, fractures, fissures, cleave planes etc. may be filled with sealant about the periphery of the wellbore 16 to form an impervious interface in a single step without requiring reactive working fluid or further treatment. Accordingly, it will be realized that geological permeability does not present any geothermal heat mining issues considering the scope of the methods discussed herein.

As ancillary benefit, the technology can extend into the remediation and retrofit realms. One of the foundations of the technology herein is an environmentally friendly solution to energy creation in the geothermal field which circumvents fracturing necessitating unappealing fluid handling. A second foundation is that the technology provides a truly closed loop system as opposed to that which has been improperly characterized in the prior art as closed loop.

Since the technology allows for a highly effective sealing protocol with the enumerated geothermal recovery benefits, it has been found that the technology can be applied to remediating ineffective, unused or otherwise inoperable geothermal wells. These wells may be unusable or inoperable due to any number of issues such as low flow rates, ineffective fractures, unconsolidated formations and consequent sand production problems, excessive corrosion from the brine, or due leaching problems, among others.

Accordingly, where retrofit to a new non fracking geothermal arrangement as discussed herein is not possible, the inoperable site will be abandoned by removal of unnecessary casing and ancillary components, or where possible remediated with expensive and environmentally contentious operations such as fracking or potentially by redrilling entire wells. In light of the fact that permeability degree is not an issue, the sealing technology presents an attractive remediation benefit.

Regarding conversion or retrofit of existing geothermal wells, the pre-existence of the wells, allows for the technology to be deployed with significant economic advantages, eliminates the need for fracturing fluid management, induced seismicity, and environmental risks, and renders a retrofit site, previously widely recognized as an environmental unfriendly energy source, as a green energy platform from which to further build.

In terms of additional implementations of the technology scope, reference will now be made to the advancing figures.

Figure 19:
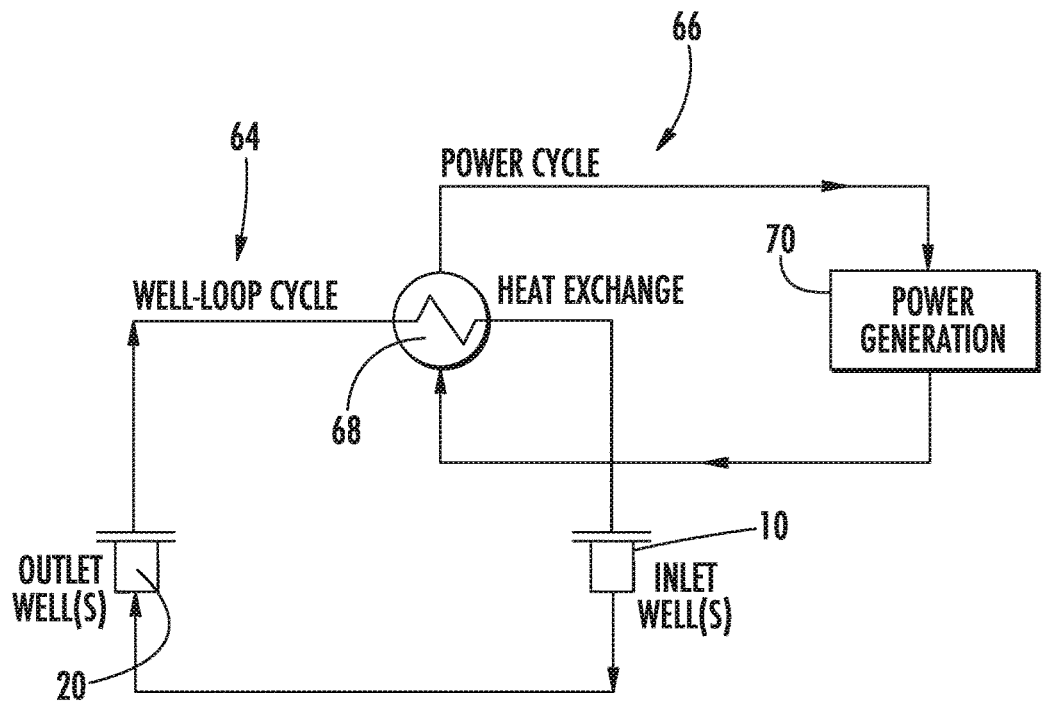
FIG. 19 is a schematic illustration of a power cycle implementation of the geothermal wellbore methodology.

In FIG. 19, the well loop 64 comprises a closed loop system having an inlet well 10 and an outlet well 20, disposed within a geological formation, which may be, for example, a geothermal formation, low permeability formation, sedimentary formation, volcanic formation or "basement' formation which is more appropriately described as crystalline rock occurring beneath the sedimentary basin (none being shown).

The well loop 64 and power cycle 66 are in thermal contact by heat exchanger 68 which recovers heat from the working fluid circulating in the loop 64 in the formation which is subsequently used to generate power with generator 70 in cycle 66. As an example, the temperature of the formation may be in the range of between 80° C. and 150° C., or it may be over 150° C. and even over 400° C.

In the arrangement illustrated, two distinct working fluids are used. Further detail concerning the fluids will be discussed herein after. Modifying the working fluid used within the well loop operation of the system is possible at low ambient temperatures.

As such, currently available power generation modules usually limit the input temperature of the power cycle working fluid to above 0° C. in the primary heat exchanger. A higher turbine pressure ratio is enabled by dropping the working fluid temperature below zero. However, conventional geothermal projects are limited by potential freezing of the geothermal fluid on the other side of the heat exchanger.

These limitations in present technology are traversed by implementing a segregated power cycle system in combination with a closed loop well.

The fluids may be modified with additives to prevent freezing at sub zero ° C. temperatures. Suitable additives include, anti-scaling agents, anti-corrosion agents, friction reducers, and anti-freezing chemicals, refrigerants, biocides, hydrocarbons, alcohols, organic fluids and combinations thereof.

A substantial benefit of the tailored well-loop working fluid in combination with the segregated power cycle is that it is unaffected by very cold ambient temperatures and thus facilitates use of any generic power cycle (including ORC, Kalina, carbon carrier cycle, CTPC) to be used to increase higher net power production when used in conjunction with a well loop as set forth in FIG. 19. In this arrangement heat is transferred from the first working fluid to the second working fluid when the temperature of the second working fluid is at zero ° C. or sub zero ° C.

Figure 20:
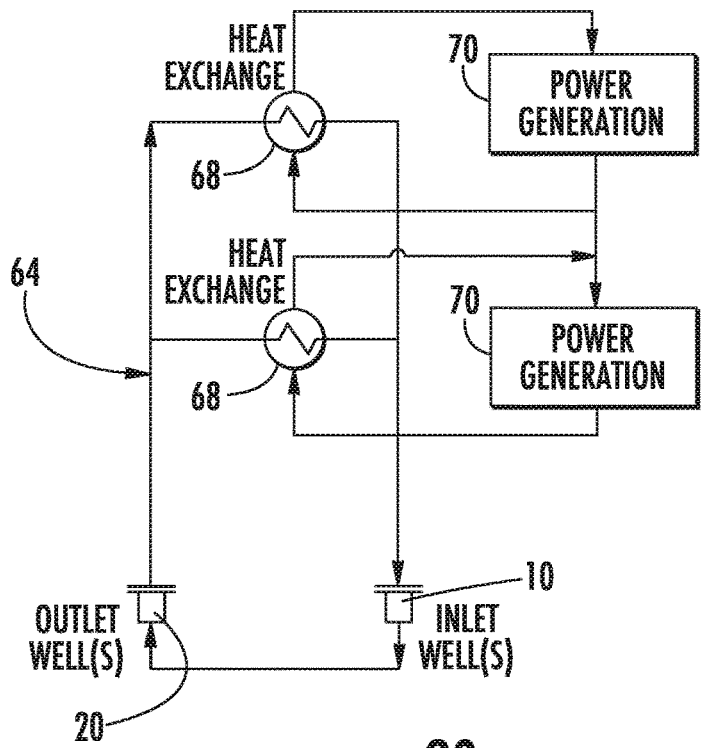
FIG. 20 is a schematic illustration of an alternate embodiment of FIG. 19.
Figure 21:
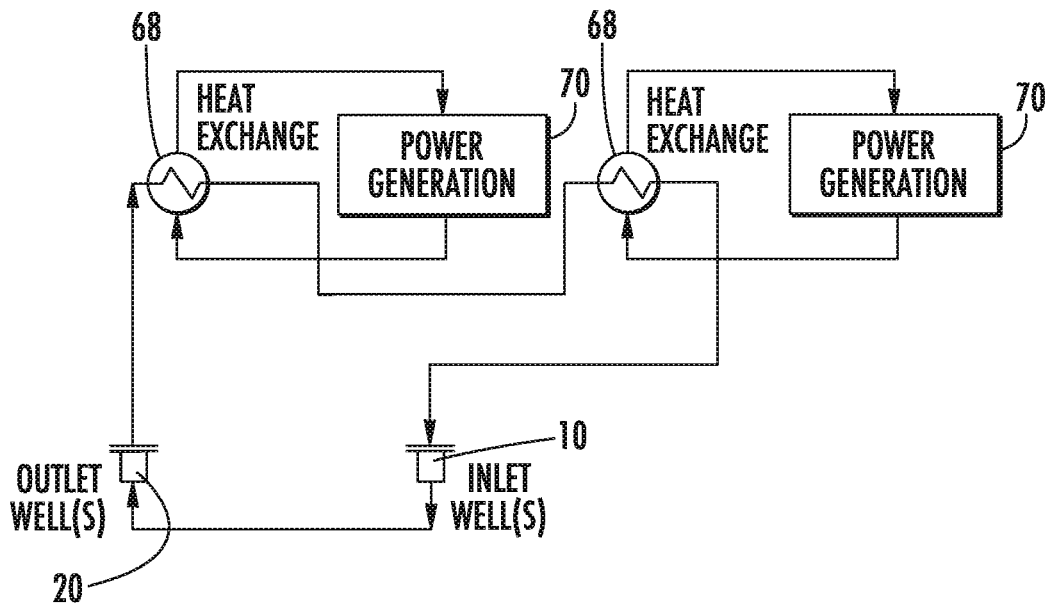
FIG. 21 is an alternate embodiment of FIG. 20.

Optional arrangements with the segregated circuit are illustrated in FIGS. 20 and 21.

FIG. 20 illustrates a segregated circuit incorporating a well loop 12 in thermal contact with two distinct heat exchangers 18 each with its own power generator 22 forming a parallel arrangement. Similarly, FIG. 21, illustrates a serial arrangement.

Figure 22:
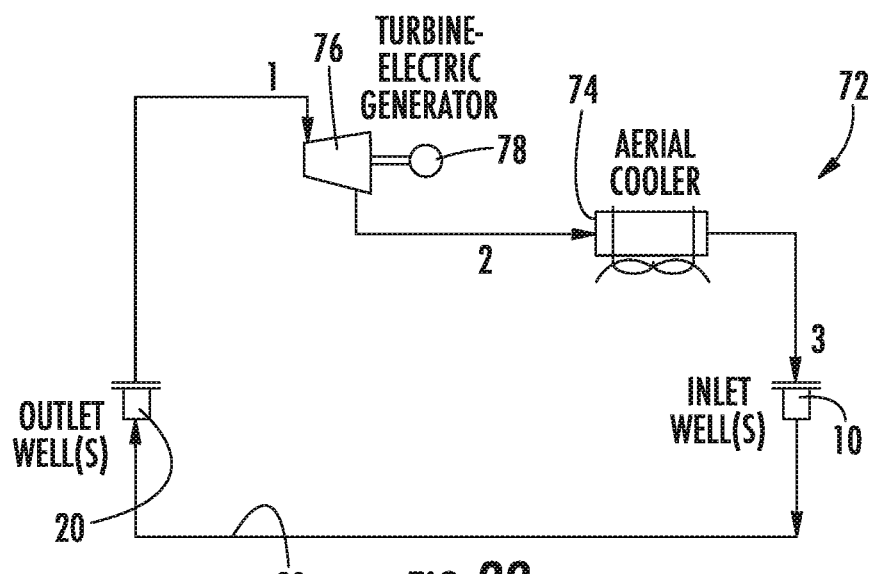
FIG. 22 is a schematic illustration of an integrated geothermal circuit incorporating a turbine and generator directly driven by the geothermal working fluid.
Figure 23:
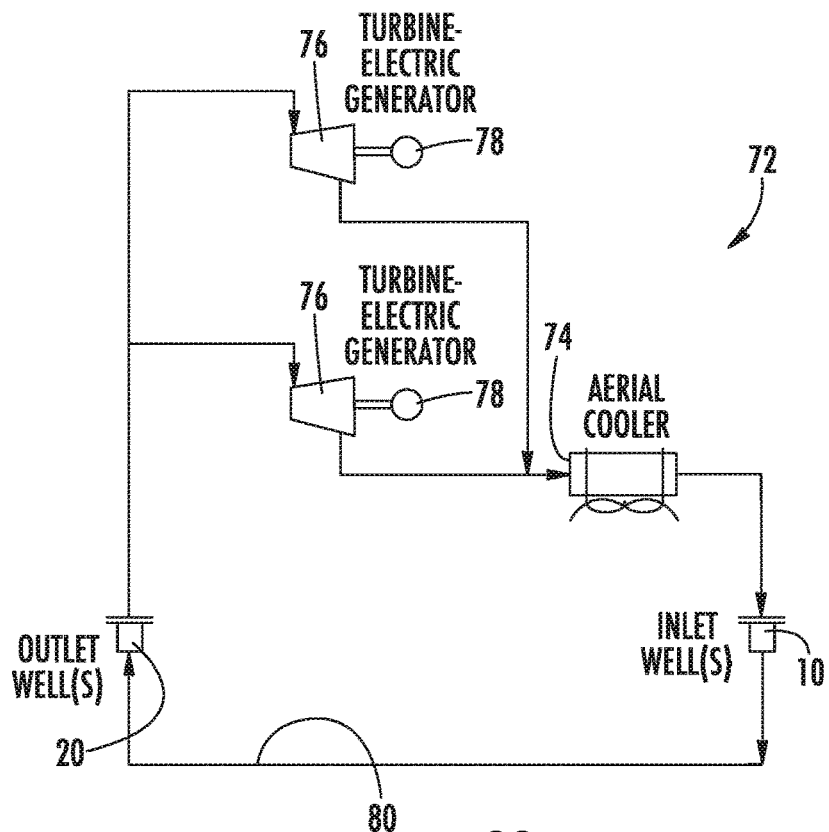
FIG. 23 is a schematic illustration of an alternate embodiment of FIG. 22.

The integrated well loop power cycle is a closed loop system in which the selected working fluid is circulated within the well loop and then flows into a turbine on surface as shown in FIG. 22. Numeral 72 denotes the overall process schematic. In this process, a single-fluid is used rather than having a discreet well loop fluid and a secondary power cycle working fluid. The working fluid in this closed loop cycle can operate either as a transcritical cycle, whereby the fluid is supercritical at the upper working pressure and subcritical at the lower working pressure, or as an entirely supercritical cycle whereby the fluid remains supercritical at the lower working pressure.

Figure 24:
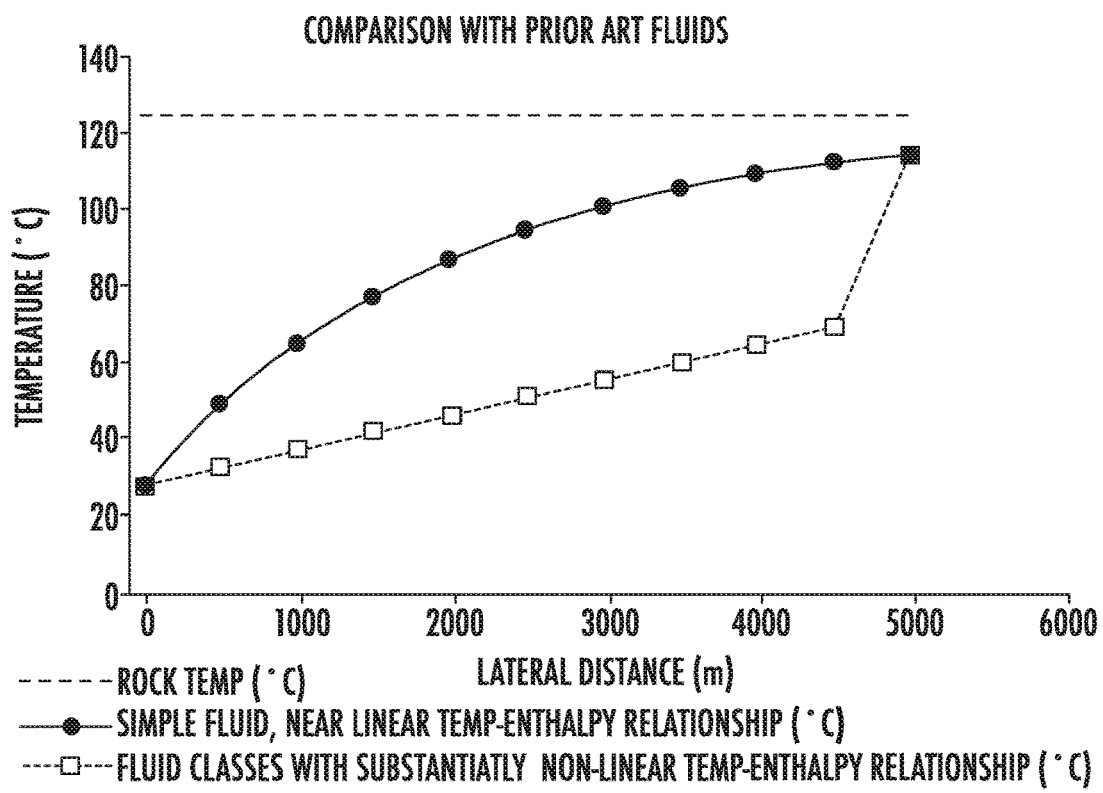
FIG. 24 is a graphical representation of temperature data over distance for different working fluids.

As is known, a transcritical cycle is a thermodynamic cycle where the working fluid goes through both the subcritical and supercritical states. The apparatus further includes a cooling device, shown in the example as an aerial cooler 74 and turbine 76 with generator 78. The aerial cooler 74 is used to cool the working fluid to a temperature between 1° C. and 15° C. above ambient temperature. It is also to be noted that the working fluid can be cooled to a subzero° C. temperature. Reference to FIG. 24 delineates performance data.

The driving mechanism in this integrated cycle is a very strong thermosiphon which arises due to the density difference between the inlet vertical well 10 and the outlet vertical well 20. The fluid is in a supercritical liquid state in the inlet well 10, heats up as it travels along the lateral interconnecting sections 80 and exits in a supercritical state in the outlet well 20, which creates significant pressure.

The thermosiphon effect can completely eliminate the need for a surface pump under normal operating conditions except during start-up. Advantageously, this eliminates the power required to operate the pump and increase the net electrical power output.

Working in concert with the well loop circuit is the use of customized fluids and mixtures tailored to the wellbore layout, depth, length, and ambient temperature. The prior art only discusses the use of carbon dioxide or pure hydrocarbon fluids. With a closed-loop system such as that discussed herein, the initial cost and complexity of a fluid mixtures is only a minor factor in the overall economics. So other fluids can be used such as a fluid having a nonlinear temperature enthalpy relationship within the interconnecting segment between an inlet well and an outlet well at pressures greater than 10 MPa and temperatures less than 180° C. to maximize the temperature differential and heat transfer between the fluid and the surrounding downhole heat source, i.e. surrounding rock.

It has been found that fluids that exhibit a substantially non-linear temperature-enthalpy relationship within the lateral portion of the well loop and/or that exhibit a pressure-sensitive reversible reaction which is endothermic at elevated pressure and exothermic at pressure lower than the elevated pressure can increase power generation considerably. This develops because the average temperature differential between the far-field rock temperature and the circulating fluid temperature is increased, driving increased heat transfer from the geologic formation.

An example of this type of fluid for use in a segregated configuration is an aqueous precipitate/electrolyte solution with temperature-dependent solubility, wherein the water is super saturated at the top of the inlet well. The solid particles are held in suspension with an anti-scaling agent (anti-flocculation agent) and with turbulent flow (similar to a drilling mud). In the lateral sections, the temperature is increasing, hence the solubility of the solids held in suspension is also increasing. This allows the solution to endothermically absorb heat from the rock (basically increases the effective heat capacity of the fluid) as the solid particles dissolve into the water. In the heat exchanger to the segregated heat-to-power cycle, temperature is decreasing, so the solid substance is precipitating exothermically.

Useful fluids include aqueous solutions with the following solutes as examples:

Ammonium acetate, ammonium dihydrogen phosphate, ammonium formate, ammonium nitrate, potassium bromide, potassium chloride, potassium formate, potassium hydrogen carbonate, potassium nitrate, sodium acetate, sodium carbonate and monosodium phosphate.

To use a single turbine and have adequate efficiency over an entire range of ambient conditions is problematic. It has been found that use of two or more turbines in series or parallel which are optimized for different ambient conditions addresses the problem. During periods of colder temperatures, control logic (not shown) automatically shifts the working fluid to the appropriate turbine to maintain high efficiency throughout the year.

Figure 25:
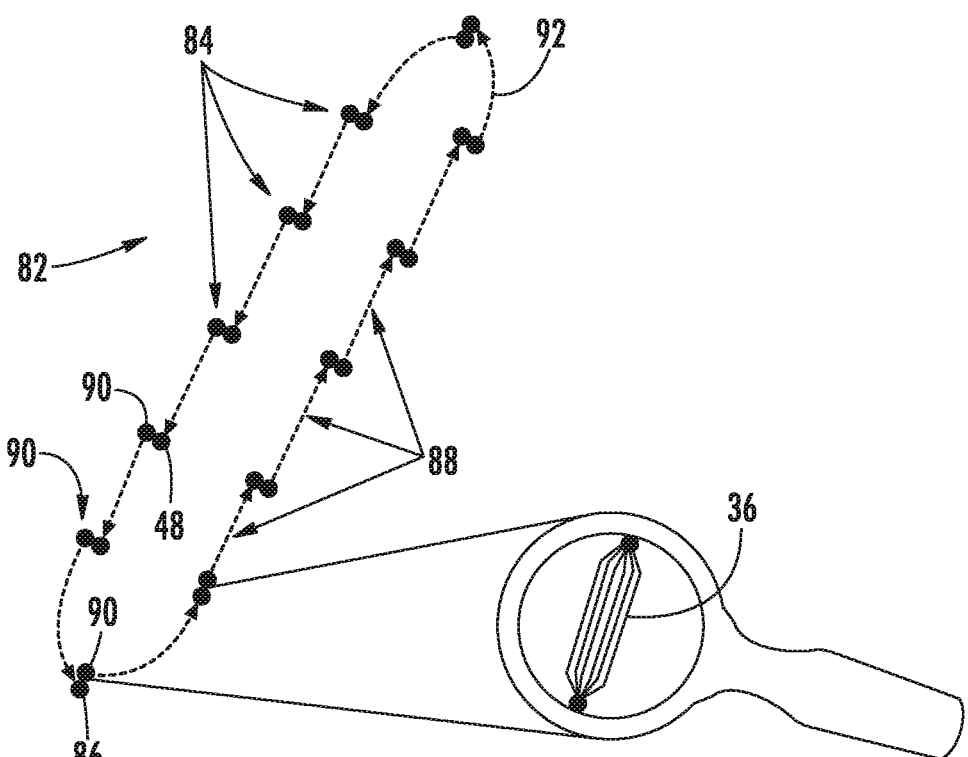
FIG. 25 is a schematic illustration of a W shaped or daisy chain geothermal well configuration.

Referring now to FIGS. 25 and 25A, shown is a schematic illustration of a daisy chain of wells, globally denoted by numeral 82. In this embodiment, each surface location, generally denoted by numeral 84, includes an injection well 86 connected to a lateral well conduit or interconnecting segment 88 and production well 90. In this manner, the continuous well structure subscribes to a generally U shaped structure. The lateral well segment may comprise a well system 36, as discussed in FIG. 3 or any of the other configurations discussed previously.

As illustrated, each location 84 is discrete and linked to proximal locations in an elegant and advantageous manner. As an example, the distance between locations may be 3,500 meters to 6000 meters. This will, of course, vary from one situation to another.

In operation, working fluid is circulated in the injection well 86 of one location 84, optionally processed through, for example, a power generation apparatus (not shown) to recover the heat energy and subsequently passed as an output stream to be an inlet feed stream for an injection well 86 of a proximal location 84. The chain line 92 illustrates this relay or daisy chain sequencing. Since not all of the heat is recovered, the inlet feed stream for well 86 of a proximal location is preheated for injection into lateral conduit 88. The process then resets for repetition in the next location 84.

Figure 26:
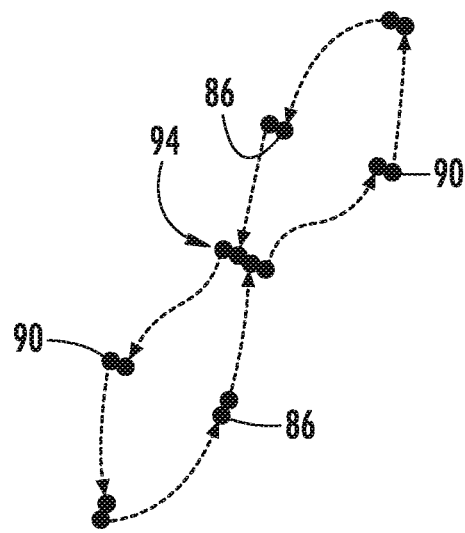
FIG. 26 is a schematic illustration of alternate embodiment of FIG. 25.

Turning now to FIG. 26, shown is a further embodiment of the invention for example, an 8,000 kW to 12,000 kW system. In this example, individual loops may be joined at a centralized location 94 in order to centralize the power generation apparatus (not shown) for increased power and efficiency.

Figure 27:
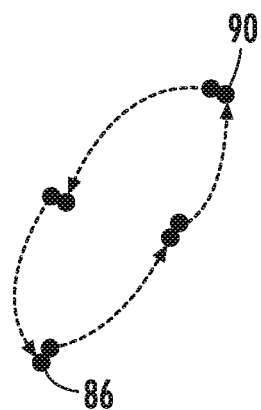
FIG. 27 is a schematic illustration of alternate embodiment of FIG. 25.
Figure 28:
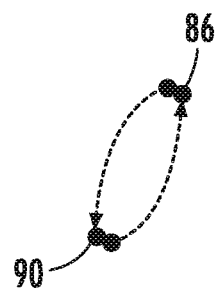
FIG. 28 is a schematic illustration an alternate embodiment of FIG. 25.

FIGS. 27 and 28 illustrate smaller scale operations, 4,000 kW-6,000 kW (FIG. 27) and 2,000 kW-3,000 kW (FIG. 28).

Turning now to the phase change aspect of the invention, reference will now be made to a drilling fluid composition that cools the drill string, bottom hole assembly and rock face (none of which are shown) much more efficiently than prior art. The cooling drilling fluid employs phase change materials (PCM) to mitigate the counter-current heat exchange issue seen with standard drilling fluid. As is known, PCMs undergo fusion (melting and solidifying) at a nearly constant temperature—hence, they absorb and release thermal energy without changing temperature materially. The unification of these properties with the sealing while drilling in sequence with drilling with PCMs with subsequent sealing has a dramatic positive impact on efficient drilling utilizing conventional drilling equipment in high temperature formations otherwise not achievable with standard equipment.

Figure 29:
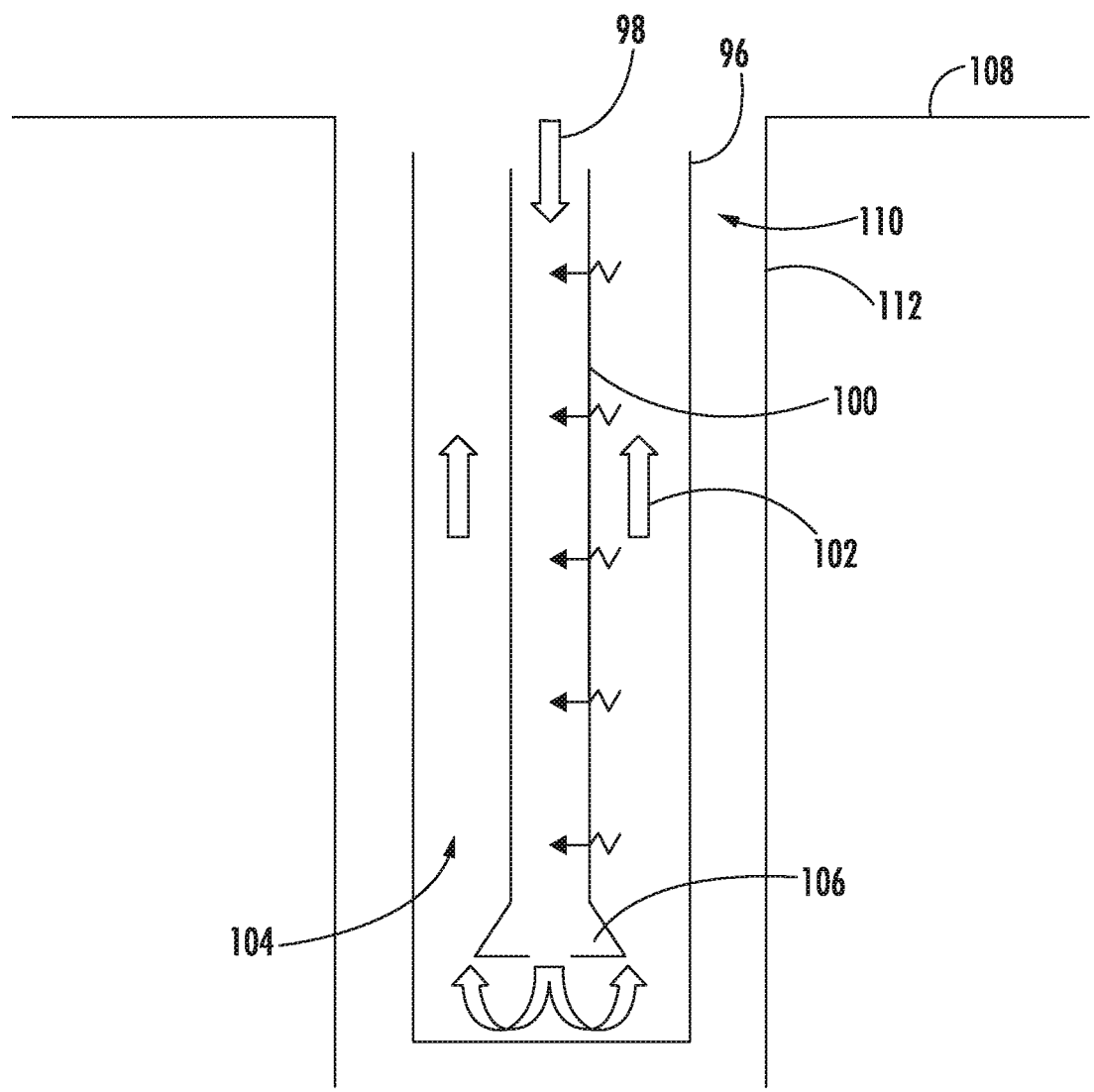
FIG. 29 is a representation showing a typical drilling operation, fluid flow, and heat transfer.

With reference to FIG. 29, the PCMs are added to the drilling fluid, and the fluid is pumped at a sufficient flow rate so that the PCMs undergo a phase change throughout the system (or at minimum proximate the bottom hole assembly (not shown).

At the top of the drill string 96 (inlet to the system), also referred to as the tubing, the PCMs are pumped in solid state (or mostly solid state). As the fluid 98 descends the tubing 100 of the string 96, heat is transferred from the returning fluid 102 in the annulus 1104—however, the heat transfer rate is small due to the close temperature match (low delta T) between the annulus 104 and tubing 100. The fluid 98 in tubing 100 absorbs thermal energy while descending and melts without materially changing temperature and exits the bit 106 either in completely solid state or with a higher liquid fraction than at the top of the tubing 100. As the fluid 102 returns in the annulus 104 it continues to absorb heat from the rock 108 until the near-wellbore rock temperature is lower than the fluid temperature. The thermodynamics of the system are designed so that the flowing PCM slurry in the drill string 96 remains at least partially in solid state at, or near, the bottom hole assembly (not shown). This operation may be sequenced with a drill while sealing operation in any sequence as has been referenced herein previously.

Figure 30:
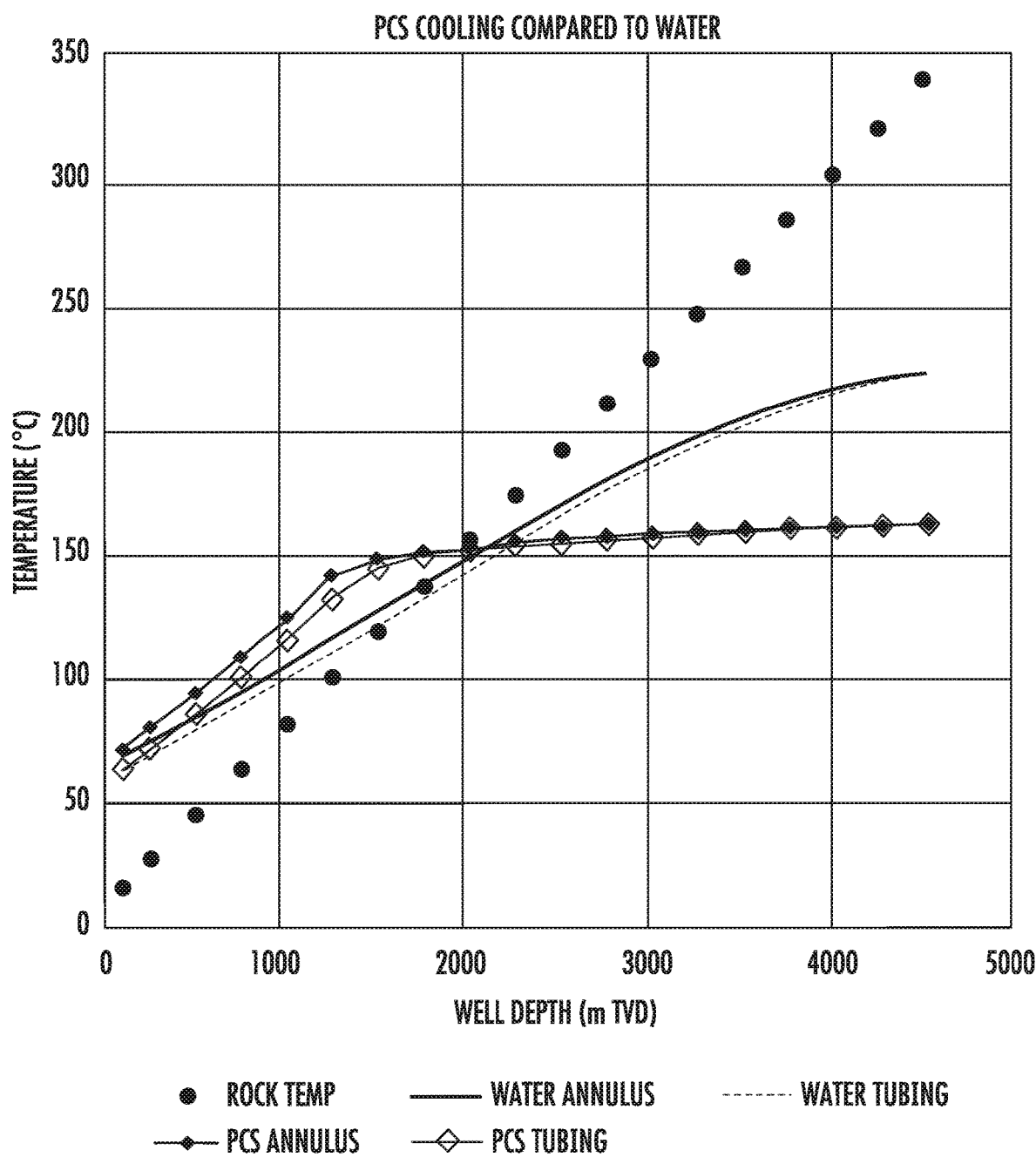
FIG. 30 is a graphical representation of system temperatures for water and the PCM-based drilling fluid disclosed herein along the well length.

Water has diminishing returns. Although effective to a certain point, increasing the flow rate of water has marginal further impact on bottom hole temperature. This is due to the counter-current heat-transfer which heats the descending water before it even reaches the bit (FIG. 29). This is illustrated in FIG. 30 for a case when drilling into 340° C. rock at 4500 m depth. Phase change slurry, (PCS) Casing is the slurry temperature of the returning fluid in the annulus 24 110 between the casing 26 112 and drill string 10 96, when the PCS is flowing at 4 m3/min. With water flowing at 4 m3/min, the temperature at the BHA (not shown) is approximately 222° C. Increasing the water flow rate to 5 m3/min only cools the BHA down to 209° C. The PCS fluid enables cooling down to 160° C. at 4 m3/min, much lower than achievable with water.

As is known in the art, drilling rate of penetration, ROP, is a function of rock strength. It has been found that here can weaken the rock, or "pre-condition" the rock, prior to physical destruction with the bit, by inducing a rapid cooling shock. By maintaining a much lower circulating fluid temperature than the in-situ rock temperature, the cool drilling fluid induces localized thermal contraction in the rock near the bit face (not shown). This contraction causes the rock to weaken and can even cause tensile failure.

In the academic literature, Yan-Jun Shen et al, *Experimental Study on Temperature Change and Crack Expansion of High Temperature Granite under Different Cooling Shock Treatments*, Energies, 2019, discuss the weakening effect is related to the magnitude of cooling. To achieve a material impact on ROP, cooling of greater than 50° C. is required. Substantial weakening and tensile failure can occur with 150° C. of cooling, which cannot be achieved with water alone. U.S. Pat. No. 9,758,711 discloses a PCS drilling fluid to cool the bit and bottom hole assembly. The disclosure notes that only a marginally better cooling effect could be achieved (approximately 5° C.) compared to water.

Figure 31:
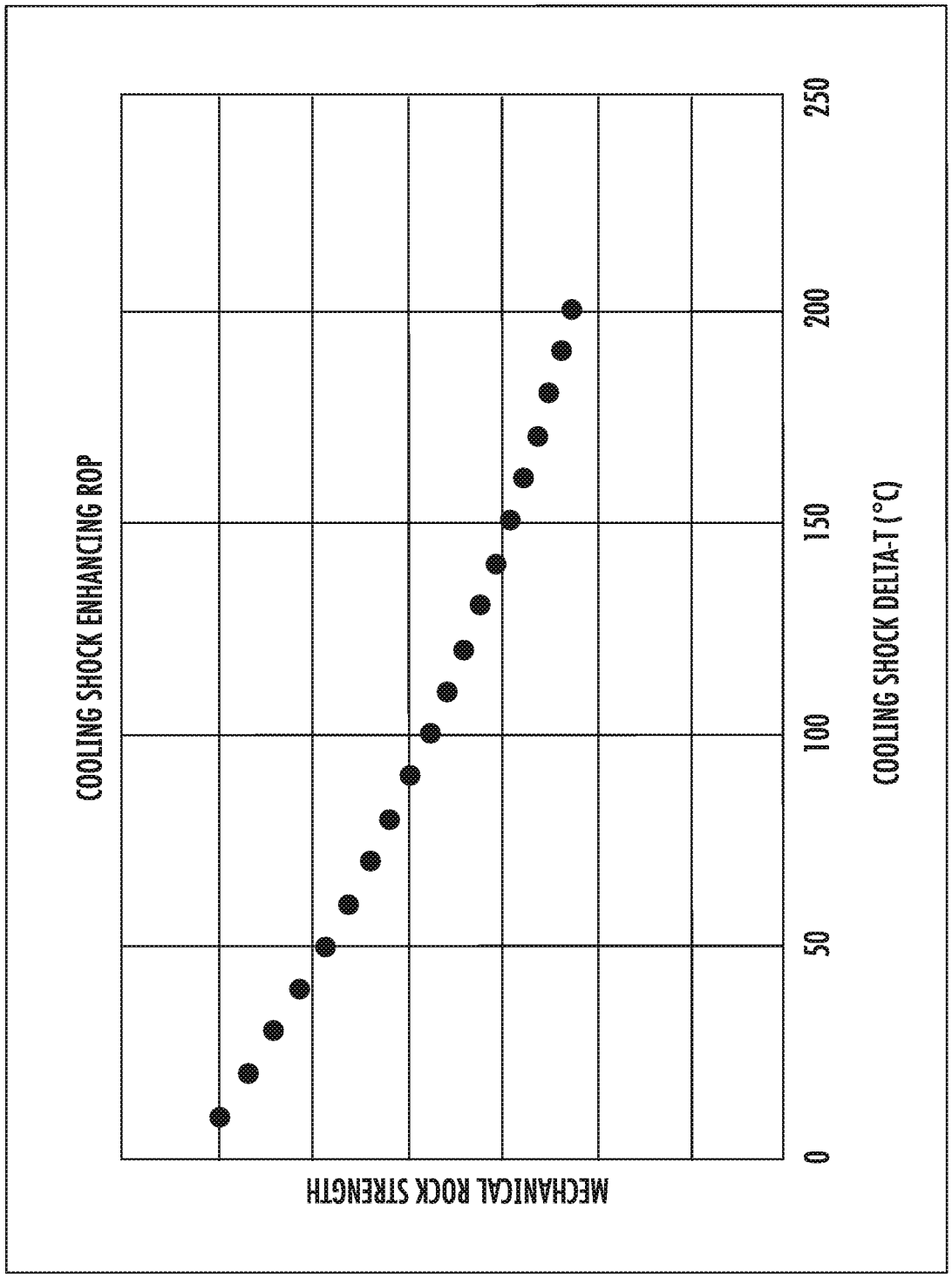
FIG. 31 is a graphical representation of the effect of cooling a rock face for weakening mechanical strength for preconditioning before destruction by a bit.

When the methods described here are applied, the rock can be cooled by greater than 100° C. Reference to FIG. 30 shows cooling of 190° C. FIG. 31 depicts the rock mechanical strength as a function of the shock cooling delta-T, that is, the temperature difference between the PCM drilling fluid and the virgin rock temperature.

A particularly useful application of the invention is for construction of closed-loop, conduction-only geothermal systems as disclosed in Applicant's copending applications. These systems typically require magnetic ranging tools and directional MWD systems with telemetry to enable intersection of the various wellbores to create a closed system. During the ranging phase of operations, it is critical to keep the magnetic ranging receiver and other electronics (not shown) below its temperature limit. The receiver can be placed on the end of a drill string (tubing) and configured to allow fluid to flow through the tool and out of the end of the tubing. In this manner, the magnetic ranging equipment can be actively cooled by pumping a PCM at high rates through the tool and back up the annulus, using the design and operational methodology described herein.

In this application the cooling is not for drilling, but simply to cool the bottom hole electronics equipment.

In this application the cooling is not for drilling, but simply to cool the bottom hole electronics equipment.

The PCMs are designed and selected to have a fusion temperature below the maximum temperature limit of the equipment, electronics, and sensors within the drill string and BHA. Therefore, even though the rock temperature can be significantly higher than the equipment maximum temperature limit, the drilling fluid temperature remains at the PCM fusion temperature. Rock temperatures above 200° C. to 400° C. and greater can be drilled with standard directional drilling equipment, electronics, etc. Furthermore, some wells are currently drilled with expensive high temperature tools up to 250° C. In contrast, the technology disclosed herein enables much cheaper, more reliable and effective equipment, saving significant costs.

As mentioned supra, U.S. Pat. No. 9,758,711, discloses a PCM drilling fluid to cool the bit and bottom hole assembly. However, the disclosure does not enable sufficient cooling to weaken rock for faster ROP, or solve the operational challenges necessary to achieve a massive cooling effect.

It is important to maintain dispersion of the PCM within the drill string to prevent agglomeration and potential plugging of the flow path. The teachings herein provide for a stable emulsion with solid phase PCM particles. However, after several melting/solidifying cycles, the PCM particles tend to agglomerate and grow bigger. The important thing is to have the solidification process take place when the fluid is turbulent and under high shear rates, which limits the agglomeration to a certain maximum particle size.

It has been found that a critical flow rate is required to achieve a significant cooling effect that can weaken the rock, increase ROP, and enable magnetic ranging for a geothermal closed-loop system in high temperature rock. The critical flow rate is defined by that where the PCM remains at least partly solid (therefore undergoing fusion) throughout the entire drill string and exits the bit (or bottom hole assembly) in partially solid form. It is not necessary to have the PCM in solid form in the annulus, only the tubing.

Figure 32:
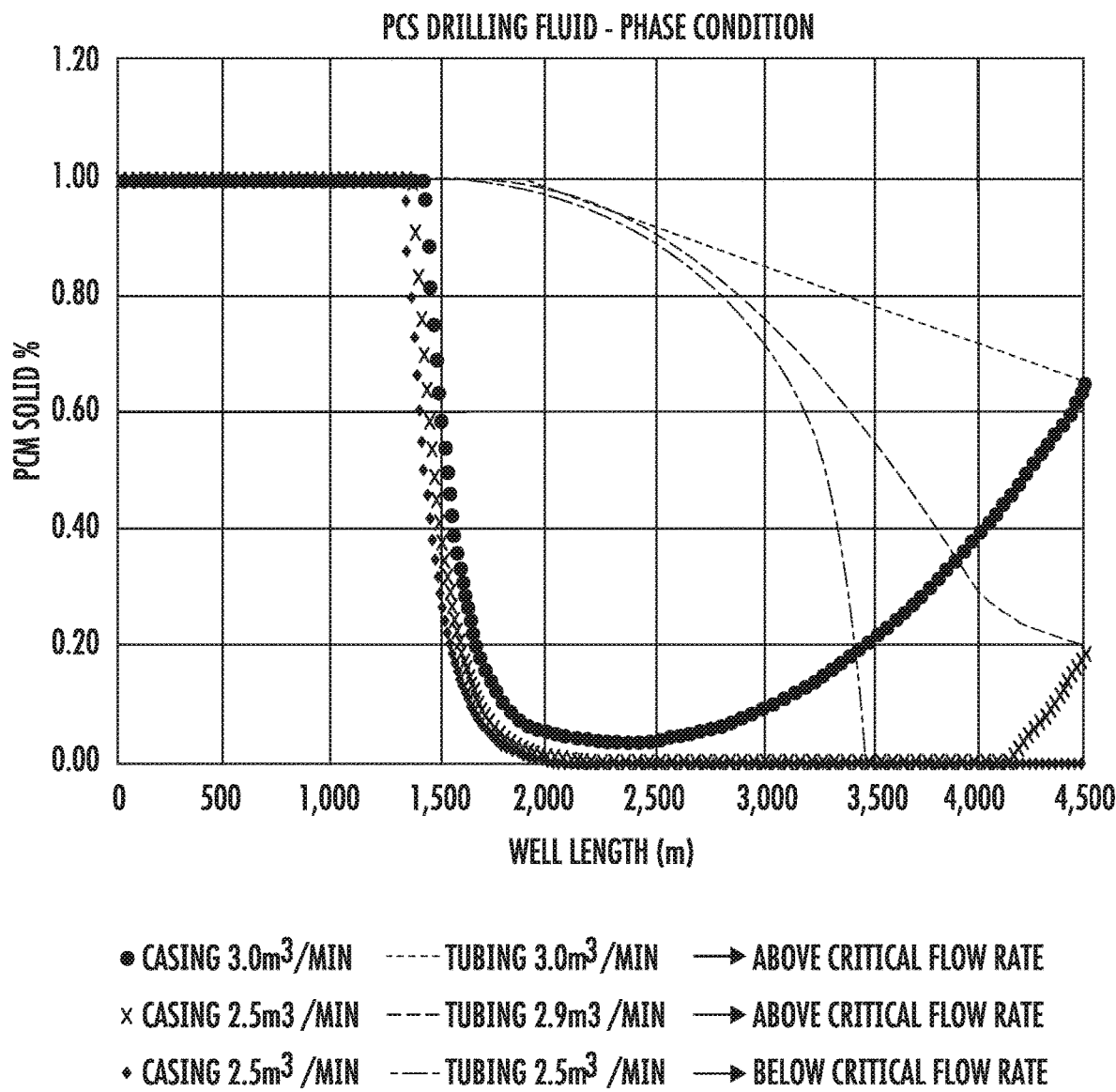
FIG. 32 is graphical representation showing phase state of PCM (Liquid or Solid) along the well length for different flow rates above and below the critical flow rate.

Referring now to FIG. 32 different flow rates for a scenario of drilling 340° C. rock (a linear 75° C./km geothermal gradient) at 4500 m depth, with a fusion temperature of 150° C. are illustrated. The temperature at the bottom hole assembly for each flow rate is 180, 150, 150° C., for 2.5, 2.9, 3.0 m3/min, respectively. Therefore, the critical flow rate is 2.9 m3/min in this scenario, as any lower flow rate results in higher temperatures at the BHA, while any higher flow rate results in no additional cooling.

For depths and temperatures relevant to geothermal projects, typically the critical flow rate is between 2 m3/min and 6 m3/min.

Figure 33:
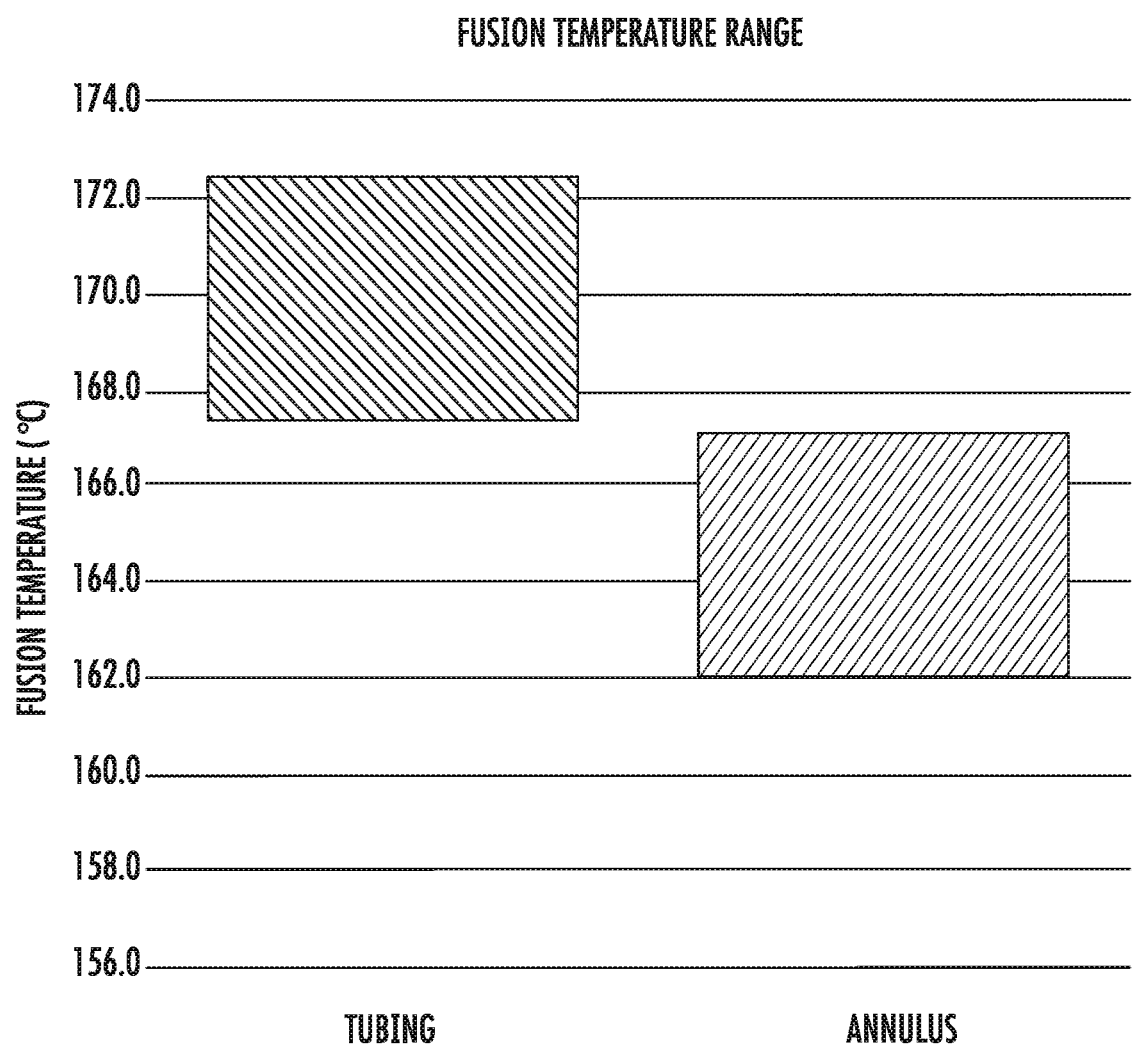
FIG. 33 is a graphical representation of the fusion temperature range in the tubing and annulus which is controlled by pressure.

To achieve the desired cooling effect, it is important that the heat transfer between tubing and annulus is minimized. If the BHA pressure is not controlled properly, the fusion temperature of the melting PCM in the annulus is higher than the fusion temperature in the tubing, causing significant undesired heat transfer from annulus to tubing. Fusion temperature is a function of pressure. The pressure differential, delta-P, between tubing and annulus must be controlled to be sufficiently high to cause the Minimum Fusion Temperature in the tubing to be higher than the Maximum Fusion Temperature in the annulus, depicted in FIG. 33.

Figure 34:
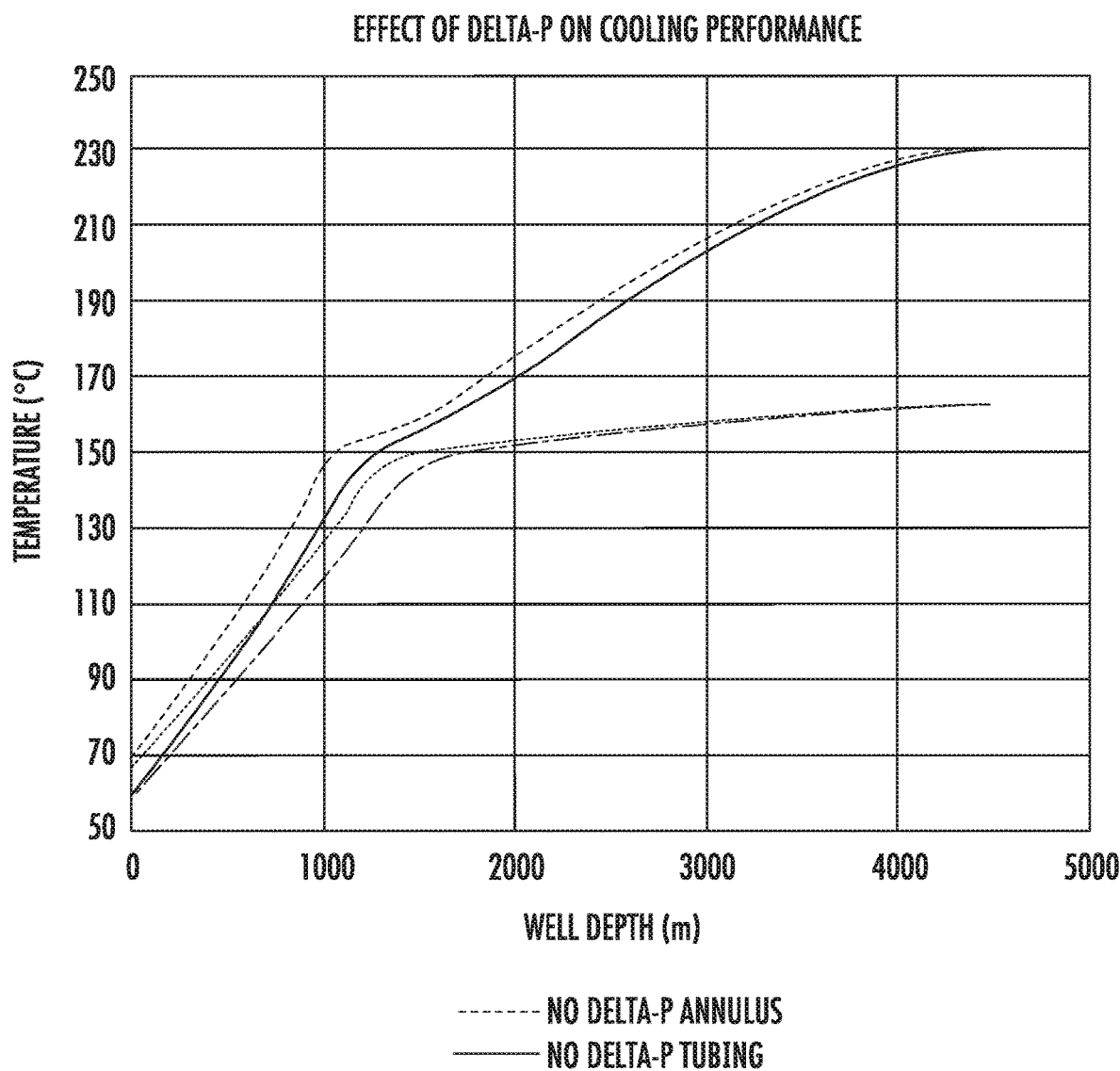
FIG. 34 is graphical representation showing the effect of BHA delta-P on the cooling performance.

FIG. 34 shows a graphical representation showing the importance of properly designing the delta-P across the BHA. It depicts two cases each with identical flow rate, drilling fluid composition, well dimensions, and rock temperature. Case 1 has no pressure drop, or delta-P, across the equipment and components at the bottom of the string (Bottom Hole Assembly). Case 2 has a significant pressure drop. The fluid temperature at the bit is 230° C. and 160° C., respectively.

Rock cuttings which are transported to surface need to be removed to maintain the required solids content/density of the drilling fluid. In many geothermal applications and particularly in the application disclosed in Applicant's co-pending applications a clear fluid is ideal—meaning a fluid with immaterial solids content. While larger cuttings are removed via screens/shakers, smaller solids are removed with a centrifuge which separates the higher density material. Therefore, the PCM should be chosen to have a density similar to that of the base carrier fluid, and ideally slightly below the carrier fluid, to enable removal of cuttings in a centrifuge but leave the PCM particles within the fluid.

Adding solid PCM to a base carrier fluid such as water increases the effective bulk viscosity significantly. As viscosity increases, so does the hydraulic frictional pressure drop through the wellbore. The high pressure losses would usually dictate massive surface pumping power and high pressure equipment. However, the PCM can be chosen to have a significant density difference between the liquid and solid states. By combining this PCM property with an optimized fluid composition and flow rate, the system is designed/operated so that the PCM has a significantly higher % solid phase in the drill string than in the annulus, thus creating a large density difference between the drill string and annulus, enabling a significant siphoning effect. The siphoning effect adds a large pressure drive to the system which partially overcomes the impact of the increased viscosity from the PCM.

The density difference is not a classic thermosiphon as the temperature in the tubing/annulus is essentially the same. Instead the siphon is caused by the relative phase state of the PCM between the annulus and tubing.

One of the significant features of employing the daisy chain implementation is the lack of a requirement for a near surface return conduit. When required, as in conventional well loop arrangements, capital costs exceed 10% of the total project capital, there may be a need to negotiate rights of way and a ~3° C. heat loss and a pressure loss results causing lower efficiency.

By contrast, the daisy chaining, since well loops are linked front to back, eliminates the need for a near surface return conduit. Further, the paired loops act as the return conduit for each other with the pair using waste heat as an input to create the preheated stream supra.

Other advantages include increased power production with no surface disruption (footprint) since everything is subsurface and reduced distance between locations 84. This commensurately reduces cost if shorter conduit 88 can be used owing to the increased temperature of the preheated feed stream design.

The wells in the examples are formed by employing the sealing while drilling methodology described. It will be understood that any combination of well configurations can be incorporated in the daisy type arrangement. Further, any combination of destructive techniques may be used to form the wellbores in the daisy example as well as any of the other configurations shown in all of the Figures. In some Figures, reference to an "n" designation is included together with the Figure number. An example is FIG. 6 having an area denoted 6n. This is to represent that any number, thus n, of additional wells may be stacked vertically or positioned in a parallel relationship or both with the one shown. The well type may be different or the same for the additional wells.

As enumerated by the examples, the technology set forth herein is predicated on the ability to form a geothermal formation, regardless of permeability, into an energy efficient wellbore for maximum conductivity. This capability, when coupled with highly effective working fluids, results in remarkable methodology.

Fluid circulation within the wells can occur in any pattern and direction that facilitates efficiency. This will be partly dictated by the nature of the formation and will determined and appreciated by those skilled in the art.

Figure 35:
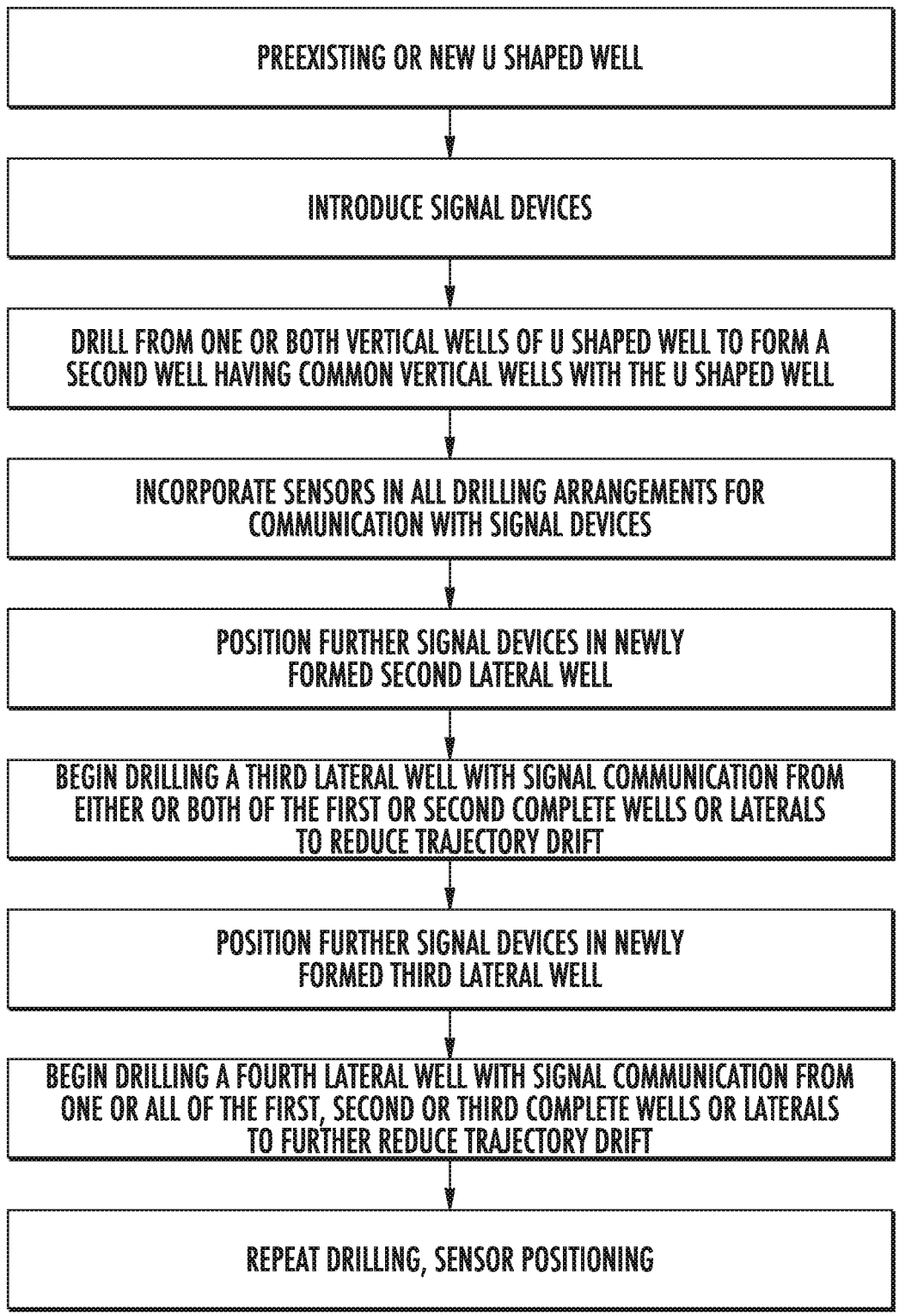
FIG. 35 is a flow diagram indicating the general steps of the method.

Turning now to the multi-ranging aspects of the inventive protocols, FIG. 35, depicts a general flow diagram for the overall steps in the multi-ranging method.

Figure 36:
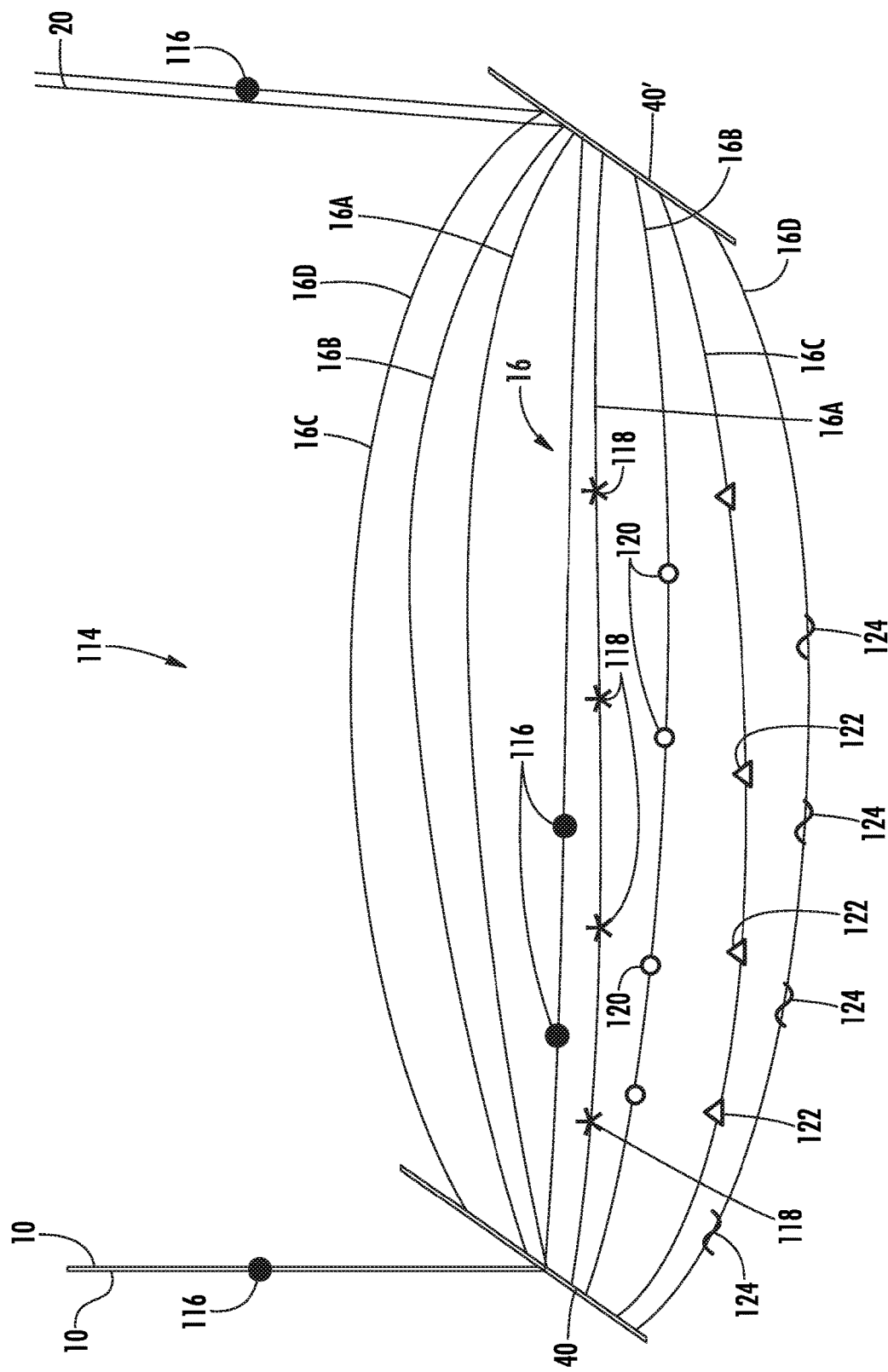
FIG. 36 is a schematic illustration of multilateral well arrangement according to one embodiment.

FIG. 36 is a schematic illustration of one embodiment of the present invention generally denoted by numeral 114. In the example, a U shaped well includes a pair of spaced apart vertical wells 10 (inlet) and 20 (outlet) and an interconnecting well 16, shown as a horizontal well interconnecting the wells 10 and 20 as with the previous embodiments. This well may be pre-existing from an unused well, i.e. a SAGD arrangement or may be newly drilled. The technology discussed further herein is particularly useful to repurpose unused oil wells and it will become evident in the forthcoming disclosure that many aspects of the disclosed technology may be easily appended or substituted into existing oil and gas environments as easily as it is positioned in the geothermal industry.

In the example shown, a plurality of ancillary lateral horizontal wells 16A, 16B, 16C and 16D extend from a junctions 40 and 40'. In this manner, all wells 16A, 16B, 16C and 16D are commonly connected to a respective vertical well 10 or 20. In the scenario where the U shaped well is pre-existing, signal devices may be positioned along the vertical wells 10, 20 and the interconnecting well 16. These are schematically illustrated and represented by numeral 116. Suitable signal devices may be selected from the panacea of devices known in the art and may comprises receivers, transmitters, transceivers, inter alia. For purposes of suitable device examples, reference to Baker Hughes, Scientific Drilling, Halliburton etc. may be had for reference.

The devices can be modified or selected to be capable of monitoring at least one of drilling rate, spacing between wells, well to junction connection integrity, bit wear, temperature and fluid flow rate within a drilled well.

This area is mature in the art and thus detailed description is not necessary.

In situations where the U shaped well is not pre-existing, the well can be drilled as an initial basis well with the signalling devices placed therein at a suitable time in the process with the view to either leaving them in situ permanently or positioned for time dependent retrieval.

Once positioned, this provides a "master" for signal communication with the directional drilling of the second lateral (horizontal) well 16B. The drilling arrangement (not shown) can include the capacity to receive guiding signals as a slave from the signal devices 116 and leave further signal devices 118 along the course of the horizontal well 16B. Additional communication with the drilling arrangement and signal devices 116 and 118 is also possible.

Having established a second well 16B with signal devices 118, this can then act as a master for guidance signalling for a third lateral (horizontal) well 16C. The drilling arrangement referenced previously functions in a similar manner for this drilling procedure. Further signal devices 120 are positioned along the course of horizontal well 16C. By this arrangement, the second well benefits from the guidance of signal devices 116 and 118 either together or independently in any continuous or discontinuous sequence. As will be appreciated, this has the effect of significantly reducing trajectory drift during drilling owing to the plurality of sensor positions and locations.

In respect of the third lateral (horizontal) well 16C. The drilling arrangement can include the capacity to receive guiding signals as a slave from the signal devices 116, 118 and 120 and leave further signal devices 122 along the course of the horizontal well 16C. As with the previous examples, this well then benefits from the guidance of devices 116, 118 and 120.

Finally, in the spirit of the above examples, signal devices 124 can be positioned in fourth lateral (horizontal) well 16D and communicate with devices 116, 118, 120 and 122.

It will be appreciated that the signal devices, as they are cumulative for the last multilateral well, progressively reduce the drift for each additional multilateral segment. This allows for the use of pre-existing/unused/abandoned wells since the initial well has less importance in the multilateral scenario. The initial "master" status diminishes in importance as more lateral wells are augmented to form the multilateral arrangement.

As delineated in the prior art, much of the existing technology in this area of technology has focused on the dual well or injection and production well systems inherent in SAGD environments. However, the precision associated with the technology allows for exceptional application in the geothermal area of technology and reference in that capacity will now be set forth.

Figure 37:
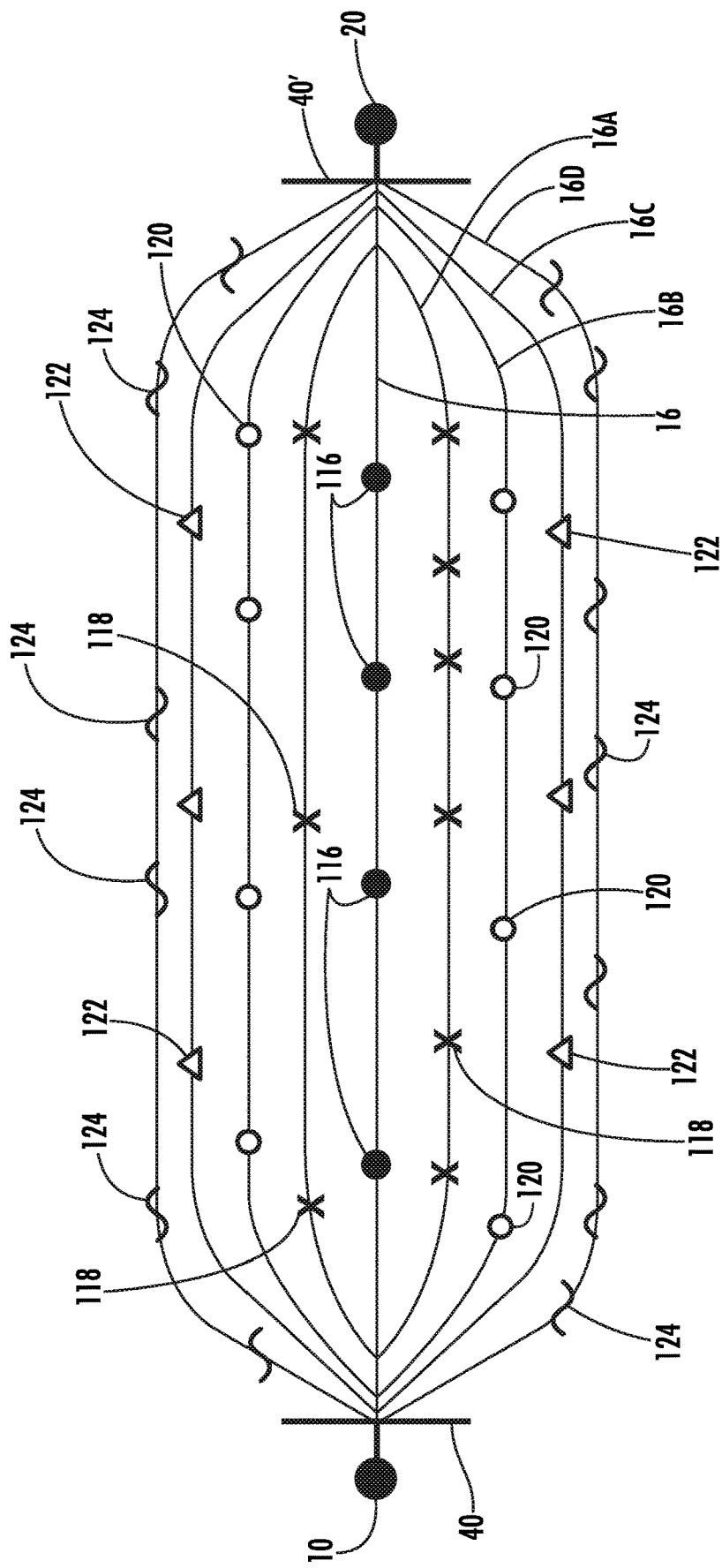
FIG. 37 is a top plan view of FIG. 36.

FIG. 37 is a top plan view of the disposition of the wells.

Figure 38:
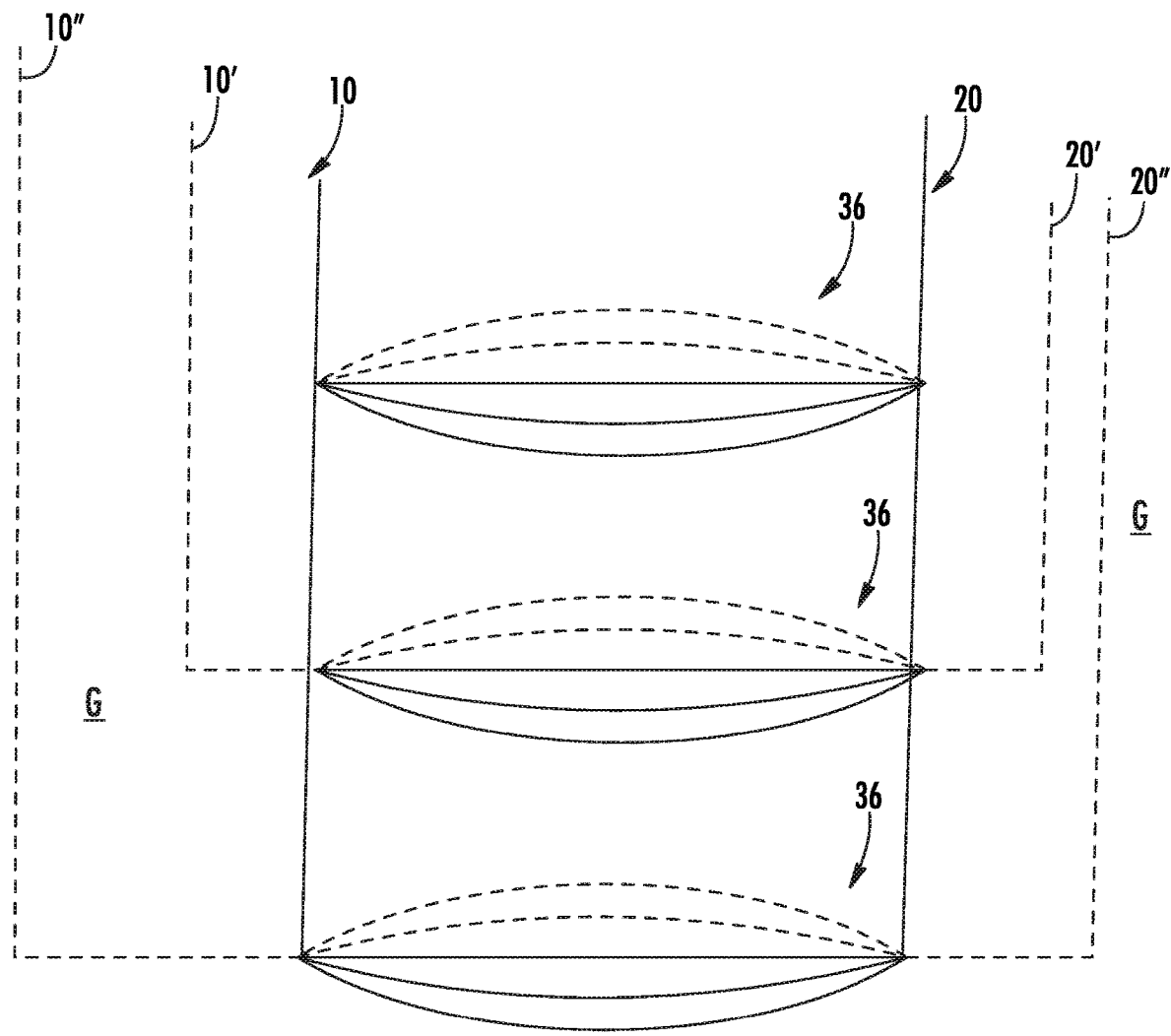
FIG. 38 is a variation of the well arrangement according to a further embodiment.

Referring now to FIG. 38, shown is a variation of the well arrangement, generally referred to as a "stacked" arrangement, positioned within a geothermal gradient, G. In this embodiment, each multilateral 36 system in the stack may have its own inlet well, 10, 10', 10'', 10''' and outlet well, 20, 20' and 20''. If feasible each of the stacks may be commonly connected to a single inlet well 10 and single outlet well 20. The appeal of the stacked arrangement is the possibility for higher thermal recovery in a smaller footprint.

Figure 39:
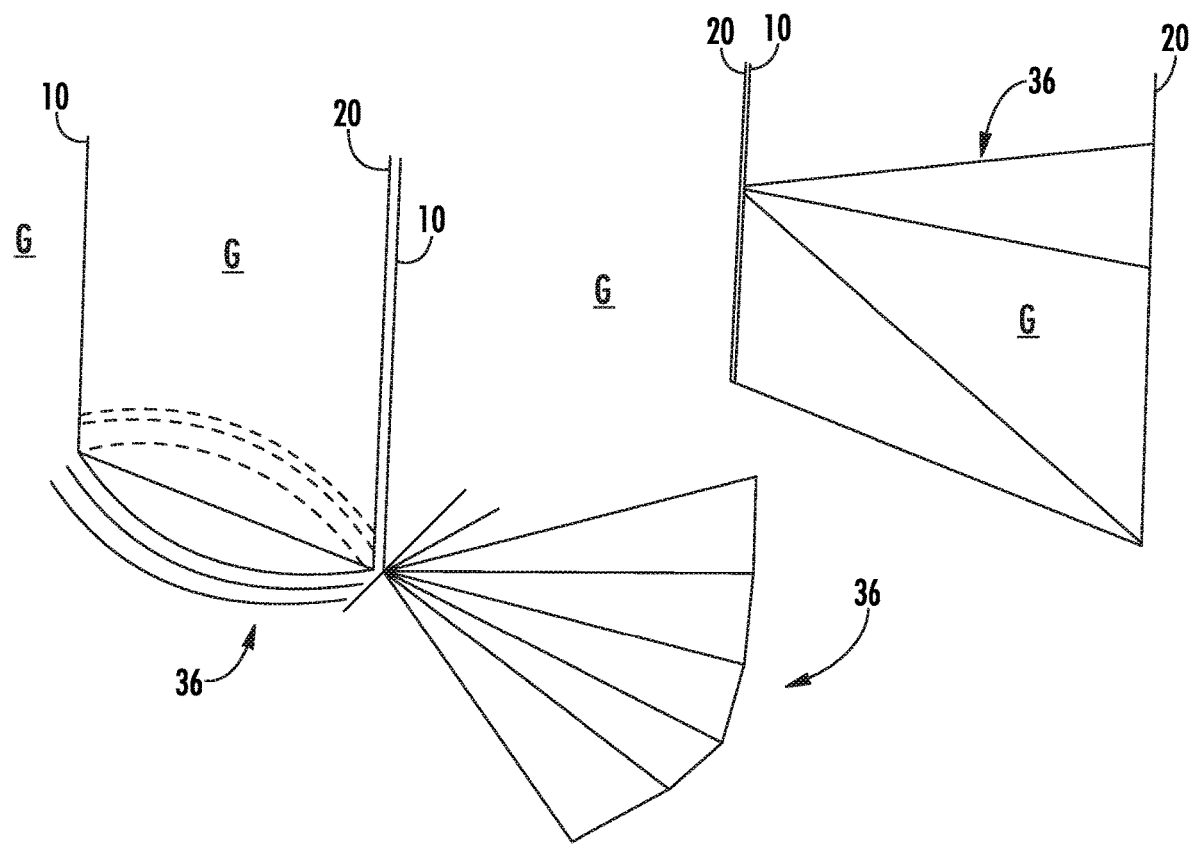
FIG. 39 is another variation of the well arrangement according to a further embodiment.

FIG. 39 illustrates a further variation referenced as a "fork" arrangement. In this arrangement, the multilateral well systems 36 may be arranged in spaced apart coplanar relation or spaced apart parallel plane arrangement. Such arrangements are suitable where the overall footprint of the system is not an issue.

Figure 40:
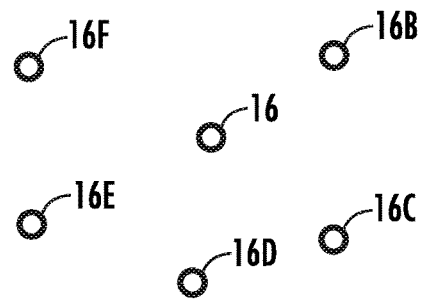
FIG. 40 is a further variation of the well disposition of the multilateral arrangement.

Turning now to FIG. 40, shown is an arrangement of multilateral wells 16B, 16C, 16D, 16E and 16F dispersed in a radial spaced apart array relative to interconnecting well 16 referenced supra. The arrangement in the example is coaxial, however other variations will be appreciated by those skilled in the art.

Parts have been removed for clarity, but it will be understood that wells 16B, 16C, 16D, 16E and 16F all have common connection with vertical wells 11 and 20 and junctions 40 and 40', the wells and junctions not being shown. This radial dispersion is of particular value in geothermal environments, since a greater amount of heat can be extracted within a given heat producing volume. In light of the directional drilling advancements set forth in the disclosure, such arrangements are possible and customizable depending upon the surrounding environment.

Figure 41:
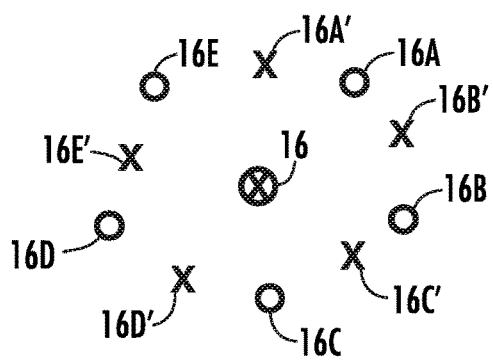
FIG. 41 is another variation of the well disposition of the multilateral arrangement.

FIG. 41 illustrates a further variation. In this embodiment, a pair of the arrangements shown in FIG. 40 are interdigitated with similar wells 16A', 16B', 16C', 16D' and 16E'. The precision attributed to the drilling method established herein facilitates the interdigitation. This arrangement enhances the thermal recovery within, for example a geothermal zone, without an impact on footprint. This clearly has capital expenditure benefits, but also allows for even greater energy servicing capability within a given area.

Figure 42:
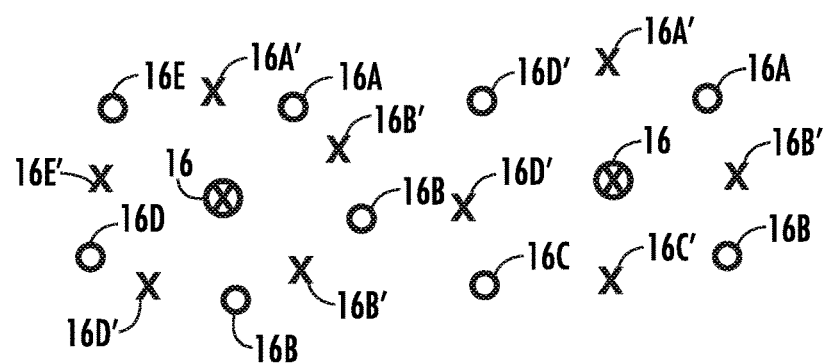
FIG. 42 is a still further variation of the well disposition of the multilateral arrangement.

FIG. 42 schematically illustrates another variation where a pair of the arrangements from FIG. 41 are spaced, but in thermal contact.

For mitigation of temperature deviation from the heel of a well to its toe, the arrangements depicted in FIGS. 41 and 42 are useful. As an example, the direction of flow of a fluid within wells 16A, 16B, 16C, 16D and 16E, in reference to FIG. 41, may be opposite to the flow within wells 16A', 16B', 16C', 16D' and 16E'. In this manner, the heel of one well will be in thermal contact with the toe of another well.

Figure 43:
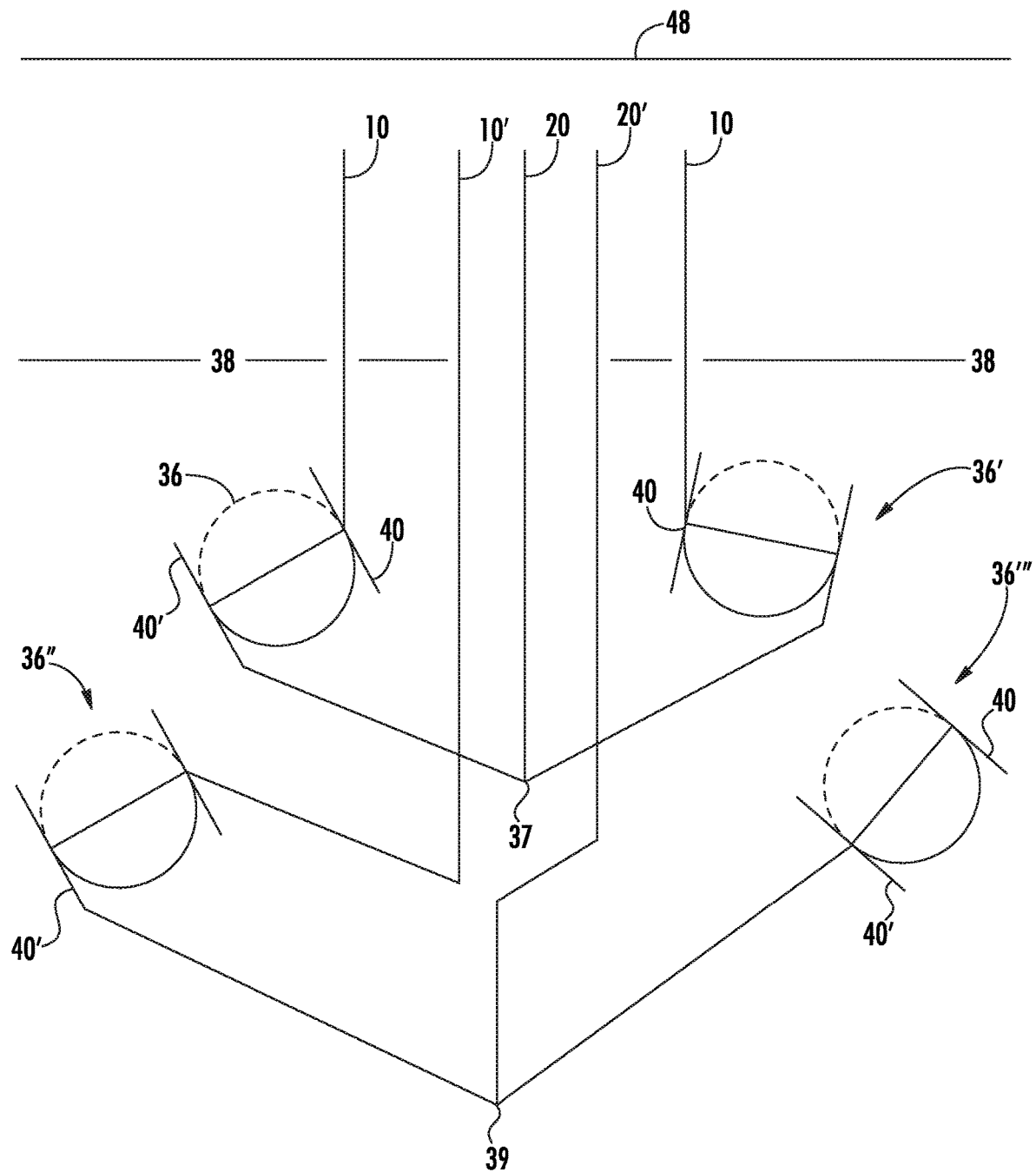
FIG. 43 is another embodiment of the present invention with multilateral wells having a significantly reduced surface footprint.
Figure 44:
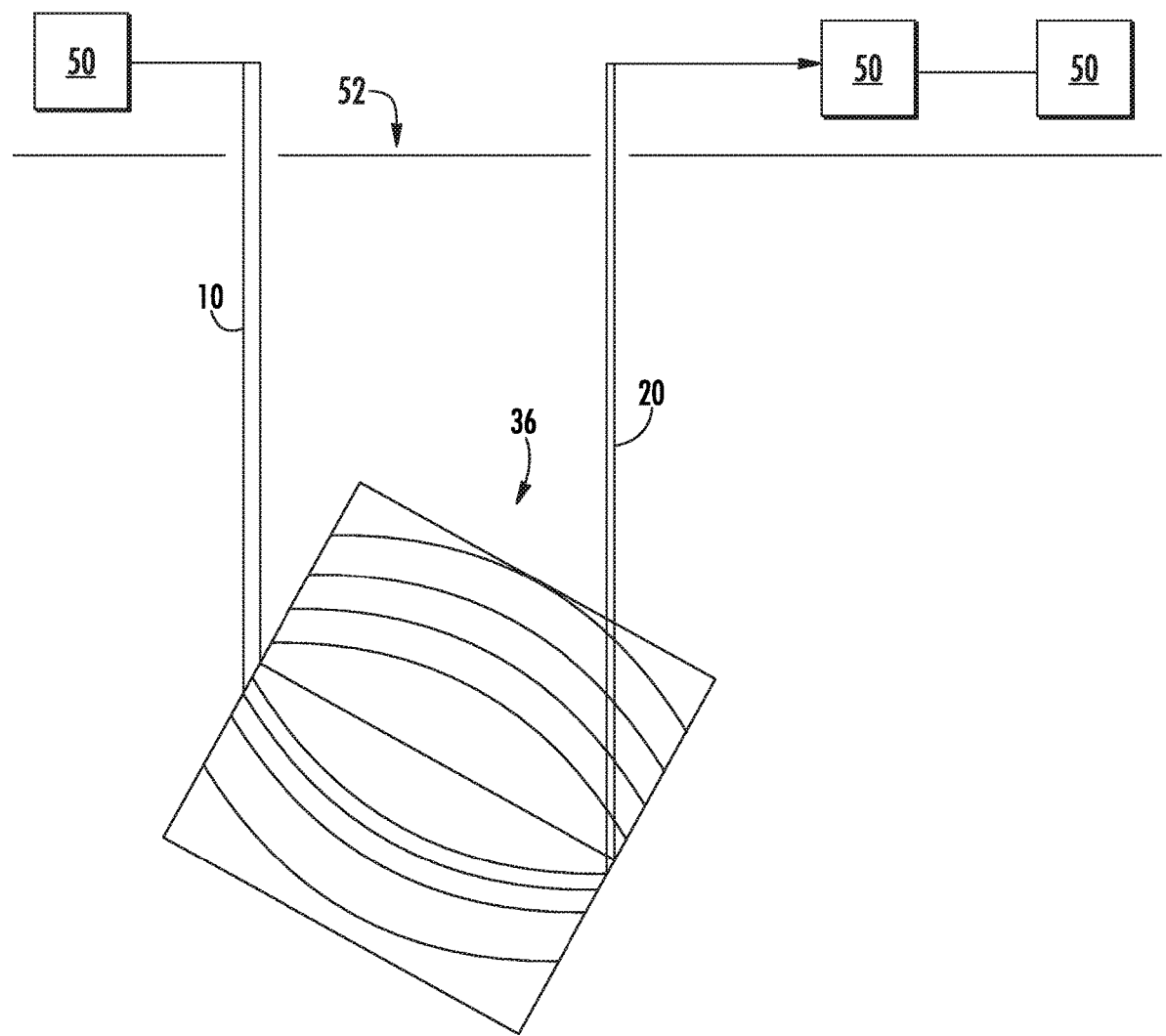
FIG. 44 is a schematic illustration of the closed loop system applicable to the geothermal embodiments

Referring now to FIG. 43, shown is another embodiment of the present invention. In this embodiment, separate multilateral wells 40 may be geographically spread apart within a formation 38. This embodiment connects multilateral systems, such as 36 and 36' to loop back together at terminus 37 for connection with outlet well 20. A second set of multilaterals 36'' and 36''' may be coplanar or in a parallel plane with multilaterals 36 and 36'' and loop back at 39. The advantage in this arrangement is that the inlet/outlet footprint 48 is relatively small, however the thermal energy recovery capacity is very significant. This allows for one site at the footprint 48 to be multiply productive without the requirement for large plots of land.

In all examples, the inlet 10 and outlet 20 will include the known ancillary components, i.e. power generating devices, energy storage devices, linking arrangements to the power grid (discussed herein after), cogeneration systems inter alia. This has been omitted for clarity. Further, it will be understood that the geothermal systems will be closed loop, meaning that the inlet, junctions, multilaterals intervening power generating devices, etc., and outlet well will form a continuous circuit with the minimum of connecting conduit disposed in a superterranean position. General reference to this can be made with respect to FIG. 10.

The ancillary or intervening devices are referenced with numeral 50 which are positioned above ground level 52. The closed loop below ground level 52 is exaggerated in the example.

Figure 45:
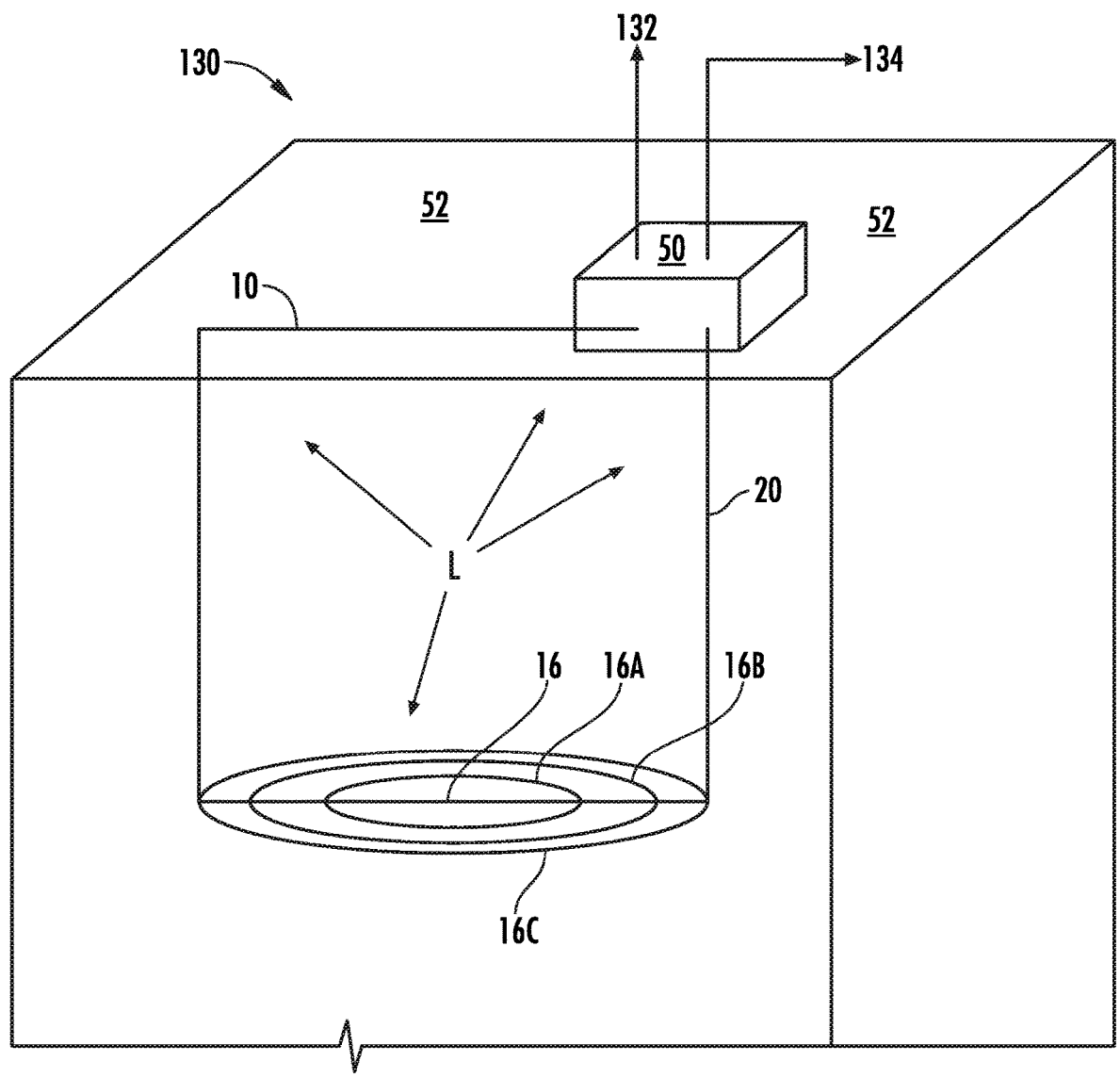
FIG. 45 is a schematic illustration of an energy recovery arrangement disposed in a thermal bearing geologic formation.

Referring now to the power and dispatchability aspects of the inventive protocol, FIG. 45 illustrates an example of the overall arrangement used to practice embodiments of the methods to be delineated herein. Numeral 130 globally references the overall arrangement. The geologic formation 38 having thermal energy having a temperature of at least 90° C. and which may be and typically above 150° C., or even 600° C. or greater, includes a subterranean loop arrangement having an inlet well 10 and an outlet well 20, which may be co-located, interconnected with at least one interconnecting section 16. In the example, several sections 16A, 16 B, 16C are depicted as with the previous discussion regarding the Figures.

At the surface 52, inlet 10 and outlet 20 are connected to a power generation device 50. Device 50 completes the loop arrangement as a closed loop which will be referenced for simplicity as L. As will be evident, the sections 16, 16A etc. are disposed within the geologic formation for the purpose of recovering thermal energy from the surrounding formation 38. For clarity, the closed loop, L, and particularly, sections 18 may include fissures, fractures, cracks within which fluid may be transported, however, this will not detract from the point of the closed loop concept; despite the fact that there may be localized multidirectional flow anomalies, the flow pattern remains closed in the inlet 10, interconnect 16, outlet 20, power generation device 50 combination of elements.

The geologic formation may be any formation that provides a temperature as noted above. In this regard, examples include a geothermal formation, a low permeability formation, hot dry rock, a sedimentary formation, a volcanic formation, a high temperature formation, a variable permeability formation and combinations thereof. These are examples only; any number of others are within the purview of the invention.

The formation, depending on its nature will have a predetermined potential thermal output capacity which can be analyzed in advance by suitable techniques known to those skilled in the art. Each formation will, of course, have a different output capacity.

In consideration of this, each loop, L, will have a predetermined potential thermal output capacity which is reflective of its design parameters, such as number of sections 18, geometric arrangement thereof, depth, length, formation temperature, formation rock properties, inter alia. All of these parameters will be apparent to those skilled.

The potential thermal output capacity is the maximum sustainable thermal energy output of the system. Thermal output may be varied temporarily with the methodology disclosed herein, but the long-term average output (i.e. averaged over months or years) cannot exceed the potential thermal output capacity. The overall efficiency of a system is equal to the average thermal output divided by the potential thermal output capacity, what is typically referred to as "capacity factor". It is advantageous to have a high capacity factor, or high utilization of the available potential thermal output capacity. Conventionally this is achieved by constant thermal output at or near the potential thermal output capacity. Many geothermal systems operate at greater than 90% capacity factor in this manner, sometimes referred to as "baseload" operations. The disclosed methodology enables a high capacity factor while also providing flexible on-demand energy output rather than a constant output.

For recovery, a working fluid is circulated through the loop, L, and exits the outlet well 20 flows power generation device 50 which converts thermal and/or kinetic energy into electricity for use by an end user globally referenced with numeral 132 and/or is redistributed at 134 for alternate uses to be discussed herein after. Once circulated as indicated, the working fluid is reintroduced to the inlet 10.

The working fluid is thermally "charged" or loaded by circulating the working fluid through the closed-loop, L, at a relatively low flow rate during the charging period. The residence time of the working fluid within the subsurface flow path is increased, and hence the fluid is heated up to a high temperature via conductive heat transfer with the surrounding formation 38.

The system is "discharged" by increasing the flow rate significantly and flushing out the volume of heated working fluid within the hot subsurface portion of the closed circuit, L. During the discharging cycle, thermal output can temporarily exceed the potential thermal output capacity for relatively short durations (<24 hours), due to the large subsurface volume of the thermally charged fluid and the transient nature of the system.

The working fluid may comprise water, super critical carbon dioxide, etc. and include a drag reducing additive such as a surfactant, a polymeric compound, a suspension, a biological additive, a stabilizing agent, anti-scaling agents, anti-corrosion agents, friction reducers, anti-freezing chemicals, biocides, hydrocarbons, alcohols, organic fluids and combinations thereof. Other suitable examples will be appreciated by those skilled. It is contemplated that the working fluid may be compositionally modified dynamically where changing subsurface thermal characteristics dictate.

Referring now to FIGS. 46A, 46B, 46C and 46D, shown are schematic illustrations of the possible dispositions and combinations of the interconnecting sections 16, previously referenced as multilateral systems 36. The illustration generally shows that the adjacent interconnecting sections may be symmetrical, asymmetrically relative to adjacent interconnecting sections, in interdigital relation to adjacent interconnecting sections, in coplanar relation to adjacent interconnecting sections, in parallel planar relation to adjacent interconnecting sections, in isolated or grouped networks and combinations thereof. Specific geometric disposition will vary on the temperature gradient characteristics. The Figures are exemplary only; suitable variations will be appreciated by the designer.

Figure 47:
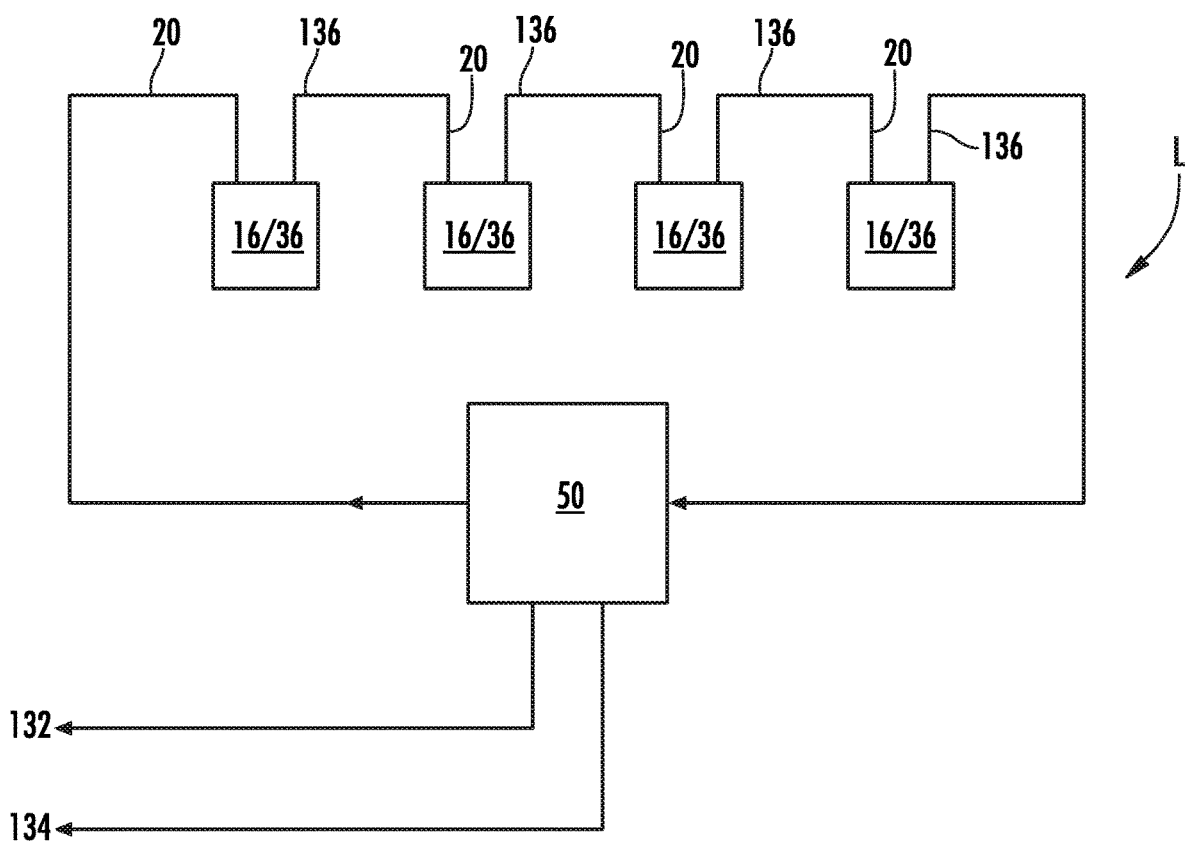
FIG. 47 is an alternative for the recovery arrangement.

FIG. 47 illustrates an example where the loop, L, includes a plurality of interconnecting sections 16 or multilateral systems 36 with the output 136 of one section 16/36 serves as the input 10 of an adjacent section 16/36 with common collection at power generation device 50. In this manner the loop, L, is subdivided into a daisy chain configuration for operation of the method.

Figure 48:
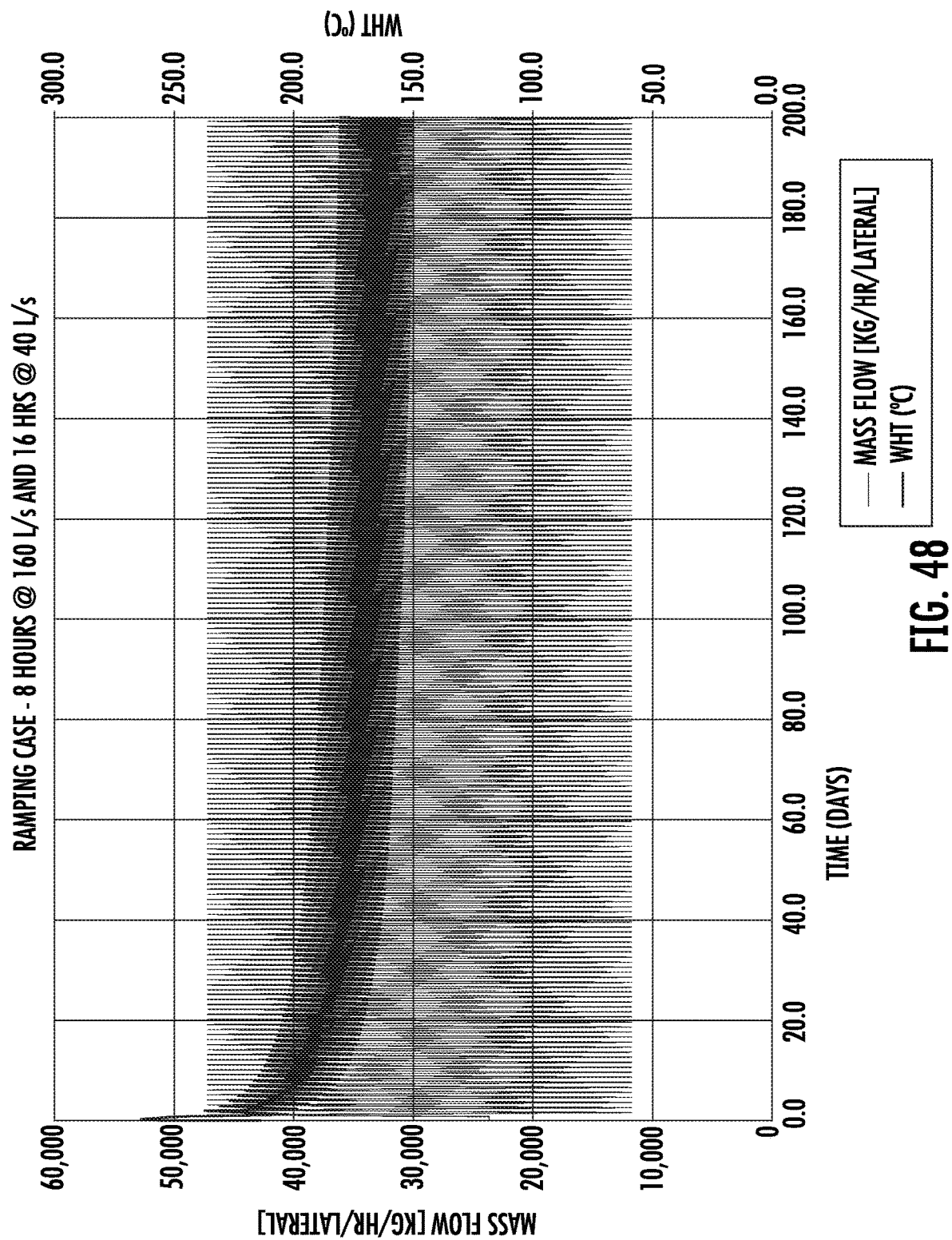
FIG. 48 is a depiction of the thermodynamic data generated using the methodology.

FIG. 48 illustrates an example, using a closed-loop multilateral system described in Applicant's co-pending PCT/CA2019000076 among others. The thermal charging or loading cycle includes circulating the working fluid, an example of which may be water as discussed above, at approximately 40 L/s for 16 hours (typically this would be done from 12:00 AM to 4:00 μm). This allows the interconnecting sections 16 etc (referenced in earlier Figures) to recover the thermal energy from the formation. The timeframe is one possible example of a predetermined residency time and is for instructional purposes only.

The discharging cycle consists of increasing the flow rate up to approximately 160 L/s over 8 hours. In this example, it would take place during peak evening user electricity demand from 4:00 PM to 12:00 AM and coincides with the period where solar power on the grid (not shown) is ramping down quickly as the sun sets.

Figure 49:
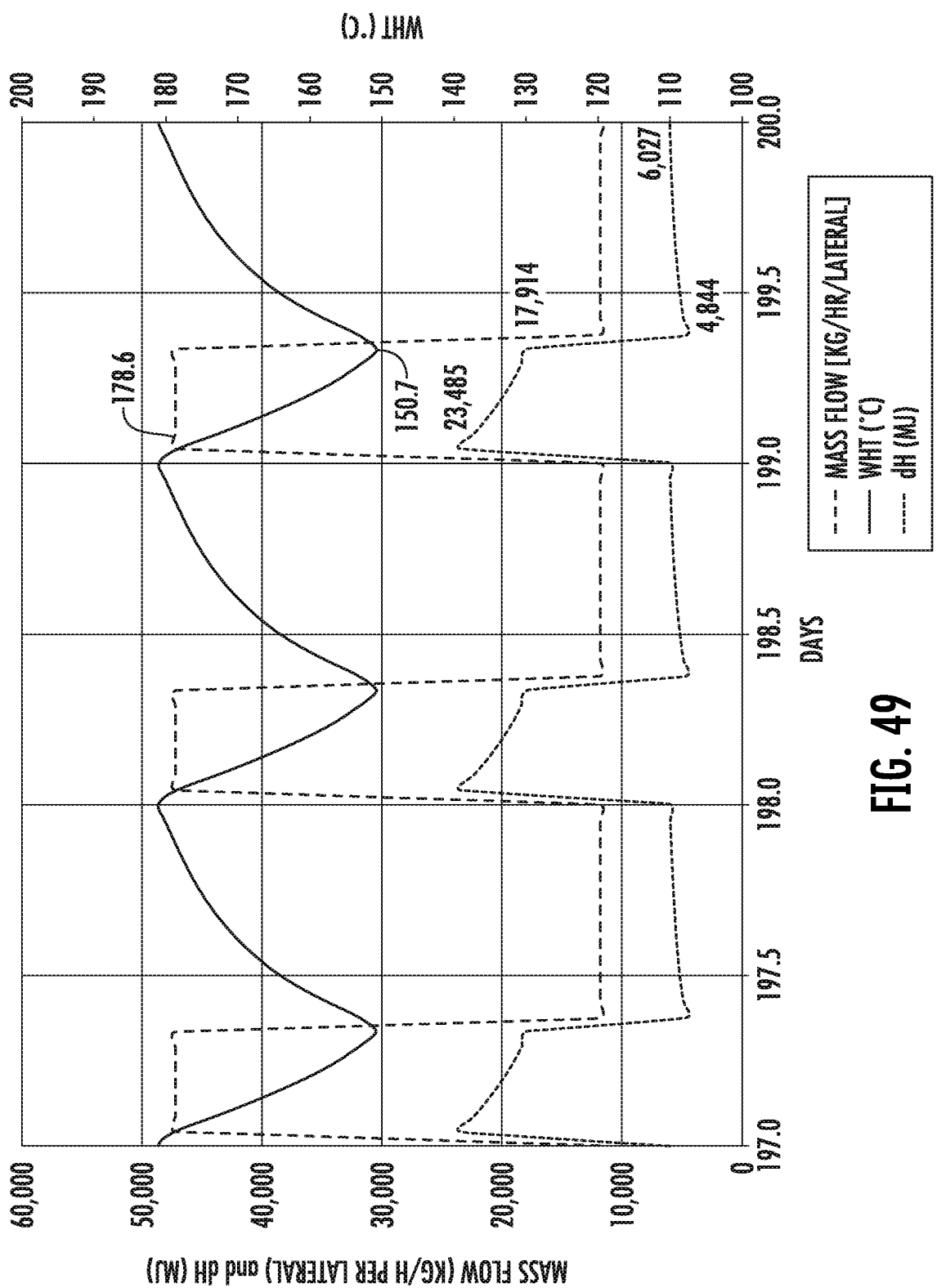
FIG. 49 is a detailed version of the data in FIG. 48.

FIG. 49 illustrates focussed details over the timeframe of 3 days. The flow rate (black) illustrates the charging and discharging cycles. WHT is the fluid temperature exiting the outlet well 16. dH refers to the change in enthalpy.

From the Figure, the average flow rate over the combined charge/discharge periods is approximately equal to the optimum fixed flow rate if the system was operated in a baseload manner. In this example, the same subsurface well arrangement as noted in the earlier Figures, if it where operated in a baseload manner, would produce maximum electricity when the flow rate is equal to 80 L/s. In the vernacular, the system would operate at the full subsurface potential thermal output capacity. This is a critical differentiator from some prior art (Ormat at Puna) where the average geothermal output over combined "charging" and "discharging" cycles is significantly below long-term capacity.

The charging cycle establishes a strong thermosiphon, driven by the density difference of the cold fluid in the inlet well 10 compared to the hot fluid in the outlet well 20. During the charging cycle, the thermosiphon pressure drive is higher than required to maintain the desired flow rate. Flow rate is therefore controlled by choking flow downstream of the outlet well 20, using a flow-control valve or other apparatus (not shown) to apply a pressure-drop.

When discharging, flow rate can be immediately increased by releasing the choke (opening the control valve). This near-instantaneous increase in flow rate enables a fast-ramping capability. Flow rate can be increased to until the hydraulic pressure losses through the closed circuit loop equal the thermosiphon pressure drive.

Flow can be increased beyond this level using a pump, which would require a parasitic power load. However, as long as the majority of the pressure drive is generated by the thermosiphon effect, the parasitic load is practically acceptable.

Using these methodologies, flow rate can be controlled to match power output to the end-user demand, through both the charging and discharging cycles and residency time of the working fluid in the loop.

In the prior art traditional open geothermal systems or flow in porous media, the pumping pressure required to reach the high flow rates while discharging cause an unacceptably high parasitic pump load and drastically reduce or eliminate any gains in net power output. It has been found that the practical limit is achieved when the ratio of the pressure losses in the circuit to the thermosiphon pressure drive is approximately 1.5. The system must be designed to have a hydraulic pressure loss less than 1.5 times the thermosiphon pressure drive. Ideally, pressure losses are less than 1 times the thermosiphon drive and the entire flow is driven by the thermosiphon. Accordingly, there is no parasitic pump load.

Energy is stored within the working fluid itself. During the charging cycle, sufficient residence time is required to heat the working fluid enough to accommodate the discharge cycle. For example, if the discharge cycle is typically 8 hours long, the fluid circuit transit time must be at least 8 hours (averaged over both discharge and charge cycles).

During the charging cycle, energy can also be stored temporarily in rock adjacent to the subsurface flow path and outlet well 16. At low flow rates, heat is transferred conductively from hotter rock in the formation 12 into the working fluid and as the fluid progresses through the system, it encounters cooler rock (typically shallower, for example in the outlet well 16), where energy is transferred from the fluid to the cooler rock and stored temporarily. During the discharging cycle, the average fluid temperature drops and the stored heat is transferred back into the working fluid.

A closed loop avoids the operational problems with traditional geothermal systems, which are exacerbated when varying the flow drastically as discussed herein. For example, common operational issues are caused by brine, solids, scaling, plugging, and dissolved gases.

The dispatchability disclosed herein integrates well with cryogenic air storage (CES). An example of the process flow is shown below. The CES charging cycle can use cheap excess power from the grid or co-located renewables (for example, solar during the peak daytime hours). The CES can also use produced geothermal power to charge but is not necessary. In one embodiment, the geothermal system would generate a fixed amount electricity throughout the charge and discharge cycle. The increase in thermal energy produced during the discharge cycle is directed to heat the air stream from the CES process, prior to expansion in a turbine.

There are several advantages when using CES with dispatchable geothermal:

The heat engine (which converts thermal energy to electricity) is only sized for the charge cycle, not the peak output of the discharge cycle, dramatically reducing equipment and capital costs.

Minor additional facilities are required to supply heat to the CES facility. CES is discharging only over several peak hours in the day. The dispatchable geothermal system discharging cycle can match the CES discharging cycle.

Figure 50:
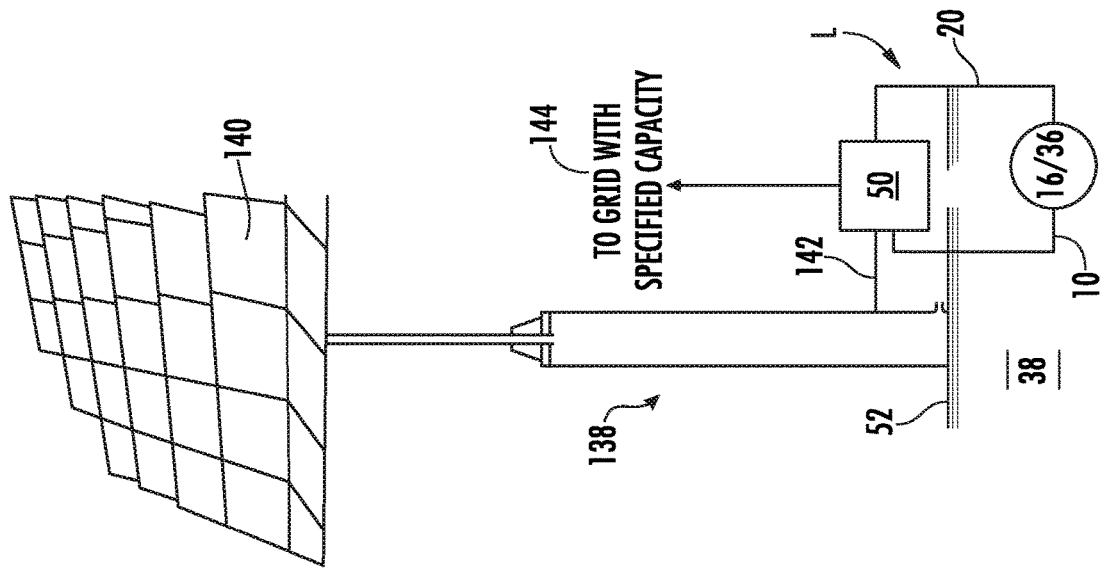
FIG. 50 is a schematic illustration of a further embodiment of the present invention.

FIG. 50 illustrates an embodiment of the invention designed to mitigate electrical grid saturation with intermittent sources of power. In the example, a solar recovery arrangement 138 is operatively connected to a loop, L, (loop arrangement or solution) and more specifically to the array 140 at 142. The power generation device 50 is in electrical communication with the grid (not shown) with a specific capacity. This is generally denoted by reference numeral 144.

For the following example, loop arrangement or loop solution is intended to embrace the arrangement discussed herein previously, namely the wells, 10, 20 and interconnection 16 in a thermal bearing geologic formation which may include the power generation device 22.

Solar has a leading place in today's shift to newer cleaner forms of power. Success can, however, bring its own complications. Many electrical grids are now saturated with wind and solar, to the point that it is getting difficult to absorb more intermittent sources of power. What is needed is a scalable form of green dispatchable power. Fortunately, that solution has now arrived. It's called Eavor-Light and unlike some of our other solutions it's specifically designed to complement new or even existing solar plants.

A typical 10 MW loop, L, unit combines a 5 MW subsurface baseload solution with an ORC and surface facilities scaled to 10 MW. This is to facilitate the inherent dispatchability of the energy produced by the loop, L. This may then be further scaled by the simple addition of more loop arrangements, L. By way of example, a 200 MW loop, L, arrangement has the following operational data.

Example—Grid Saturation Mitigation

| | Peak Capacity (MW) | Average Utilization (MW) | Load Factor (%) |
|---|---|---|---|
| LOOP ARRANGEMENT | | | |
| Solar Capacity | 200 | 40 | 20% |
| Loop Capacity | 200 | 100 | 50% |
| Transmission Capacity | 200 | 140 | 70% |
| SOLAR ONLY | | | |
| Solar Capacity | 700 | 140 | 20% |
| Loop Capacity | 0 | 0 | N/A |
| Transmission Capacity | 700 | 140 | 20% |
| SOLAR + BATTERY | | | |
| Solar Capacity | 700 | 140 | 20% |
| Battery Capacity (8 h) | 200 | N/A | N/A |
| Transmission Capacity | 200 | 140 | 70% |
| Solar Only Solution | | | |

For a 200 MW solar farm, because of its intermittent nature, it would produce on average only 40 MW. In the event that it is desired to increase the average power production 3.5 times or an additional 100 MW on average, one would have to add an additional 500 MW solar farm and an additional 500 MW in transmission capacity for the simple reason that the solar load factor is going to range between 10% and 25%. Unfortunately, not only does this involve increasing the surface footprint 3.5 times, it also requires upgrading the transmission network 3.5 times (or more undesirably, building new transmission lines to a new solar farm). This is further worsened since most of the increased capacity would be produced at times of the day where considerably below average prices would be achievable.

The Loop Solution

In contrast, one could achieve the same results by incorporating a 200 MW loop solution directly under the existing surface footprint of the current or planned solar farm. Advantageously, no new land acquisition would be required. Furthermore, because the loop arrangement would use its inherent dispatchability to produce power around the 20% load factor of the solar farm, there will be no need for any additional transmission capacity—saving both time and money. Finally, while the loop would not have the transmission capacity to produce much during the period of peak solar production around midday, midday production (which is often of little value) could be shifted to attractive monetization because of the pricing premium to be achieved for dispatchable, rather than intermittent or baseload power.

Solar+Battery Solution

Of course, solar could mimic the loop solution by the addition of enough batteries, but at considerable cost. Instead of just adding a 200 MW loop solution, the solar developer would need to add 500 MW of solar capacity, requiring a massively expanded surface footprint and 200 MW of 8-hour battery storage—resulting in inevitable increased costs and delay.

Figure 51:
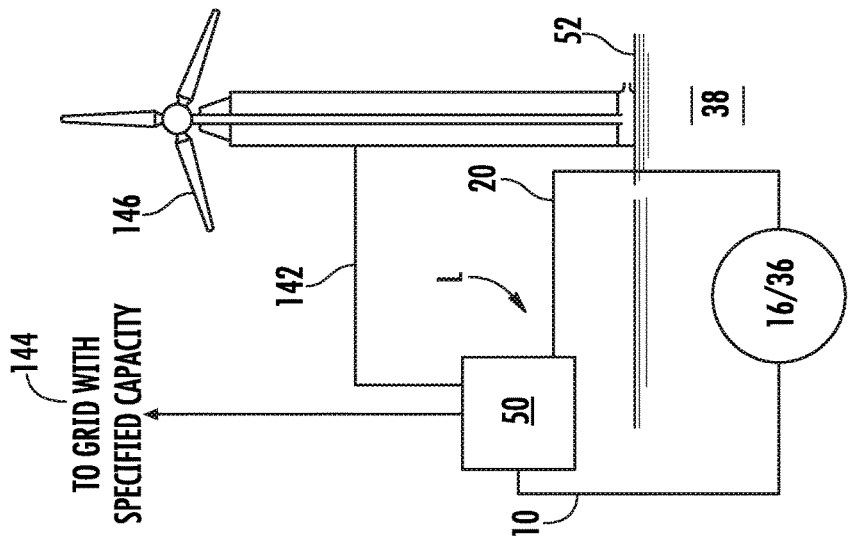
FIG. 51 is a schematic illustration of another embodiment of the present invention.

As a variation to the example, FIG. 51 depicts an arrangement using a windmill 146 as the prime mover.

Figure 52:
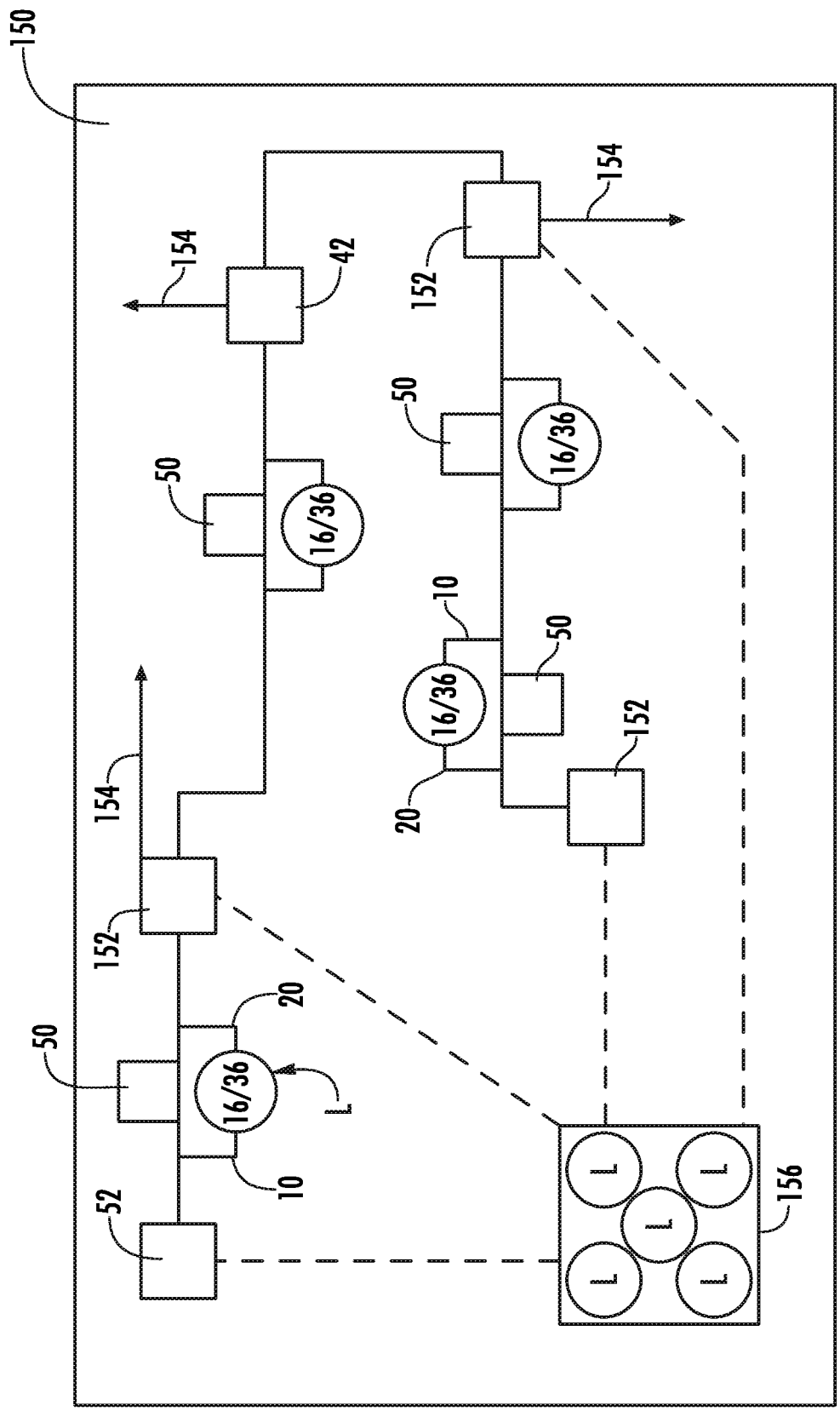
FIG. 52 is a schematic illustration of a further embodiment of the present invention.

Referring now to FIG. 52 shown is a further variation to the example. Numeral 150 represents a geographic area on which power distribution centres 152 are arranged to provide electrical delivery via 154 to the power transmission grid (not shown). As is known, the grid has an output capacity. The centres 152 contribute to a power production system over the geographic area 150 with a designed maximum power production quantity and a second effective or "real" power production quantity on the grid.

Clearly, over an expanse of area 150 between centres 152, there are occasionally "brownouts" or other delivery anomalies that occur for a variety of reasons known to those skilled such as is spikes of heavy user demand or redistribution between centres 152.

In order to alleviate inconsistent delivery issues, loop arrangements, L, may be integrated on the circuit of centres 152, such as between adjacent electrically communicating centres 152. as with the previous examples and specification herein, the closed loop configuration can be provided within the underlying geologic formation to produce a predetermined energy output from available potential thermal capacity attributed to the formation.

The working fluid can then be circulated as has been discussed and selectively thermally discharged through said power production arrangement 50 to maintain power production to the capacity throughout said power transmission grid. This accordingly mitigates the anomalies or irregularities noted above.

Depending on the geographic area and other factors, a main distribution hub 156 comprising a plurality of loop arrangements, L, could augment or replace some or all of centres 152 and individually positioned loops, L.

We claim:

1. A method for energy recovery from a geologic formation having predetermined available potential thermal capacity, comprising:
    drilling into said formation to form a primary open hole wellbore therein;
    flowing a sealant into the primary wellbore, thereby sealing the primary wellbore against fluid flow between said primary wellbore and said formation;
    drilling wellbores alongside the primary wellbore by electromagnetic guidance at least from said primary wellbore;
    selectively utilizing at least one of cumulative signals and individual signals from the drilled wellbores to guide drilling in forming the wellbores in a predetermined pattern within said formation;
    coupling the wellbores in a closed loop arrangement within thermal areas of said formation through an inlet wellbore and outlet wellbore to a heat exchanger to recover energy from the closed loop arrangement in a closed loop between the wellbores and said heat exchanger, said closed loop arrangement having a predetermined energy output within said available potential thermal capacity of said formation;
    circulating a fluid having a predetermined composition with a predetermined residency time within said closed loop arrangement to form an energy charged fluid,
    generating on demand energy to an end user from said energy charged fluid; and
    selectively modifying, during the drilling wellbores along the primary wellbore, electromagnetic communication between selected ones of the wellbores drilled alongside the primary wellbore, wherein said electromagnetic communication between the selected ones of the wellbores includes:
    a) providing a U shaped well with spaced apart vertical wellbores interconnected with a first horizontal wellbore;
    b) establishing a signal path within said U shaped well;
    c) drilling a second horizontal wellbore from at least one of said vertical wellbores;
    d) sensing a signal from said U shaped well;
    e) directing said drilling of said second horizontal wellbore along a predetermined path relative to said first horizontal wellbore based on a sensed signal from step d);
    f) forming a signaling pair with the first and second horizontal wellbores;
    g) drilling a third horizontal wellbore from at least one of said vertical wellbores;
    h) sensing a signal from at least one of said signaling pair, said U shaped well and said second horizontal wellbore; and
    i) directing said drilling of said third horizontal wellbore along a predetermined path relative to said first horizontal wellbore and said second horizontal wellbore based on a sensed signal from step h).

2. The method as set forth in claim 1, wherein flowing the sealant into the primary wellbore comprises sealing at least one of fissures, fractures, cracks, or other geologic anomalies to form an interface.

3. The method as set forth in claim 1, further including conducting said method in formation temperatures of at least 50° C.

4. The method as set forth in claim 1, further including conducting said method in formation temperatures of greater than 400° C.

5. The method as set forth in claim 1, wherein said flowing the sealant into the primary wellbore comprises forming a thermally conductive interface between an interior volume of the primary wellbore and the formation.

6. The method as set forth in claim 1, further including forming a plurality of closed loop arrangements for recovering the available potential thermal capacity.

7. The method as set forth in claim 6, further including a step of linking said plurality of closed loop arrangements in a predetermined pattern.

8. The method as set forth in claim 7, further including linking discrete predetermined patterns of closed loop arrangements.

9. The method as set forth in claim 8, further including linking discrete predetermined patterns of closed loop arrangements in at least one of a localized network, a dispersed network, in a nested grouping in thermal contact with proximate closed loop arrangements and combinations thereof.

10. The method as set forth in claim 8, further including linking discrete predetermined patterns of closed loop arrangements by the inlet wellbore of one closed loop arrangement with the outlet wellbore of a proximate closed loop arrangement.

11. The method as set forth in claim 1, further including:
circulating said fluid in said closed loop arrangement with the predetermined residency time to thermally load circulating fluid through conduction from said formation; and
adapting a flow rate of thermally loaded fluid within said closed loop based on user energy demand.

12. The method as set forth in claim 1, further including supplementing said fluid with energy charged fluid from adjacent closed loop arrangements in said formation.

13. The method as set forth in claim 1, wherein said closed loop arrangement includes an inlet well, an outlet well and an interconnecting section there between for fluid communication, where said interconnecting section is cased, uncased, lined, chemically treated, chemically sealed, thermally sealed, includes single pipe, coaxial pipe and combinations thereof in a continuous or discontinuous configuration.

14. The method as set forth in claim 1, further including facilitating energy delivery on demand through thermal discharge of said fluid in a power production apparatus to the end user which temporarily exceeds said predetermined energy output, while maintaining a delivered energy output average equal to said available potential thermal capacity over a predetermined timeframe.

15. The method as set forth in claim 14, wherein energy delivery for a temporary duration is a timeframe during which user demand is high relative to the entire predetermined timeframe.

16. The method of claim 1, where the drilling wellbores alongside the primary wellbore by electromagnetic guidance comprises using the electromagnetic guidance at a plurality of locations along the course of the primary wellbore to provide guidance at a plurality of locations to drilling of at least one of the wellbores alongside the primary wellbore.

17. The method of claim 16, where using the electromagnetic guidance at a plurality of locations along the course of the primary wellbore comprises leaving a plurality of signaling devices in the primary wellbore.

18. A method for energy recovery from a geologic formation having predetermined available potential thermal capacity, comprising:
drilling into said formation to form a primary open hole wellbore therein, wherein said drilling of the primary wellbore includes sequencing drilling while sealing pore space in the formation with drilling with a phase change material with subsequent sealing of said pore space in the formation and cooling a rock face being drilled in said formation with said phase change material to increase a rate of penetration during drilling of said formation relative to the rate of penetration absent said phase change material;
drilling wellbores alongside the primary wellbore by electromagnetic guidance at least from said primary wellbore;
selectively utilizing at least one of cumulative signals and individual signals from the drilled wellbores to guide drilling in forming the wellbores in a predetermined pattern within said formation;
coupling the wellbores in a closed loop arrangement within thermal areas of said formation through an inlet wellbore and outlet wellbore to a heat exchanger to recover energy from the closed loop arrangement in a closed loop between the wellbores and said heat exchanger, said closed loop arrangement having a predetermined energy output within said available potential thermal capacity of said formation;
circulating a fluid having a predetermined composition with a predetermined residency time within said closed loop arrangement to form an energy charged fluid, and
generating on demand energy to an end user from said energy charged fluid.

19. The method as set forth in claim 18, further including sealing at least one of fissures, cracks or voids in said formation pre-existing or resultant from drilling.

20. The method as set forth in claim 18, wherein the drilling while sealing pore space utilizes an alkali silicate composition in a drilling fluid.

21. The method as set forth in claim 18, wherein the drilling of the primary wellbore is conducted in an alternating sequence.

22. The method as set forth in claim 18, wherein the sealing of said pore space forms an interface between the drilled formation and the periphery of at least one of the primary wellbore or the wellbores.

23. The method as set forth in claim 22, further including circulating a chemical composition within said wellbores or primary wellbore capable of inducing precipitate formation with said interface to augment a sealing capacity and mechanical integrity of said interface.

24. The method as set forth in claim 23, further including circulating a fluid within the sealed wellbores or primary wellbore containing a seal maintenance additive.

25. The method as set forth in claim 18, wherein the coupling the wellbores in the closed loop arrangement comprises drilling an interconnecting wellbore, at least said interconnecting wellbore disposed within a heat producing area of said formation.

26. A method for energy recovery from a geologic formation having predetermined available potential thermal capacity, comprising:
drilling into said formation to form a primary open hole wellbore therein;
flowing a sealant into the primary wellbore, thereby sealing the primary wellbore against fluid flow between said primary wellbore and said formation;
drilling wellbores alongside the primary wellbore by electromagnetic guidance at least from said primary wellbore;
selectively utilizing at least one of cumulative signals and individual signals from the drilled wellbores to guide drilling in forming the wellbores in a predetermined pattern within said formation;
coupling the wellbores in a closed loop arrangement within thermal areas of said formation through an inlet wellbore and outlet wellbore to a heat exchanger to recover energy from the closed loop arrangement in a closed loop between the wellbores and said heat exchanger, said closed loop arrangement having a predetermined energy output within said available potential thermal capacity of said formation;
circulating a fluid having a predetermined composition with a predetermined residency time within said closed loop arrangement to form an energy charged fluid,
generating on demand energy to an end user from said energy charged fluid; and selectively modifying, during the drilling of the wellbores alongside the primary wellbore, electromagnetic communication between selected ones of the wellbores drilled alongside the primary wellbore, wherein said electromagnetic communication between the selected ones of the wellbores includes:
  providing a horizontal wellbore extending between and connecting the inlet wellbore to the outlet wellbore; and
  drilling additional horizontal wellbores from said inlet or outlet wellbores utilizing cumulative and combined sensor guidance from said horizontal wellbore to reduce trajectory drift from the horizontal wellbore.

27. A method for energy recovery from a geologic formation having predetermined available potential thermal capacity, comprising:
  drilling into said formation to form a primary open hole wellbore therein;
  flowing a sealant into the primary wellbore, thereby sealing the primary wellbore against fluid flow between said primary wellbore and said formation;
  drilling wellbores alongside the primary wellbore by electromagnetic guidance at least from said primary wellbore;
  selectively utilizing at least one of cumulative signals and individual signals from the drilled wellbores to guide drilling in forming the wellbores in a predetermined pattern within said formation;
  coupling the wellbores in a closed loop arrangement within thermal areas of said formation through an inlet wellbore and outlet wellbore to a heat exchanger to recover energy from the closed loop arrangement in a closed loop between the wellbores and said heat exchanger, said closed loop arrangement having a predetermined energy output within said available potential thermal capacity of said formation;
  circulating a fluid having a predetermined composition with a predetermined residency time within said closed loop arrangement to form an energy charged fluid,
  generating on demand energy to an end user from said energy charged fluid; and
  selectively modifying, during the drilling the wellbores alongside the primary wellbore, a networking of the wellbores, wherein the selectively modifying the networking of the wellbores includes connecting the outlet wellbore of the closed loop arrangement with an inlet wellbore of a second closed loop arrangement at a second location.

28. A method for energy recovery from a geologic formation having predetermined available potential thermal capacity, comprising:
  drilling into said formation to form a primary open hole wellbore therein;
  flowing a sealant into the primary wellbore, thereby sealing the primary wellbore against fluid flow between said primary wellbore and said formation;
  drilling wellbores alongside the primary wellbore by electromagnetic guidance at least from said primary wellbore;
  selectively utilizing at least one of cumulative signals and individual signals from the drilled wellbores to guide drilling in forming the wellbores in a predetermined pattern within said formation;
  coupling the wellbores in a closed loop arrangement within thermal areas of said formation through an inlet wellbore and outlet wellbore to a heat exchanger to recover energy from the closed loop arrangement in a closed loop between the wellbores and said heat exchanger, said closed loop arrangement having a predetermined energy output within said available potential thermal capacity of said formation;
  circulating a fluid having a predetermined composition with a predetermined residency time within said closed loop arrangement to form an energy charged fluid, and
  generating on demand energy to an end user from said energy charged fluid;
  selectively modifying, during the drilling wellbores alongside the primary wellbore, proximity of the wellbores, wherein said proximity of the wellbores includes at least one of vertically stacking closed loop arrangements, interdigitating closed loop arrangements and combinations thereof.

* * * * *